US012608787B2

(12) United States Patent
Michel et al.

(10) Patent No.: US 12,608,787 B2
(45) Date of Patent: Apr. 21, 2026

(54) MACHINE LEARNING-BASED ASSESSMENT OF FOOD ITEM QUALITY

(71) Applicant: Apeel Technology, Inc., Goleta, CA (US)

(72) Inventors: Ohad Michel, Goleta, CA (US); Richard Pattison, Goleta, CA (US); Tim Rappold, Goleta, CA (US); Sahana Venkatesh, Goleta, CA (US); Pooyan Abouzar, Goleta, CA (US); Saurabh Chatterjee, Goleta, CA (US); Jeffrey Fun-Shen Gau, Goleta, CA (US)

(73) Assignee: Apeel Technology, Inc., Goleta, CA (US)

( * ) Notice: Subject to any disclaimer, the term of this patent is extended or adjusted under 35 U.S.C. 154(b) by 591 days.

(21) Appl. No.: 18/092,119

(22) Filed: Dec. 30, 2022

(65) Prior Publication Data

US 2023/0214982 A1 Jul. 6, 2023

Related U.S. Application Data

(60) Provisional application No. 63/295,172, filed on Dec. 30, 2021.

(51) Int. Cl.
*G06T 7/00* (2017.01)
*G06V 20/68* (2022.01)

(52) U.S. Cl.
CPC ............ *G06T 7/0004* (2013.01); *G06V 20/68* (2022.01); *G06T 2207/10024* (2013.01); *G06T 2207/20081* (2013.01); *G06T 2207/30128* (2013.01)

(58) Field of Classification Search
CPC ......... G06T 7/0004; G06T 2207/10024; G06T 2207/20081; G06T 2207/30128;
(Continued)

(56) References Cited

U.S. PATENT DOCUMENTS 9,174,245 B2 11/2015 Blanc et al.
10,986,789 B1 4/2021 Roberts et al.
(Continued)

FOREIGN PATENT DOCUMENTS

EP 1550378 A1 7/2005
KR 20170008720 A 1/2017
(Continued)

OTHER PUBLICATIONS

Huang Yo-Ping et al., "Using Fuzzy Mask R-CNN Model to Automatically Identify Tomato Ripeness," IEEE Access , Nov. 2020, 8 (16): 207672-207682.*
(Continued)

*Primary Examiner* — Sheela C Chawan
(74) *Attorney, Agent, or Firm* — Fish & Richardson P.C.

(57) ABSTRACT

Described herein are systems and methods for determining quality levels for food items using image data, such as time lapse RGB, hyperspectral, thermal, and/or multispectral images. The method can include receiving, from imaging devices, image data of food items, performing object detection on the image data to identify a bounding box around each food item, and identifying a quality level of each food item by applying trained models to the bounding boxes. The models were trained using image training data of other food items that was annotated based on previous identifications of a first portion of the other food items as having poor quality features and a second portion as having good quality features. The other food items and the food items are a same type. The method also includes determining, for each food item, a quality level score based on the identified quality level of the food item.

24 Claims, 28 Drawing Sheets

(58) Field of Classification Search
CPC ...... G06V 20/68; G06V 10/56; G06V 10/255;
G06V 10/26; G06V 10/82; G06V 20/70
USPC ................................................. 382/100, 110
See application file for complete search history.

(56) References Cited

U.S. PATENT DOCUMENTS

| 11,847,681 | B2 | 12/2023 | Gordon et al. |
| 2009/0303233 | A1 | 12/2009 | Lin et al. |
| 2017/0203987 | A1 | 7/2017 | McMahon et al. |
| 2018/0365820 | A1 | 12/2018 | Nipe et al. |
| 2019/0340749 | A1 | 11/2019 | Schwartzer et al. |
| 2020/0222949 | A1 | 7/2020 | Murad et al. |
| 2020/0334628 | A1 | 10/2020 | Goldberg et al. |
| 2020/0380274 | A1 | 12/2020 | Shin et al. |
| 2021/0333185 | A1 * | 10/2021 | Hayward ............. G01N 33/025 |
| 2022/0126315 | A1 | 4/2022 | Ross et al. |
| 2022/0270269 | A1 | 8/2022 | Pattison et al. |
| 2022/0270298 | A1 | 8/2022 | Pattison |
| 2022/0299493 | A1 | 9/2022 | Pattison et al. |
| 2022/0327685 | A1 | 10/2022 | Rogers et al. |
| 2023/0103922 | A1 | 4/2023 | Keech et al. |
| 2023/0222822 | A1 | 7/2023 | Jefferson et al. |
| 2023/0260273 | A1 | 8/2023 | Michel et al. |
| 2023/0325899 | A1 | 10/2023 | Gordon et al. |

FOREIGN PATENT DOCUMENTS

| WO | WO 2020/073037 | | 4/2020 |
| WO | 2020/231784 | A1 | 11/2020 |
| WO | 2021/222261 | A1 | 11/2021 |
| WO | WO 2021/252369 | | 12/2021 |

OTHER PUBLICATIONS

Chhajed et al., "Glucosinolate Biosynthesis and the Glucosinolate-Myrosinase System in Plant Defense," Agronomy, Nov. 2020, 10(11), 1786:25 pages.

Durand-Petiteville et al., "Real-time segmentation of strawberry flesh and calyx from images of singulated strawberries during postharvest processing," Computers and Electronics in Agriculture, Nov. 2017, 142(PA):298-313.

Fito et al., "Control of citrus surface drying by image analysis of infrared thermography," Journal of Food Engineering, Feb. 2004, 61(3):287-290.

Ganapathy et al., "Smart Marketing Systems for Fruits using Wireless Sensors," 2018 IEEE International Conference on System, Computation, Automation and Networking, Jul. 2018, 4 pages.

Gowen et al., "Applications of thermal imaging in food quality and safety assessment," Trends in Food Science & Technology, Apr. 2010, 21(4):190-200.

Halbersberg et al., "Transfer Learning of Photometric Pheno-Types in Agriculture Using Metadata," Apr. 2020, retrieved from URL <https://arxiv.org/pdf/2004.00303.pdf>, 6 pages.

Huang et al., "Using Fuzzy Mask R-CNN Model to Automatically Identify Tomato Ripeness," IEEE Access, Nov. 2020, 8(16):207672-207682.

International Search Report and Written Opinion in International Appln. No. PCT/US2022/054329, mailed May 2, 2023, 15 pages.

Overby et al., "Allyl isothiocyanate depletes glutathione and upregulates expression of glutathione S-transferases in *Arabidopsis thaliana*," Front. Plant Sci., Apr. 2015, 6(277):1-9.

Wang et al., "Study of Drying Uniformity in Pulsed Spouted Microwave-Vacuum Drying of Stem Lettuce Slices with Regard to Product Quality," Drying Technology, Jan. 2013, 31(1-4):91-101.

Blasco et al., "Citrus sorting by identification of the most common defects using multispectral computer vision," J. Food Eng., Dec. 2007, 83(3):384-393.

Blasco et al., "Recognition and classification of external skin damage in citrus fruits using multispectral data and morphological features," Biosystems Eng., Jun. 2009, 103(2):137-145.

Bosabalidis et al., "Ultrastructural studies on the secretory cavities of Citrus deliciosa ten. II. Development of the essential oil-accumulating central space of the gland and process of active secretion," Protoplasma, Feb. 1982, 112:63-70.

Brodrick, "Investigations into blemishes on citrus fruits—Part III. The development of early and late injuries in relation to rind oils," South African Citrus J., Sep. 1970, 441:19-25.

Cahoon et al., "Cause and control of oleocellosis on lemons," Proc. Amer. Soc. Hort. Sci., Jun. 1964, 84:188-198, 12 pages.

Eaks, "Rind disorders of oranges and lemons in California," Proc. First Intl. Citrus Symp., Nov. 1969, 3:1343-1354, 14 pages.

Fawcett, "A spotting of citrus fruits due to the action of oil liberated from the rind," California Agr. Expt. Sta. Bul., Feb. 1916, 266:261-269, 12 pages.

Gomez-Sanchis et al., "Detecting rottenness caused by *Penicillium* genus fungi in citrus fruits using machine learning techniques," Expert Systems with Applications, Jan. 2012, 39(1):780-785.

Lorente et al., "Selection of Optimal Wavelength Features for Decay Detection in Citrus Fruit Using the ROC Curve and Neural Networks," Food and Bioprocess Technology, Dec. 2011, 6(2):530-541.

Obenland et al., "Essential Oils and Chilling Injury in Lemon," HortScience, Feb. 1997, 32(1):108-111.

Obenland et al., "Peel Fluorescence as a Means to Identify Freeze-damaged Navel Oranges," HortTechnology, Jan. 2009, 19(2):379-384.

Obenland et al., "Ultraviolet Fluorescence to Identify Navel Oranges with Poor Peel Quality and Decay," HortTechnology, Dec. 2010, 20(6):991-995.

Petracek et al., "Physiological peel disorders," Fresh citrus fruits, Wardowski et al. (eds.), Florida Science Source, 2006, 397-419, 25 pages.

Shomer, "Sites of production and accumulation of essential oils in citrus fruits," Electron Microscopy, Proceedings of the Seventh European Congress on Electron Microscopy, Aug. 1980, 2:256-257, 4 pages.

* cited by examiner

Network(s)
180

Output model(s) for
the identified
feature(s)

D

Generate machine
learning model(s) for
identified feature(s)

C

Computer System
150

Identify produce
feature(s)

B

Receive
data

A

Produce Image Data
190

200

Receive test image data
202

Identify produce features
204

Apply ground truth labels 206

Generate models for identified produce features
208

Receive image data of produce
210

Apply models
212

Determine quality metric scores for attributes identified by the models
214

Output quality metric scores of produce
216

Determine supply chain modification(s)
218

300

```
┌─────────────────────────────────────┐
│         Receive test image data      │
│                 302                  │
└─────────────────────────────────────┘
                   │
                   ▼
┌─────────────────────────────────────┐
│         Identify produce feature     │
│                 304                  │
└─────────────────────────────────────┘
                   │
                   ▼
┌─────────────────────────────────────┐
│ Generate machine learning model for  │
│   the identified produce feature     │
│                 306                  │
└─────────────────────────────────────┘
                   │
                   ▼
┌─────────────────────────────────────┐
│           More features?             │
│                 308                  │
└─────────────────────────────────────┘
                   │
                   ▼
┌─────────────────────────────────────┐
│           Output model(s)            │
│                 310                  │
└─────────────────────────────────────┘
```

Yes

400

```
┌─────────────────────────────────────────┐
│        Receive image data of food items  │
│                    402                    │
└─────────────────────────────────────────┘
                    │
                    ▼
┌─────────────────────────────────────────┐
│ Perform object detection to identify     │
│ bounding box for each food item in       │
│ image data                               │
│                    404                    │
└─────────────────────────────────────────┘
                    │
                    ▼
┌─────────────────────────────────────────┐
│ Determine grid structure based on        │
│ bounding boxes                           │
│                    406                    │
└─────────────────────────────────────────┘
                    │
                    ▼
┌─────────────────────────────────────────┐
│       Select bounding box for a food item │
│                    408                    │
└─────────────────────────────────────────┘
                    │
                    ▼
┌─────────────────────────────────────────┐
│  Apply machine learning trained models   │
│  in series                               │
│                    410                    │
└─────────────────────────────────────────┘
                    │
                    ▼
                ╭─────────╮
                │ FIG. 4B │
                │   412   │
                ╰─────────╯
```

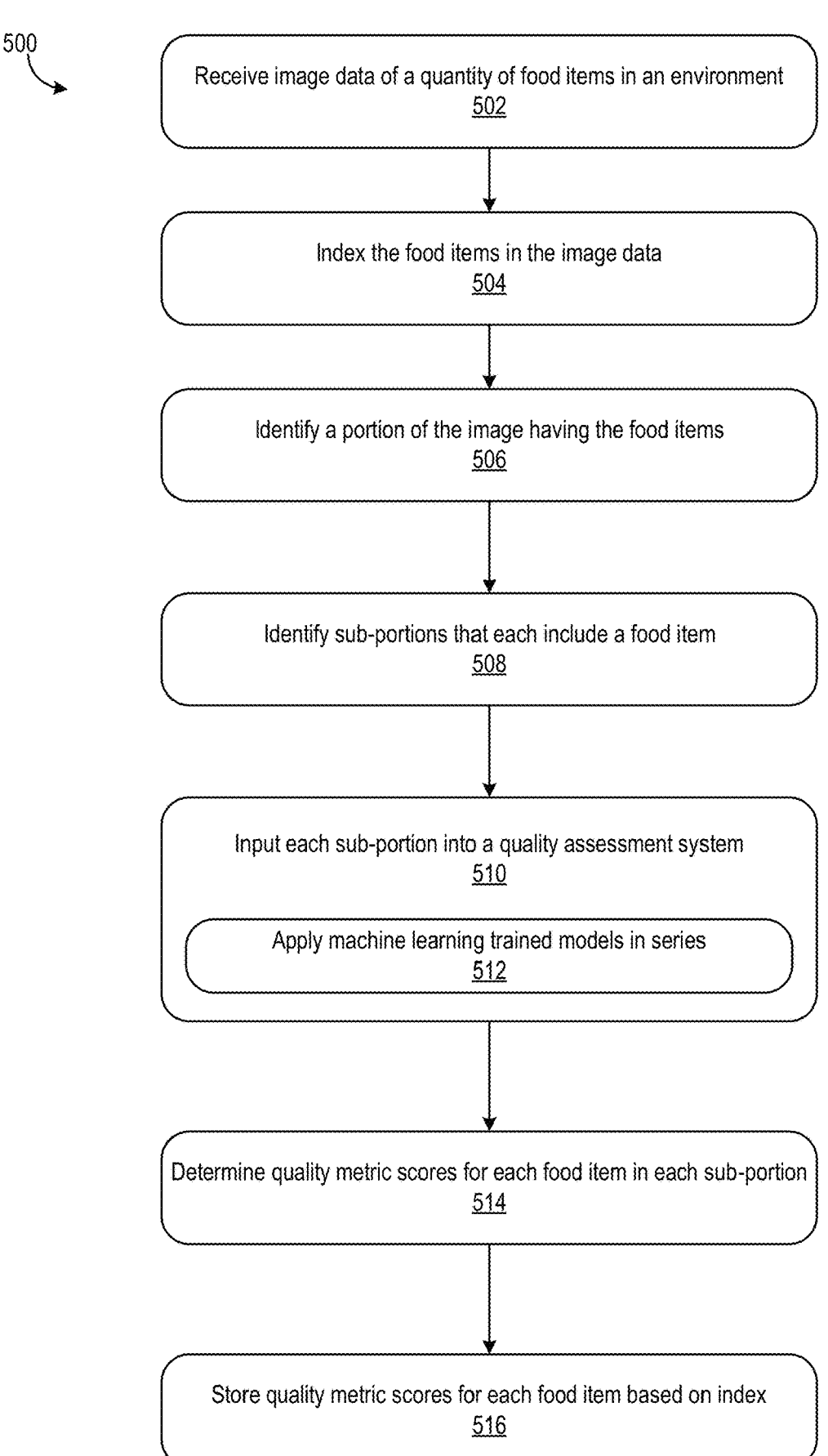

Receive image data of a quantity of food items in an environment
502

Index the food items in the image data
504

Identify a portion of the image having the food items
506

Identify sub-portions that each include a food item
508

Input each sub-portion into a quality assessment system
510

Apply machine learning trained models in series
512

Determine quality metric scores for each food item in each sub-portion
514

Store quality metric scores for each food item based on index
516

Lime Quality Analysis Output

Avocado Firmness Prediction based on pixel by pixel HSI Analysis

An RGB image of the same flat

Inferred firmness per pixel (brighter is higher)

1700

Avocado Internal Quality Analysis Output

2300

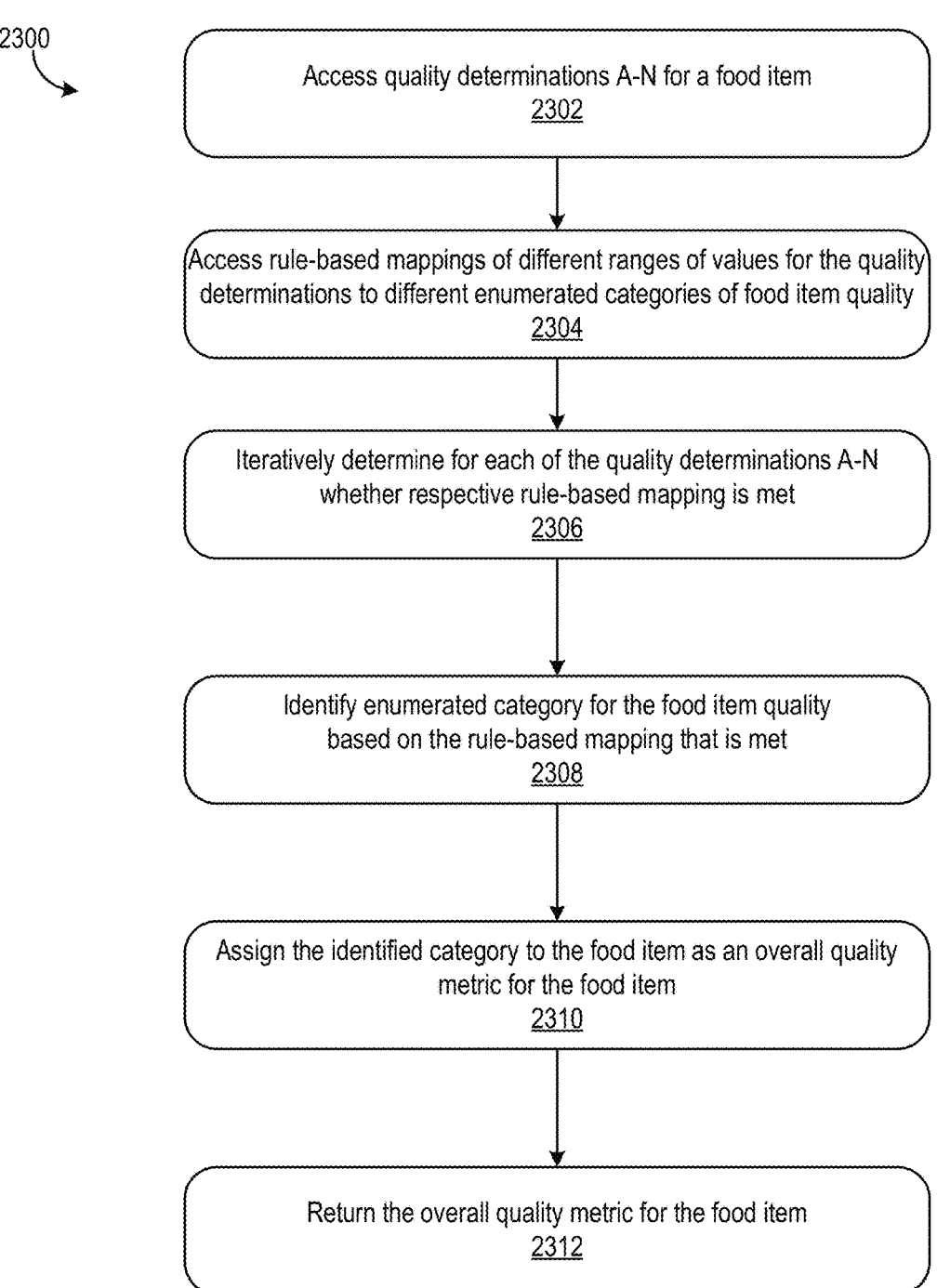

Access quality determinations A-N for a food item
2302

Access rule-based mappings of different ranges of values for the quality
determinations to different enumerated categories of food item quality
2304

Iteratively determine for each of the quality determinations A-N
whether respective rule-based mapping is met
2306

Identify enumerated category for the food item quality
based on the rule-based mapping that is met
2308

Assign the identified category to the food item as an overall quality
metric for the food item
2310

Return the overall quality metric for the food item
2312

FIG. 23

MACHINE LEARNING-BASED ASSESSMENT OF FOOD ITEM QUALITY

INCORPORATION BY REFERENCE

This application claims priority to U.S. Provisional Application Ser. No. 63/295,172, filed on Dec. 30, 2021, the disclosure of which is incorporated by reference in its entirety.

TECHNICAL FIELD

This document generally describes devices, systems, and methods related to determining quality of food items based on, for example, image data of the food items.

BACKGROUND

Food items, such as produce, fruits, and meats can have different quality metrics that can impact their suitability for consumption and value in a supply chain. Multiple different stakeholders throughout the supply chain have an interest in evaluating quality metrics of such food items. As an example, food item color can be an indicator of quality that can be used to sort and grade the food item. Different quality metrics can also impact consumer purchasing decisions.

Food items with quality metrics, such as good color properties, can be more valuable than food items with off-colors or other poor quality metrics. Color and other quality metrics can be used to indicate ripeness, firmness, rotting, desiccation, flavor, sweetness, and tartness features of food items. Any of these features can be valuable throughout the supply chain and in consumer consumption decisions. For example, browning in a food item can indicate rot. With early identification of the browning color, supply chain modifications can be made to avoid wasting the food item.

Objectively and quantitatively defining high quality food items based on image data can be challenging. Relevant stakeholders in the supply chain can observe and compare colors or other features that are visible in or on the food items. However, the human eye may only be able to distinguish color differences or other feature differences in extreme cases or where the color differences or other feature differences are noticeably apparent. For example, the human eye may be able to distinguish when a lime is yellow, green, or brown or when a lime is more yellow than other limes, but the human eye may not be able to identify more subtle changes in color. As another example, it is challenging for the human eye to rank and compare colors universally across all possible colors that a particular food item may obtain during its lifetime. Subtle changes in color and other features throughout the lifetime of the food item can be representative of changes in quality of that food item.

SUMMARY

This document generally describes systems, methods, and techniques for noninvasively assessing the quality of food items (e.g., vegetables, fruit, meat) based on, for example, image data. The image data can be generated and captured by one or more imaging devices, such as cameras that are configured to capture images of food items within the visible light spectrum and/or outside of the visible light spectrum. For example, the disclosed technology can capture and use hyperspectral image data captured by hyperspectral cameras. The image data can include images (e.g., RGB, hyperspectral, multispectral, thermal, etc.) as well as additional meta data. As an illustrative example, the disclosed technology can be used to assess food item color to determine food item quality, such as ripeness, readiness for consumption, mold, rotting, and/or desiccation. The disclosed technology can distinguish color differences, whether readily apparent or subtle, and define what different colored food items are in an unsupervised way. For example, the disclosed technology can distinguish quality of a green apple from a yellow apple. A quantitative color score can be inferred for each food item. Many other features and qualities can also be determined using the image data. For example, mold, texture, defects, and desiccation can also be identified from the image data to determine quality of the food item. Models can be trained with machine learning techniques, such as convolutional neural networks (CNNs), to identify and score such quality metrics from image data. As a result, food items' quality can be assessed, especially where the human eye may not be able to provide objective and universal quantification or may not be able to distinguish subtle changes in the food items, such as bruising, infection, age, ripeness, taste, etc., or other non-visible features of the food item's quality.

The disclosed technology can provide for generating different metrics that can be used to identify different features of the food item that indicate quality of such food item. Quality metrics can be defined per food item. Quality metrics can further be defined per type of food item. For example, apples can have a different color metric, and corresponding machine learning trained model(s), in comparison to limes, avocados, and other fruits and produce. Moreover, Granny Smith apples can have different color metrics or other quality metrics in comparison to Honeycrisp apples. Since a food item's quality can be determined based on a plurality of quality metrics, each machine learning trained model corresponding to a quality metric can be run in series. Each subsequent model can receive, as input, the output of a prior executed model. Since the models receive quality metric analyses as input, more robust and accurate quality metric scores can be determined by each model. In some implementations, the machine learning trained models can also be executed in parallel.

Quality scores can be determined for each quality metric. An overall quality score can also be determined for the food item based on an aggregate of the individual quality scores. Based on the quality score(s) of the food item, modifications can be made to the supply chain early on. For example, a quality assessment as described throughout this disclosure can be performed once a food item enters a storage facility. Quality of the food item can be assessed at this point in time, which can be a significant indicator of when the food item may ripen and/or be ready for consumption by consumers. If the food item's quality is identified as poor (e.g., the food item is currently ripe or past prime ripeness, etc.), then the supply chain can be modified to immediately ship the food item to consumers at a nearest geographic location, to discard the food item, or to ship the food item to a food processing plant. If the food item's quality is identified as good (e.g., the food item is beginning to ripen, is ripening, has no mold or desiccation, etc.), then the supply chain can be modified to store the food item for some period of time or transport the food item to consumers at a farther away geographic location. One or more other supply chain modifications can be determined based on preferences of relevant stakeholders throughout the supply chain lifecycle.

Particular embodiments described herein can include a method for determining quality levels for food items using image data, the method including receiving, by a computing system and from an imaging device, image data of food items, performing, by the computing system, object detection on the image data to identify a bounding box around each of the food items in the image data, and determining, by the computing system and based on the bounding box around each of the food items in the image data, a grid structure for the image data. Each bounding box can be assigned a grid index in the grid structure and the grid index can be used to identify the food item in a data store. The method can also include identifying, by the computing system and for each of the food items, a quality level of the food item by applying trained models to the bounding box portions of the image data that contains each of the food items. Each of the trained models can be trained using image training data of other food items, the image training data being annotated based on previous identifications of a first portion of the other food items as having poor quality features and a second portion of the other food items as having good quality features. The other food items can be of a same food type as the food items and the trained models can include a first trained model trained to identify a first quality feature and a second trained model trained to identify a second quality feature that is different than the first quality feature. The method further can include determining, by the computing system and for each of the food items, a quality level score for the food item based on the identified quality level of the food item, and storing, by the computing system and for each of the food items, (i) the bounding box portions of the image data that contains the food items, (ii) the grid index, (iii) the identified quality level of the food item, and (iv) the determined quality level score for the food item in the data store.

In some implementations, the embodiments described herein can include one or more of the following features. For example, the method can also include transmitting, by the computing system to a user computing device, the quality level scores for the food items in the image data for display at the user computing device.

In some implementations, the method can include retrieving, by the computing system and for each of the food items, the quality level score for the food item from the data store, identifying, by the computing system, supply chain information for the food item that can include a preexisting supply chain schedule and destination for the food item, determining, by the computing system, whether to modify the supply chain information for the food item based on the retrieved quality level score, in response to a determination to modify the supply chain information, generating, by the computing system, modified supply chain information based on the received quality level score, and transmitting, by the computing system, the modified supply chain information to one or more supply chain actors to implement the modified supply chain information. The modified supply chain information can include one or more of a modified supply chain schedule and modified destination for the food item. Moreover, the modified supply chain information can include instructions that, when executed by the one or more supply chain actors, can cause the food item to be moved for outbound shipment to end-consumers that are geographically closest to a location of the food item. In some implementations, the modified supply chain information can include instructions that, when executed by the one or more supply chain actors, can cause at least one of (i) the food item to be moved for outbound shipment to a food processing plant, (ii) a change in controlled atmospheric conditions surrounding the food item, (iii) a change in ripening conditions of the food item, and (iv) a change to cold storage conditions for the food item.

As another example, the trained models each can include one or more layers having (i) image training data of the other food items and (ii) labels that indicate food item quality classifications for each of the other food items depicted in the image training data. The food item can be at least one of an avocado, a lime, a lemon, an apple, a berry, and a mango. Sometimes, the method can also include identifying, by the computing system and using object recognition, a type of the food items depicted in the image data, and selecting, by the computing system and based on the identified type of the food items, one or more of the trained models to apply to the bounding box portions of the image data. The selected trained models can be trained to identify quality features of food items of the same type. In some implementations, the trained models can be trained using at least one of convolutional neural networks (CNNs) and Partial Least Squares (PLSs). In yet some implementations, the image data can include at least one of RGB images, hyperspectral images, multispectral images, thermal images, nuclear magnetic resonance (NMR) images, and magnetic resonance images (MRIs).

In some implementations, identifying, by the computing system and for each of the food items, a quality level of the food item can include calibrating colors of the image data to maintain color consistency in the image data, determining, based on applying a color analyzer trained model to the calibrated bounding box portions of the image data, a median Euclidean distance between a color of the food item in the bounding box portions of the image data and a reference color for the food item, the reference color being associated with a preferred quality level of the food item, determining whether the median Euclidean distance exceeds a threshold value, in response to determining that the median Euclidean distance exceeds the threshold value, identifying the quality level of the food item as poor quality, and in response to determining that the median Euclidean distance is less than the threshold value, identifying the quality level of the food item as good quality.

As another example, identifying, by the computing system and for each of the food items, a quality level of the food item can include applying hyperspectral cube processing to the bounding box portions of the image data that contain each of the food items. In some implementations, identifying, by the computing system and for each of the food items, a quality level of the food item can include determining, based on applying an apple yellowing trained model to the bounding box portions of the image data that contain each of the food items, a degree to which the food item has yellowed, and assigning, based on the degree to which the food item has yellowed, the quality level score of the food item. A score greater than or equal to 0 but less than a threshold level can indicate (i) good quality and (ii) no yellowing and a score equal to or less than 100 but greater than the threshold level can indicate (i) poor quality and (ii) maximum yellowing of the food item.

In some implementations, identifying, by the computing system and for each of the food items, a quality level of the food item can include determining, based on applying a lime yellowing trained model to the bounding box portions of the image data that contain each of the food items, a degree to which the food item has yellowed, and assigning, based on the degree to which the food item has yellowed, the quality level score of the food item. Aa score greater than or equal to a first threshold level but less than a second threshold level can indicate (i) good quality and (ii) no yellowing and a score equal to or less than a third threshold level but greater than the second threshold level can indicate (i) poor quality and (ii) maximum yellowing. In some implementations, applying a lime yellowing trained model further can include applying a Gaussian Mixture model and a Support Vector Regressor to the bounding box portions of the image data that contain each of the food items. In some implementations, applying an apple yellowing trained model further can include applying a Gaussian Mixture model and a Support Vector Regressor to the bounding box portions of the image data that contain each of the food item.

In some implementations, identifying, by the computing system and for each of the food items, a quality level of the food item can include identifying, based on applying an internal quality trained model to the bounding box portions of the image data that contain each of the food items, internal quality defects in the food item, and determining, based on the internal quality defects, an overall quality level score of the food item. A score of "good" can indicate no internal quality defects in the food item, a score of "okay" can indicate some internal quality defects in the food item, and a score of "bad" can indicate most internal quality defects in the food item. In some implementations, the internal quality trained model can be trained using image training data of other food items being previously annotated as having no internal defects, diffuse browning, vascular browning, flesh adhesion, internal rot, stem rot, and tissue breakdown.

As another example, identifying, by the computing system and for each of the food items, a quality level of the food item can include identifying, based on applying a rot and desiccation trained model to the bounding box portions of the image data that contain each of the food items, rot and desiccation in the food item, and assigning, based on the identified rot and desiccation, the quality level score of the food item. The score can be at least one of a binary classification and a numeric value of rot and desiccation. The numeric value can be a continuous value between 0 and 1 indicating a severity of the rot and desiccation.

As yet another example, identifying, by the computing system and for each of the food items, a quality level of the food item can include determining, based on applying a shelf-life trained model to the image data, a ripeness and remaining shelf life of the food item, and assigning, based on the determined ripeness and remaining shelf life, the quality level score of the food item. The quality level score can be a numeric value that can indicate a number of days remaining until peak ripeness of the food item.

In some implementations, identifying, by the computing system and for each of the food items, a quality level of the food item can include determining, based on applying a produce grade trained model to the bounding box portions of the image data that contain each of the food items, a grade of the food item. The grade can be based on USDA specifications, color distribution, shape of the food item, and size of the food item. The method can also include assigning, based on the grade, the quality level score of the food item. The score can be a string value that can indicate an assessment of at least one of the grade, the color distribution, the shape, and the size of the food item. In some implementations, the string value that indicates the assessment of the grade can be at least one of "fancy," "extra fancy," "not fancy," "good," "okay," and "bad." Moreover, the string value that indicates the assessment of the color distribution can be at least one of "well colored" and "poorly colored." Sometimes, the string value that indicates the assessment of the shape can be at least one of "well formed" and "poorly formed." In some implementations, the string value that indicates the assessment of the size can be at least one of "well sized" and "poorly sized."

As another example, identifying, by the computing system and for each of the food items, a quality level of the food item can include determining, based on applying a size trained model to the bounding box portions of the image data that contain each of the food items, a size of the food item, and assigning, based on the size, the quality level score of the food item. The score can be a numeric value that can indicate whether the food item fits into standard bin sizes of other food items of the same type as the food item.

As another example, identifying, by the computing system and for each of the food items, a quality level of the food item can include determining, based on applying a shape trained model to the bounding box portions of the image data that contain each of the food items, a shape of the food item, and assigning, based on the shape, the quality level score of the food item. The score can be a numeric value that can indicate a bend radius of the food item.

As yet another example, identifying, by the computing system and for each of the food items, a quality level of the food item can include determining, based on applying a ripening coating trained model to the bounding box portions of the image data that contain each of the food items, a (i) presence, (ii) coverage, and (iii) thickness of a ripening coating on the food item, and assigning, based on (i)-(iii), the quality level score of the food item. The score can be at least one of a binary inference and a numeric value of pixels in the bounding box portions of the image data that contain each of the food items that indicates the presence, coverage, and thickness of the ripening coating on the food item.

In some implementations, identifying, by the computing system and for each of the food items, a quality level of the food item can include determining, based on applying dry matter trained model to the bounding box portions of the image data that contain each of the food items, dry matter content of the food item, and assigning, based on the dry matter content, the quality level score of the food item. The score can be a numeric value that can indicate a quantity of the dry matter content of the food item.

As another example, identifying, by the computing system and for each of the food items, a quality level of the food item can include determining, based on applying a firmness trained model to the bounding box portions of the image data that contain each of the food items, a firmness of the food item, and assigning, based on the firmness, the quality level score of the food item, which can be a numeric value. In some implementations, identifying, by the computing system and for each of the food items, a quality level of the food item can include determining, based on applying a Brix trained model to the bounding box portions of the image data that contain each of the food items, sugar levels of the food item, and assigning, based on the sugar levels, the quality level score of the food item, which can be a numeric value that can indicate sugar content of the food item in Brix.

In some implementations, identifying, by the computing system and for each of the food items, a quality level of the food item can also include determining, based on applying a nutrition trained model to the bounding box portions of the image data that contain each of the food items, nutritional content of targeted compounds in the food item, and assigning, based on the nutritional content of the targeted compounds, the quality level score of the food item, which can include a list of concentrations of the nutritional content of the targeted compounds in the food item.

In some implementations, identifying, by the computing system and for each of the food items, a quality level of the food item can include identifying, based on applying a product identifier trained model to the bounding box portions of the image data that contain each of the food items, a product label on the food item, decoding, using optical character recognition (OCR), at least one of text and a product identifier on the product label, and assigning, based on the decoded product label, the quality level score of the food item. The score can be a string value that can include at least one of the decoded text and the product identifier.

As another example, identifying, by the computing system and for each of the food items, a quality level of the food item can include determining, based on applying a pucker trained model to the bounding box portions of the image data that contain each of the food items, a pucker of the food item, and assigning, based on the pucker, the quality level score of the food item. In some implementations, identifying, by the computing system and for each of the food items, a quality level of the food item can also include determining, based on applying an acidity trained model to the bounding box portions of the image data that contain each of the food items, an acidity level of the food item, and assigning, based on the acidity level of the food item, the quality level score of the food item, which can be a numeric value that can indicate a level of acidity of the food item.

In some implementations, identifying, by the computing system and for each of the food items, a quality level of the food item can include calibrating colors of the image data to maintain color consistency in the image data, obtaining color samples for each food item in the calibrated bounding box portions of the image data, mapping the color samples into a multi-dimensional color space, identifying a direction of maximal color change across all of the color samples, predicting a location of the maximal color change along the identified direction for the food item, the location of the maximal color change being a one-dimensional quality metric for the food item, and identifying the quality level of the food item as good quality based on determining that the one-dimensional quality metric for the food item is within a threshold quality range.

In some implementations, the modified supply chain information includes instructions that, when executed by the one or more supply chain actors, cause the food item to be moved for outbound shipment to end-consumers that are geographically closest to a location of the food item. As another example, the quality level score for the food item can be an overall quality metric for the food item and the overall quality metric can be determined by: accessing, from a data store, rule-based mappings of (i) different ranges of values for scores corresponding to identification of the first and second quality features to (ii) enumerated categories of food item quality, the enumerated categories of food item quality including at least one of salable, unsalable, edible, nonedible, good quality, bad quality, and okay quality, iteratively determining, for each of the first and second quality features, whether respective rule-based mappings are met, identifying, based on the respective rule-based mappings being met, an enumerated category of food item quality for the food item, and assigning the identified category to the food item as the overall quality metric for the food item.

In some implementations, identifying, by the computing system and for each of the food items, a quality level of the food item can include: assigning, based on applying a wrinkle analyzer model to each of the bounding box portions of the image data that contain each of the food items, a binary value indicating whether wrinkles are present or absent on a surface of the food item represented in the bounding box portion, determining, a percentage of wrinkle coverage on the surface of the food item represented by the bounding box portions of the image data based on (i) summating a quantity of the bounding box portions that are assigned a binary value indicating that wrinkles are present on the surface of the food item represented in the corresponding bounding box portions and (ii) dividing the summation by a total quantity of the bounding box portions of the image data, and assigning, based on the determined percentage of wrinkle coverage satisfying threshold wrinkle criteria, the quality level score of the food item, the score being a binary value indicating whether wrinkles are present on or absent from the surface of the food item. As another example, identifying, by the computing system and for each of the food items, a quality level of the food item can include: determining, based on applying a calyx browning-trained model to the bounding box portions of the image data that contain each of the food items, a median color value of the food item, and assigning, based on the median color value of the food item, the quality level score of the food item. The quality level score can be assigned (i) a string value of "good" based on the median color value being less than a first threshold color range, (ii) a string value of "ok" based on the median color value being greater than the first threshold color range and less than a second threshold color range, and (iii) a string value of "bad" based on the median color value being greater than the second threshold color range.

In yet some implementations, identifying, by the computing system and for each of the food items, a quality level of the food item can include: determining, based on applying a banana stage analyzer-trained model to the bounding box portions of the image data that contain each of the food items, a color value of the food item, and assigning, based on mapping the color value of the food item to expected threshold color values for a plurality of ripeness stages, the quality level score of the food item. The quality level score can be a string value indicating a current ripeness stage of the food item. In yet some implementations, identifying, by the computing system and for each of the food items, a quality level of the food item can include: extracting, based on applying an object detection model to the bounding box portions of the image data that contain each of the food items, a stem of the food item, determining, based on applying a cherry stem color-trained model to the extracted stem of the food item, a median color value of the stem of the food item, and assigning, based on the median color value of the stem of the food item, the quality level score of the food item. The quality level score can be assigned (i) a string value of "good" based on the median color value being within a first threshold color range, (ii) a string value of "ok" based on the median color value being within a second threshold color range that does not include the first threshold color range, and (iii) a string value of "bad" based on the median color value being within a third threshold color range that does not include at least the first threshold color range.

One or more embodiments described herein can include a system for determining quality levels for food items using image data, the system including one or more imaging devices that can to measure image data for food items of a same food type, and at least one computing system that can perform the abovementioned method and additional features.

One or more embodiments described herein can also include a system for determining quality levels for food items using image data, the system including a photobox and at least one computing system. The photobox can have first, second, third, and fourth walls and a ceiling. The photobox can include an opening on the first wall that can receive a flat containing food items of a same food type, a flap that can cover the opening to prevent ambient light from entering the photobox, at least one light that can be inside the photobox that can provide consistent lighting to illuminate the flat containing the food items, and one or more imaging devices attached to the ceiling of the photobox that can capture image data of the food items on the flat. The at least one computing system can perform the abovementioned method.

In some implementations, the embodiments described herein can include one or more of the abovementioned features as well as the following features. For example, the at least one light can be an LED light. The photobox further can include a camera rig that can extend across the ceiling of the photobox. The camera rig can include three tubes connected at a tee connector. A first tube can extend from the tee connector to the first wall, a second tube can extend from the tee connector to the second wall, the second wall being opposite the first wall, and a third tube can extend from the tee connector to the third wall, the third tube being perpendicular to the first and second tubes. In some implementations, the one or more imaging devices can be mounted to the camera rig proximate the tee connector and along at least one of the three tubes. Moreover, the one or more imaging devices can be at least one of an RGB camera, a hyperspectral imaging device, a thermal imager, an MRI scanning device, and an NMR imaging device.

The disclosed technology may provide one or more of the following advantages. For example using machine learning trained models, food item quality can be more accurately determined from subtle differences that appear in image data. The human eye may be prone to error in trying to observe subtle changes in appearance of food items and cannot detect non-visible features of the food items. For example, the human eye may not be able to notice a slight discoloration on a portion of an apple, which can indicate early signs of rot or other poor quality features. Moreover, human workers would have to be trained to visually measure color, quality, size, and shape of food items in a quantitative way. This can be a tedious, time-consuming process and may be subject to human bias. The disclosed technology provides for automatically and accurately detecting different quality features in a food item from a high quality labeled and/or unlabeled image data set(s). The disclosed technology provides for analyzing quality of food items beyond just the visible spectrum and colors, all of which may be challenging or impossible for the human eye to observe and analyze. The disclosed technology therefore can provide for deeper analysis, increasing efficiency and reducing human error that may occur from observing visual features of food items.

As another example, the disclosed technology can be used to make appropriate supply chain modifications early enough in the supply chain lifecycle to reduce food item-based waste. Food item quality can be assessed at any point throughout the supply chain. For example, quality can be assessed before the food item is shipped from farm to storage facility. Quality can also be assessed once the food item arrives at the storage facility. In some implementations, quality can even be assessed once on shelves at a grocery store and available to consumers. When food item quality is assessed early in the supply chain lifecycle, the food item can be more appropriately sorted based on the identified and/or projected quality of such food item. For example, a food item that is identified as being good quality upon entering a storage facility can be stored for a longer period of time in the facility than a food item that is identified as being poor quality. Improved decisions can also be made about how and when to treat or otherwise ripen food items. For example, a food item that is identified as beginning to ripen while it is in transit from storage facility to store can be treated with a product intended to facilitate the ripening process. As another example, if one or more food items are determined to not satisfy a threshold level of quality, then the disclosed technology can determine that an appropriate supply chain modification is to initiate application of anti-microbial treatment to the food items. Consumption time-frames can also be determined, which can impact when food items are delivered to grocery stores and for how long the food items remain in storage.

Similarly, quality metric scores that are determined using the disclosed technology can be advantageous for retailers to identify return on investments (ROIs) for the food items. The quality metric scores can be used by retailers to determine which food items to order, which food items to put out on the shelves for customers, and/or how to price different food items. Thus, the disclosed technology can be used to monitor quality of food items throughout the supply chain.

As described throughout, the disclosed technology can generate more robust quality assessments of food items. Different models can be generated and trained using machine learning techniques and high quality labeled training data sets in order to identify and score different quality features associated with different food items. Thus, the models can be trained to identify features that otherwise may be difficult for human workers to observe and to associate such features with quality of the food item. One or more models can be selected per food item and executed in series, such that each model can generate quality assessments that build upon quality assessments of previously executed models. As an example, a first model executed in series can determine a color score for a particular food item. The color score can then be used as input to a second model executed in series that determines a shelf-life prediction score. The shelf life prediction score can be determined based on the color score. Additional models can also be executed in series. As an illustrative example, color analysis can be performed for limes using multiple models executed in series. First, a model can be executed that identifies, in image data, all limes that are rotten and/or desiccated. A second model can then perform color analysis on the limes that are not rotten and/or desiccated. After all, for these limes, color can be a determining factor as to whether they are of high enough quality. As another illustrative example, avocado ripeness can be determined using multiple models executed in series. First, a model can be executed to detect stem rot and other defects, such as vascular browning. A second model can then be executed to classify the avocados as good or bad based on the detected stem rot and other defects from the first model. Such robust quality assessments can be advantageous to more accurately monitor the food item quality and modify the supply chain.

As yet another example, the disclosed technology provides for assessing quality of food items in a nondestructive way. Since models are trained to analyze quality characteristics of food items from image data, humans may not have to perform destructive techniques such as puncturing the skin or flesh of food items to determine their quality. As a result, food items that are delivered to end consumers may be tested and assessed for quality without actually reducing the quality of such food items. The models are therefore trained to extract quality features from image data of the food items instead of requiring a human to destroy or otherwise alter the food items before they are delivered to end consumers. Higher quality food items can be delivered to end consumers and food items may not go to waste when the disclosed techniques are used for assessing food item quality.

The details of one or more implementations are set forth in the accompanying drawings and the description below. Other features and advantages will be apparent from the description and drawings, and from the claims.

BRIEF DESCRIPTION OF THE DRAWINGS

FIG. 3 is a flowchart of a process for generating models to determine different quality features in a food item.

FIGS. 4A-B is a flowchart of a process for determining food item quality using the models during runtime.

FIG. 5 is another flowchart of a process for assessing quality of one or more food items.

FIG. 23 is a flowchart of a process for determining an overall quality metric for a food item.

DETAILED DESCRIPTION

The present disclosure is directed towards systems, methods, and computer programs for assessing quality of one or more food items from image data. The disclosed technology can provide for obtaining image data of one or more food items and determining, based on an evaluation of the image data, quality scores for each of the food items represented in the image data. Models can be trained using machine learning techniques to process the image data and determine quality scores for different quality metrics. As described herein, different quality metrics can be modeled and determined based on food item and/or food item type. The models can be dynamically selected based on a type of food item depicted in the image data and then executed in series to develop accurate quality assessments of such food item. Moreover, the disclosed technology can provide for modifying one or more supply chain operations based on quality assessments of the food items in an effort to mitigate losses that may arise from food items having a level of quality that fails to satisfy certain thresholds.

Figure 1A:
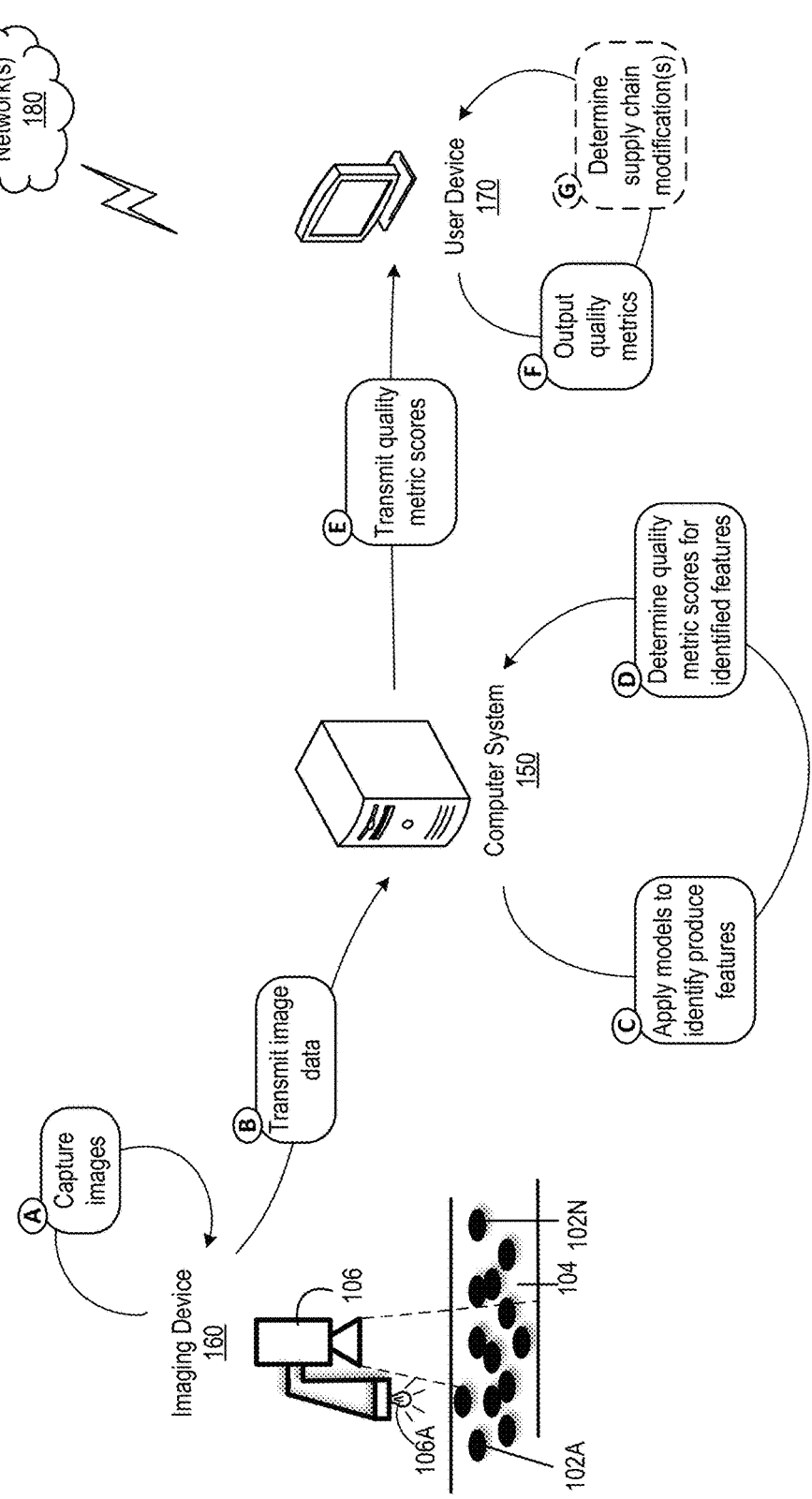
FIG. 1A is a conceptual diagram of determining food item quality based on image data.

Referring to the figures, FIG. 1A is a conceptual diagram of determining food item quality based on image data. A computer system 150, imaging device 160, and user device 170 can be in communication (e.g., wired and/or wireless) via network(s) 180. The computer system 150 can be configured to assess quality of imaged food items, such as produce, as described throughout this disclosure (e.g., refer to FIGS. 1C, 6). The imaging device 160 can include an image sensor 106 and at least one light source 106A (e.g., refer to FIG. 1C). The imaging device 160 can be placed in a storage facility or any other location along a supply chain. For example, the imaging device 160 can be a handheld device, such as a mobile phone or tablet, that can be used by a human user to capture images of food items. As depicted in FIG. 1A, the imaging device 160 can be positioned over a conveyor belt 104 in a storage facility. Refer to FIG. 7 for an alternative imaging device 160 configuration.

The imaging device 160 can be configured to continuously capture image data of produce 102A-N as it is moved along the conveyor belt 104 to one or more storage locations or other destinations within the storage facility (A). The produce 102A-N can be fruits like avocados or other food items that can be entering a storage facility. For example, the produce 102A-N can be received at the storage facility from a shipping vendor and loaded onto the conveyor belt 104. The produce 102A-N can be in cases, containers, on pallets, and/or placed directly on the conveyor belt 104. In some implementations, as described further in reference to FIG. 7, the produce 102A-N may be static or otherwise not being moved on the conveyor belt 104 in the storage facility. For example, some of the produce 102A-N can be sampled randomly and placed inside a photobox (e.g., refer to photobox 700 in FIG. 7). Cameras positioned in the photobox can capture image data of the produce 102A-N, which can then be analyzed by the computer system 150 to obtain an estimation of quality distribution of a batch of the produce 102A-N.

The imaging device 160 can transmit the image data to the computer system 150 (B). The computer system 150 can then apply one or more models to the image data in order to identify features of the produce 102A-N(C). The features can indicate a quality of the produce 102A-N. As described herein, the models can be trained using machine learning techniques to identify particular features of different food items. The computer system 150 can select one or more models to apply in (C) based on the type of produce 102A-N identified in the image data. Moreover, as described throughout this disclosure, the computer system 150 can apply the models to each of the produce 102A-N identified in the image data.

The computer system 150 can then determine quality metric scores for each of the identified features for each of the produce 102A-N in the image data (D). In some implementations, the computer system 150 can determine an aggregate quality score for each of the produce 102A-N based on quality metric scores that are determined for each of the identified features. The computer system 150 can transmit the quality metric scores to the user device 170 (E). For example, the computer system 150 can transmit each quality metric score for each of the produce 102A-N in the image data. The computer system 150 can transmit only some quality metric scores for each of the produce 102A-N. The computer system 150 can transmit quality metric scores for only some of the produce 102A-N. In some implementations, the computer system 150 can transmit only an aggregate quality metric score for each of the produce 102A-N.

In some implementations, the computer system 150 can also transmit the quality metric scores to a database for storage. The quality metric scores can be stored with other historical measurements and additional metadata associated with each of the produce 102A-N. This stored information can be used in a feedback loop for continuous improvement and training of the machine learning models that are used to perform the techniques described herein. For example, using previously determined quality metric scores, one or more higher level models can be improved and/or trained to identify quality metrics that depend on seasonality, variety, size, country of origin, and other factors.

The user device 170 can output the quality metrics and corresponding scores (F). The user device 170 can be a mobile device, smartphone, tablet, laptop, or other computer that can be used by a relevant stakeholder in the supply chain. The stakeholder can view the quality metrics and scores for each of the produce 102A-N in order to understand or analyze a return on investment (ROI) for the produce 102A-N. The outputted metrics and scores can also be used by the stakeholder to monitor quality of the produce 102A-N over time and optionally make one or more supply chain modifications based on the current and/or projected quality of the produce 102A-N.

In some implementations, the stakeholder can provide user input at the user device 170 indicating a selection of what features or quality metrics to score for the particular produce 102A-N. This input can be received by the computer system 150 and used to select which models to apply to the image data in (C). In some implementations, the stakeholder can also provide input at the user device 170 indicating a selection of what quality metric scores should be received by the user device 170. Thus, the computer system 150 can transmit only the user-desired quality metric scores in (E).

Optionally, the user device 170 can determine one or more supply chain modifications based on the outputted quality metrics and quality scores (G). The user device 170 can automatically determine or otherwise recommend supply chain modifications for one or more of the produce 102A-N based on their corresponding quality scores. In some implementations, the computer system 150 can determine or otherwise recommend supply chain modifications and transmit those recommendations to the user device 170. The stakeholder at the user device 170 can optionally perform, modify, or reject any of the recommended supply chain modifications. In some implementations, the stakeholder can also review the outputted quality metrics and scores and determine supply chain modifications to implement.

Figure 1B:
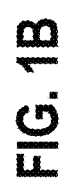
FIG. 1B is a conceptual diagram of generating models to determine different quality features in a food item.

FIG. 1B is a conceptual diagram of generating models to determine different quality features in a food item. As described throughout this disclosure, models can be generated for different food items, different types of food items, and different features associated with particular food items. Therefore, as shown, the computer system 150 can receive produce image data 190. The image data 190 can include digital RGB images, hyperspectral images, and/or multi-spectral images depicting a particular produce, produce type, different produce, different produce types, a single produce, and/or a batch of produce. The produce image data 190 can include images, tables, and/or other data of a particular produce having some particular feature to be modeled, such as rot and desiccation, and images of the same type of produce that does not have the particular feature to be modeled. For example, the produce image data 190 can include tables that are stored in a data store containing features (e.g., rot, desiccation, probability to determine shelf life, etc.) that have been extracted from images of the produce. In some implementations, the produce image data 190 can include images of an exterior of the produce and/or an interior of the produce. In some implementations, the produce image data 190 can include images of a particular produce at different stages of ripeness and between stages of ripeness. The produce image data 190 can be a robust collection of training data indicating a plurality of different features that may exist and/or develop for the particular produce throughout the produce's lifecycle. The produce image data 190 can also be a collection of images of the same produce from different angles, such that the entire produce can be analyzed fully using the techniques described herein. Moreover, in some implementations, the produce image data 190 can include labels for features, conditions, and/or qualities of the produce. In yet some implementations, such features, conditions, and/or qualities of the produce can be learned using produce image data 190 that does not include labels.

The computer system 150 can receive the image data 190 (A). The image data 190 can be received from one or more imaging devices, such as the imaging device 160 described throughout this disclosure (e.g., refer to FIGS. 1A, 1C). The computer system 150 can identify features of the produce from the image data (B). The computer system 150 can identify features indicative of a quality of the produce. For example, the computer system 150 can identify color of the produce, rot, mold, different types of texture, bruising, etc. from RGB image data. The computer system 150 can also identify other features, such as firmness and dry matter content, from hyperspectral image data. As described further throughout this disclosure, the identified features can be labeled (e.g., refer to FIG. 3).

The computer system 150 can then generate machine learning models for the identified features (C). In some implementations, the models can be generated and/or trained by one or more other computing systems, computers, networks of devices, and/or cloud-based services. The models can, for example, be trained by a remote computer system, stored in a data store, and accessible and executed by the computer system 150. The models can be generated using machine learning techniques, including but not limited to CNNs. One or more other machine learning techniques can be used to generate and train the models. The computer system 150 can generate a model for each of the identified and labeled features. Thus, each model can be trained to identify a particular feature from image data of the same type of produce during runtime use (e.g., refer to FIGS. 3, 6). Each model can also be trained to score a quality of the produce based on the identified feature. As an example, one model can be trained to identify and score a particular change in color for apples. Another example model can be trained to identify and score a change in texture on skin of avocados. Another illustrative model (e.g., computer vision model) can be trained to identify and score bruising in one or more different types of food items. Another illustrative model can be trained to identify and score firmness of one or more different types of food items. As another example, a model can be trained to identify and score dry matter content. Another illustrative model can be trained to identify firmness, bruising, and/or dry matter content based on analysis of HSIs.

Another illustrative model can be trained to determine produce quality based on temperature of the imaged produce. Thermal images, for example, can be used to assess the temperature of the produce. Some produce may go bad if their temperature is out of an acceptable range of temperatures for that produce. Furthermore, thermal images can be used to verify that produce has dried correctly after application of a shelf-life extension coating solution. To obtain optimal, preferred, or beneficial performance of the shelf life extension coating solution, the fruit should be fully dry after the application process. Additional models can be trained to score features that are identified by the models as described above (e.g., refer to FIG. 1C, 6). The generated models can then be outputted by the computer system 150 (D). During runtime, one or more of the models can be applied to image data to identify and score features indicative of quality in the imaged produce.

Figure 1C:
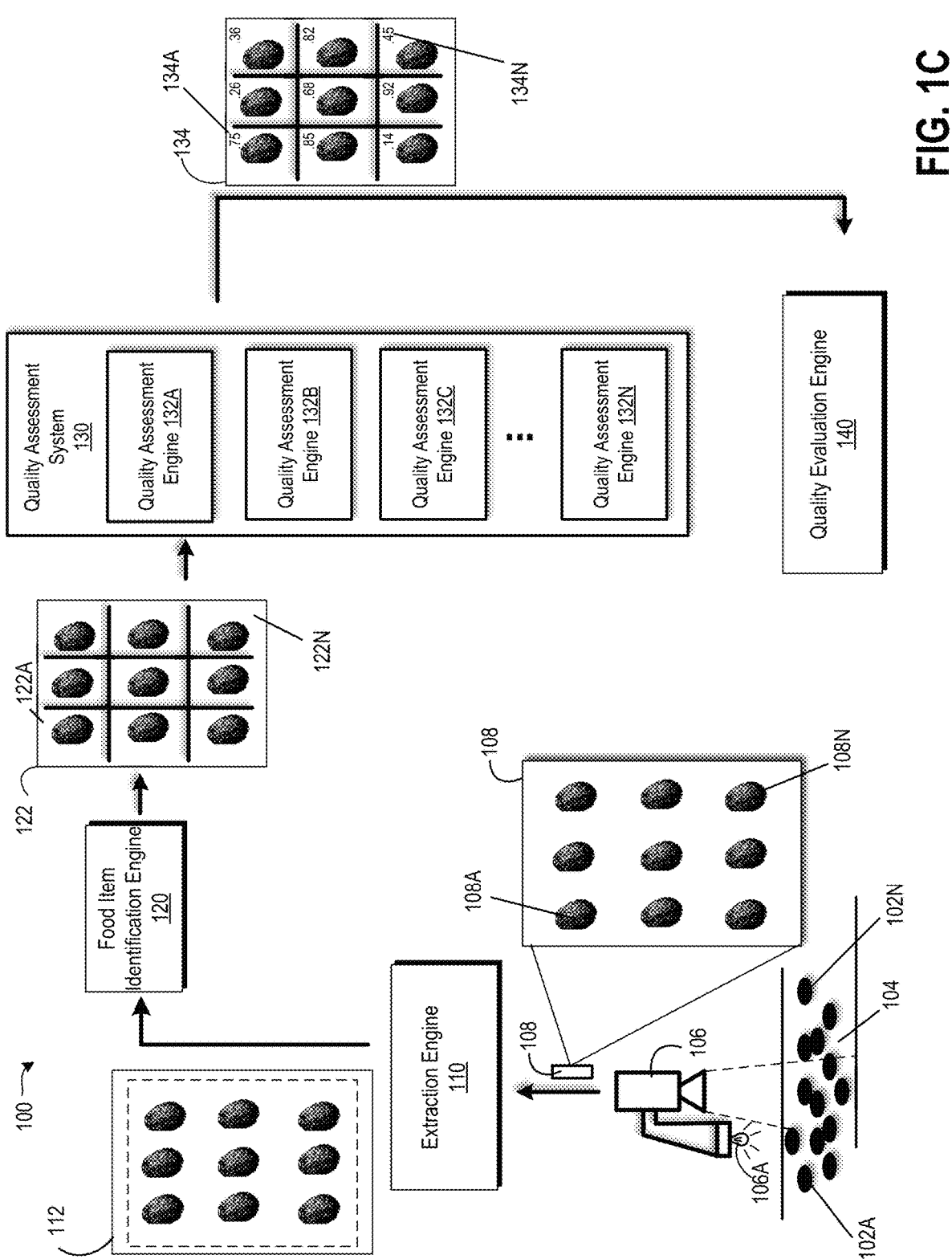
FIG. 1C is a diagram of an example system for assessing quality of one or more food items based on image data.

FIG. 1C is diagram of an example system 100 for assessing quality of one or more food items based on image data. The system 100 can include an image sensor 106, an extraction engine 110, a food item detection engine 120, a quality assessment engine 130, and a quality evaluation engine 140. For purposes of the present disclosure, an "engine" can include one or more software modules, one or more hardware modules, or any combination thereof.

The image sensor 106 can be used to generate image data 108 that represents attributes of food items 102A-N, where N is any positive integer number greater than 0 and represents a number of food items 102 on conveyor belt 104. In the example of FIG. 1C, the image sensor 106 can be arranged in a manner that enables the image sensor 106 to capture image data 108 that represents one or more images of the food items 102A-N as the food items 102A-N are advanced along the conveyor belt 104. In some implementations, the sensor 106 can include one or more hyperspectral sensors configured to capture hyperspectral data that represents features of the food items 102A-N. In such implementations, each pixel of the hyperspectral image can correspond to a spectrum of infrared or ultraviolet light associated with a corresponding food item imaged by a camera equipped with one or more sensors operating in a corresponding spectral range. The spectrum of visible light can also be used to reconstruct RGB images of the food items 102A-N. In some implementations, the sensor 106 can be a low-resolution digital camera (e.g., 5M or less), a high-resolution digital camera (e.g., 5MP or more), or any other type of sensor that can capture image data 108. The sensor 106 can cover a range of 300 nm-1700 nm of the spectrum. One or more other sensors, such as sensors in a hyperspectral camera, can cover wavelengths in a range of 300 nm-2500 nm. One or more other cameras can be used, including but not limited to ultraviolet capturing cameras.

In some implementations, the sensor 106 can include multiple sensors positioned at multiple angles relative to the food items 102A-N. For example, the sensor 106 can include a first camera and at least one additional second camera that each capture image data 108 of the food items 102A-N from different perspective angles. In such configurations, the one or more additional cameras can be used to generate image data 108 based on different or additional wavelengths of light than the wavelengths of light captured by the first camera. In general, any set of wavelengths of light can be obtained by the sensor 106.

Each particular camera of the one or more cameras can be configured to detect the different or additional wavelengths of light in a number of different ways. For example, in some implementations, different sensors can be used in different cameras in order to detect different or additional wavelengths of light. Alternatively, or in addition, each of the one or more cameras can be positioned at different heights, at different angles, or the like relative to each other in an effort to capture different wavelengths of light. In some implementations, one or more cameras can be positioned, at least in part, to capture portions of the food items 102A-N that may be obscured from a view of the first camera.

In some implementations, one or more light sources 106A can be used to illuminate the food items 102A-N so that image sensor 106 can capture clearly image data 108 of the food items 102A-N. The light source 106A can include one or more light sources that each produce a same or different electromagnetic radiation. In this example, the light source 106A is depicted as being affixed to the image sensor 106. In some implementations, the light source 106A can be positioned in one or more locations in a vicinity of the image sensor 106 in order to illuminate the food items 102A-N before and/or during capture of the image data 108. In some implementations, the one or more light sources 106A can be selected based on a frequency of the electromagnetic radiation output. For example, in some implementations, the light source 106A can be a halogen light source. Alternatively, or in addition, the one or more light sources 106A can be a diode or series of diodes of broadband light-emitting diodes (LEDs) that can be used to provide light across the visible wavelength spectrum, near infrared wavelength spectrum, electromagnetic spectrum, or any other spectrum of light. In general, any light source can be used to provide any type of light for the image sensor 106.

In some implementations, the one or more light sources 106A, or a control unit of the one or more light sources 106A, can be communicably connected to the image sensor 106, or a control unit of the image sensor 106. For example, the image sensor 106, or the control unit of the image sensor 106, can send a signal to the one or more light sources 106A, or the control unit of the one or more light sources 106A, that cause the light sources 106A to illuminate the food items 102A-N with one or more specific wavelengths of light at a specific power and/or at a specific moment in time. In some implementations, the specific moment in time can be a predetermined amount of time before, or during, capturing of the image data 108.

The image data 108 generated by the image sensor 106 can be provided as an input to the extraction engine 110. The image data 108 can include one or more images of the food items 102A-N. Such images can also include one or more HSIs. In some implementations, the image sensor 106 can directly provide the image data 108 to the extraction engine 110. The extraction engine 110 can then process the image data 108. In some implementations, the image sensor 106 can store the image data 108 in a data store and/or memory device. Then the extraction engine 110 can access the data store and/or memory device to obtain and process the image data 108.

The extraction engine 110 can obtain/receive the image data 108. As shown in FIG. 1C, the image data 108 can be one image of a plurality of the food items 102A-N. Thus, the image data 108 can be made up of a plurality of images 108A-N, where each of the images 108A-N corresponds to a food item 102A-N. The image data 108A-N can include a depiction of n food items 102A-N. The image data 108A-N can also include a portion of an environment surrounding the food items 102A-N, such as the conveyor belt 104 or a portion of a food processing facility (e.g., the photobox 700 described in FIG. 7). The extraction engine 110 can process the obtained image data 108 and extract a portion 112 of the image data 108, as described throughout this disclosure. As shown, the extracted portion 112 can include the food items 102A-N without the surrounding environment. In some implementations, the extracted portion 112 may only include one of the food items 102A-N.

The extracted image portion 112 (referred to herein as the extracted image 112) of the image data 108 can be provided as an input to a food item identification engine 120. In some implementations, the extraction engine 110 may directly provide the extracted image 112 to the food item identification engine 120. In some implementations, the extraction engine 110 may store the extracted image 112 in a memory device and then the food item identification engine 120 can access the memory device.

The food item identification engine 120 can use one or more object recognition algorithms and techniques to recognize portions of the extracted image 112 that correspond to the food items 102A-N. As an illustrative example, the food items 102A-N can be avocados. The food item identification engine 120 can be trained on a plurality of images of avocados to determine, from the extracted image 112, whether or not one or more avocados are depicted and what regions of the extracted image 112 include the avocados. Thus, the food item identification engine 120 can be trained to determine bounding boxes around each of the food items 102A-N in the extracted image 112. The engine 120 can also be trained to produce output data in the form of an annotated image 122 of the food items 102A-N. In producing the annotated image 122, the engine 120 can be configured to annotate or otherwise index each of the bounding boxes 122A-N representing each of the food items 102A-N. As described throughout this disclosure, machine learning trained models can then be applied to each of the bounding box regions 122A-N in order to determine quality metric scores for each of the food items 102A-N. As described throughout this disclosure, the system 100 can be used to assess quality of different types of food items, including but not limited to citrus fruits, mangos, apples, berries, stone fruits, tomatoes, meat, and/or vegetables.

In some implementations, the annotated image 122 can include a coordinate system to annotate or index locations of each of the food items 102A-N. Numerical values, such as x and y values in an x and y coordinate system, can be used to represent locations of the food items 102A-N in the annotated image 122. Subsequent processing steps can use the numerical values that represent the locations of the food items 102A-N to determine outer boundaries of each of the food items 108A-N.

The annotated image 122 generated by the food item identification engine 120 can be provided as an input to a quality assessment system 130. In some implementations, the food item identification engine 120 may directly provide the annotated image 122 to the quality assessment system 130. In other implementations, the food item identification engine 120 may store the annotated image in a memory device and then the quality assessment engine 130 can access the memory device to obtain and process the annotated image 122.

The quality assessment engine 130 can be configured to determine quality metric scores for each of the food items 108A-N depicted in the annotated image 122. As described throughout this disclosure, the engine 130 can use one or more machine learning trained models to determine the quality metric scores. Each of the models can be trained to identify different features indicative of quality for the food items 108A-N. For example, each model can be executed by different quality assessment engines 132A-N. Each quality assessment engine 132A-N can be configured to perform a particular quality assessment operation on the annotated image 122 for each of the food items 108A-N. The annotated image 122 can be processed by the engines 132A-N in series. This can be advantageous so that each of the engines 132A-N can develop more robust and accurate quality assessments for the food items 108A-N based on quality assessments made by previous engines 132A-N. In some implementations, the annotated image 122 can also be processed by the engines 132A-N in parallel.

As described throughout this disclosure, the quality assessment engines 132A-N can each perform different quality assessment operations. In some implementations, all of the engines 132A-N can be executed in series. In some implementations, less than all of the engines 132A-N can be executed in series. For example, a particular set of the engines 132A-N can be selected based on a type of the food items 108A-N in the annotated image 122. Moreover, in some implementations, one or more of the engines 132A-N can be selected to be executed but based on quality assessments made by some of the engines 132A-N, others of the engines 132A-N may not be executed. For example, if the engine 132A determines that an apple is of poor quality because it has browned, then the engine 132B may not need to be executed—the quality of the apple has already been identified as poor. In some implementations, one or more of the engines 132A-N can be executed in parallel. Executing in parallel can be advantageous to reduce an amount of time needed to process the annotated image 122 and perform multiple quality assessments of the food item depicted therein.

In some implementations, the set of quality assessment engines 132A-N can be configured based on a type of food items 108A-N being analyzed. In some implementations, the set of quality assessment engines 132A-N can be configured based on business practices of a business entity implementing system 100. In some implementations, the set of quality assessment engines 132A-N can be dynamically selected, using a computing device (e.g., refer to the user computing device 170 in FIG. 1A), by an end user, based on quality preferences that the end user is interested in identifying.

Since the engines 132A-N can be arranged in series and/or in parallel, output data generated by each quality assessment engine 132A-N can be analyzed, and if the output data for any of the serially arranged engines 132A-N fails to satisfy a predetermine quality threshold, then the quality assessment system 130 can generate output data indicating that the depicted food item(s) 108A-N is of poor quality.

A quality evaluation engine 140 can be configured to evaluate overall quality of the food items 108A-N based on quality metric scores that are determined by the engines 132A-N. For example, the engine 140 can determine an aggregate quality of each of the food items 108A-N. The engine 140 can also determine an aggregate quality of a batch of the food items 108A-N. The engine 140 can also determine one or more supply chain modifications based on each of the quality metric scores determined by the engines 132A-N. As an illustrative example, if the quality assessment engine 132A measures internal quality and the engine 132A generates output indicating that there is rot in one or more of the food items 108A-N, then the quality evaluation engine 140 can trigger operations that cause the one or more food items 108A-N to be discarded. By way of another example, if the engine 132B measures shelf-life and the engine 132B generates output indicating that one or more of the food items 108A-N have a shortened shelf life, then the quality evaluation engine 140 can trigger an update to a distribution plan for the one or more food items 108A-N such that the food items 108A-N are distributed and sold before their shelf life expires. For example, the quality evaluation engine 140 can generate instructions that cause the one or more food items 108A-N to be delivered to a vendor that is closer in geographic location to a facility housing the food items 108A-N in order to reduce an amount of time that the one or more food items 108A-N are in transit. Alternatively, or in addition, the one or more food items 108A-N with limited shelf life can be directed to a refrigeration unit in order to preserve the life of the food items 108A-N. Numerous other example operations can be determined and performed based on quality metric scores that are determined by the engines 132A-N (e.g., an engine can provide quantitative means for differentiating different batches of food items based on aggregate quality scores).

As described throughout this disclosure, the quality metric scores generated by the engines 132A-N can be numeric, binary, and/or Boolean values. The scores can be numeric values on predefined scales. The scores can also be values such as "good," "bad," "poor," "ok," "excellent," "moderate," "sufficient," etc. As another example, output data can be a vector of one of two different values for each depicted food item 108A-N that provides an indication a quality pass or a quality fail for each food item 108A-N. An overall quality score can also be determined for each depicted food item 108A-N based on the vector of scores that are outputted by the engines 132A-N. One or more different values can be defined based on the supply chain and/or practices of relevant stakeholders in the supply chain.

In some implementations, overall quality scores 134A-N can be generated for each of the food items 108A-N in an output image 134. The overall quality scores 134A-N can be viewed by a relevant stakeholder in the supply chain. The stakeholder can view the scores 134A-N and determine one or more modifications to the supply chain. The quality metric scores generated by the engines 132A-N can also be outputted in one or more other forms for review by the relevant stakeholders. For example, the scores can be outputted as a vector for each of the food items 108A-N.

Figure 2:
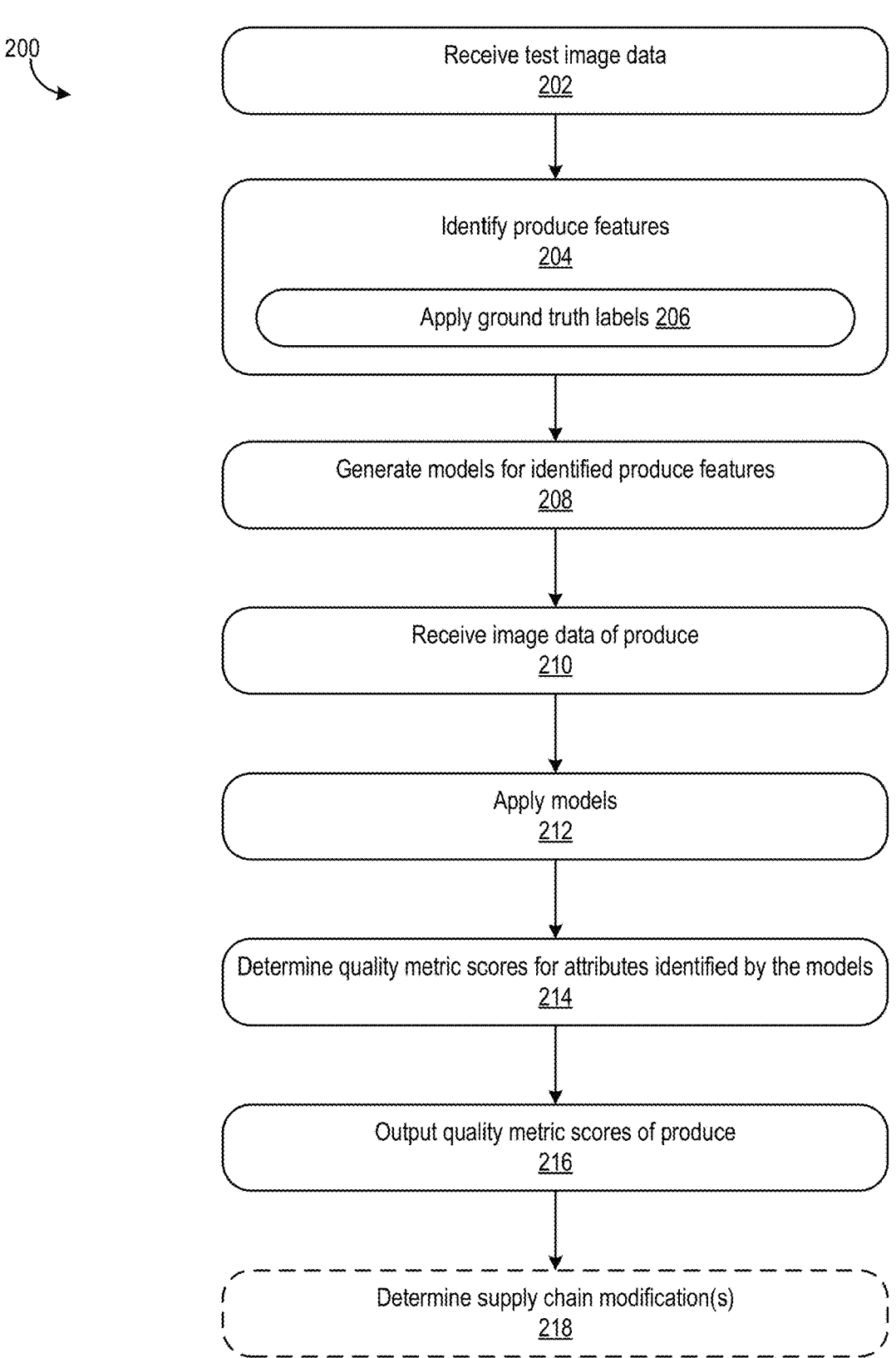
FIG. 2 is a flowchart of a process for determining food item quality based on image data.

FIG. 2 is a flowchart of an overview process 200 for determining food item quality based on image data (e.g., refer to FIG. 1A). The process 200 can be performed by the computer system 150. The process 200 can also be performed by one or more other computing systems, devices, and/or servers.

Referring to the process 200, the computer system 150 can receive image data in 202. As described throughout, the image data can be received from an imaging device. The image data can also be retrieved from a database, data store, or other repository storing image data of a particular produce. The image data can include images of the particular produce whose quality is supposed to be determined based on different features visible from the image data. The image data can also include images of the produce whose quality can be determined based on non-visible features. Such features can be learned from the image data, such as dry matter.

The computer system 150 can then identify features of the produce in 204. As part of identifying the features, the computer system 150 can apply ground truth labels to the image data in 206. Features such as rot, mold, ripeness, desiccation, etc. can be identified from the image data and labeled accordingly. Some features, such as firmness and dry matter may not be visible from the image data and therefore can be labeled using other techniques, such as destructive techniques involving durometers and/or penetrometers.

Models can then be generated for each of the identified produce features in 208. As described throughout, the models can be generated based on color, shape, texture, spectral response (e.g., for multispectral data), anything else that may be visible from the image data, and/or anything else that may not be visible from the image data but may be derived as ground truth measurements that are taken of the produce.

Then, during runtime, the computer system 150 can receive image data of produce in 210. The image data can be captured by the imaging device 160. The computer system 150 can then apply one or more of the generated models in 212. In some implementations, the computer system 150 can select which models to apply based on the image data received in 210. For example, the computer system 150 can identify a type of produce that is captured by the image data using object recognition techniques. The computer system 150 can then retrieve one or more models that are associated with the identified type of produce from a data store or other database that stores the generated models. In some implementations, the computer system 150 can use metadata that is part of the image data about the produce (e.g., country, produce type, etc.) to determine which models to retrieve. The models can be applied in series or in parallel.

The computer system 150 can determine quality metric scores for attributes that are identified by the models in 214. In some implementations, the models can be trained to score the identified attributes. In some implementations, one or more other models or analysis engines can be configured to score the attributes that are identified by the models that are applied in 212. In some implementations, an overall/aggregate quality metric score can also be determined for the produce and based on all of the attributes identified by the models.

The computer system 150 can output the quality metric scores for the produce in 216. As described herein, the scores can be outputted at a user device of a relevant stakeholder in the supply chain for the produce (e.g., refer to FIG. 1A). The quality metric scores can be represented by numeric values, Boolean values, and/or text. For example, the scores can be determined on a scale (e.g., 1 to 100, 1 to 5, etc.). The scale can be determined by the relevant stakeholder in the supply chain. As an example, quality metric scores of 1 can indicate poor quality and scores of 5 can indicate good or high quality. As another example, the scores can be "True" or "False," where "True" can indicate good quality and "False" can indicate poor quality. As yet another example, the scores can include "good quality," "poor quality," "average," "ripe," "over-ripened," or any other descriptive strings that can be used to identify a quality of the produce.

The computer system 150 can optionally determine supply chain modifications in 218. In some implementations, as described in reference to FIG. 1A, the user device and/or the relevant stakeholder can determine supply chain modifications. In some implementations, the computer system 150 can automatically determine and/or implement supply chain modifications. The modifications can be determined based on the quality metric scores for the produce.

In some implementations, the computer system 150 can identify the produce in the image data that is received in 210. Once the produce is identified, the computer system 150 can then proceed with blocks 212-218 in the process 200. To identify the produce, the computer system 150 can use a generic object detection model to find all bounding boxes around produce in the image data. The generic object detection model can be trained to detect any type of produce with high accuracy. The computer system 150 can determine whether produce appears in the image data. If produce does appear in the image data, then the computer system 150 can return all bounding boxes that have produce. The returned bounding boxes can be further processed and analyzed. The returned bounding boxes can then be ordered and processed by the computer system 150 to identify the type of produce in each bounding box. The computer system 150 can utilize a produce analyzer and/or one or more machine learning models that are trained to identify the produce that appears within a bounding box. CNNs and/or image classification models can be used to positively identify the produce within the bounding box. Each of the returned bounding boxes can be processed in a separate job (e.g., in series). In some implementations, the returned bounding boxes can also be processed in parallel. In some implementations, the computer system 150 can identify the produce ahead of time by analyzing metadata associated with the image data. Sometimes, for example, the metadata can indicate what type of produce appears in the image data. Finally, if the produce does not appear in the image data, then no bounding boxes may be returned for further processing and analysis.

FIG. 3 is a flowchart of a process 300 for generating models to determine different quality features in a food item based on image data (e.g., refer to FIG. 1B). As described throughout this disclosure, multiple models can be generated off of a training image data set. Models can be generated to identify different features associated with different food items, different types of food items, and/or different subcategories of food items. The process 300 can be performed by the computer system 150. The process 300 can also be performed by one or more other computing systems, devices, and/or servers.

Referring to the process 300, the computer system 150 can receive image data in 302. The image data can be of a particular produce. The image data can also be collected of treated and untreated produce. The image data can include images of an exterior and/or interior of the produce. The image data can also include a plurality of images of the produce throughout the produce's lifecycle. The image data can include images of produce of the same type.

The computer system 150 can identify a feature of the produce from the image data in 304. For example, object detection techniques can be performed on the image data in order to detect the produce, identify the produce and then perform additional extraction steps to pick out one or more particular features of the produce. Example features can include rot, bruises, desiccation, color, mold, texture, etc. Other example features include non-visible features, including but not limited to firmness, dry matter, brix, etc. Each of the particular features that are extracted from the image data can be labeled.

The computer system 150 can then generate a model for the identified produce feature in 306. The model can be generated using machine learning techniques, such as CNNs. For example, the model can be trained using a CNN to identify the particular feature from the labeled image data. As a result, during runtime, the model can identify the particular feature of produce from image data received during runtime. As another example, Partial Least Squares (PLS) can be used to generate models for assessing spectral data. Such models can be used to determine firmness and/or dry content.

As an illustrative example, image data can be received of limes (302). Using segmentation and analysis techniques, desiccation can be a feature identified by the computer system (304). Image data of the limes that show signs of desiccation can be labeled as desiccated while image data of the limes that do not show signs of desiccation can be labeled as good limes. Using a CNN, a lime desiccation model can be trained to differentiate image data showing desiccation from image data that does not show desiccation (306). For example, the model can be trained to analyze each patch and/or pixel in image data to see whether a lime is present, and if the lime is present, whether the lime appears to show signs of desiccation or not, based on the labeled image data. If the lime appears to show signs of desiccation, the model can be trained to tag or otherwise classify/label the lime in the image data as desiccated. The model can also be trained to tag the lime with other descriptors for desiccation, including but not limited to numeric values, Boolean values, and/or string values.

Next, the computer system 150 can determine whether there are more features of the produce in the image data (308). For example, object detection techniques can be performed again. Using such techniques, one or more additional features of the produce can be extracted from the image data. In the lime example described above, if a first model was generated for a first feature of desiccation, a second model can be generated for a second feature of change in color, and so on. One or more other and/or additional models can be generated for one or more other features that are identifiable from the image data.

If there are additional features, the computer system 150 can return to block 304 and repeat 304-308 for each remaining feature of the produce. Thus, multiple models can be generated based on a collection of image data. Optionally, the computer system 150 may receive additional training image data to generate models to identify additional features of the produce. Generating multiple models can be advantageous to ensure more robust and accurate quality assessment of the produce. After all, each model can be trained to particularly identify and, optionally, score a particular feature of the produce. Each model can be tuned in to identify a particular feature but can also receive, as input, the output of other models. Thus, executing the models in series can be advantageous to build even more robust and accurate quality assessments of the produce.

If there are no additional features to generate models for, the computer system 150 can output the generated models (310). Outputting the generated models can include presenting the models to a user at a user device. The user can then select one or more of the models to be applied during runtime. Outputting the generated models can also include storing the models in a data store or other database. The models can then be retrieved by the computer system 150 during runtime.

Figure 4B:
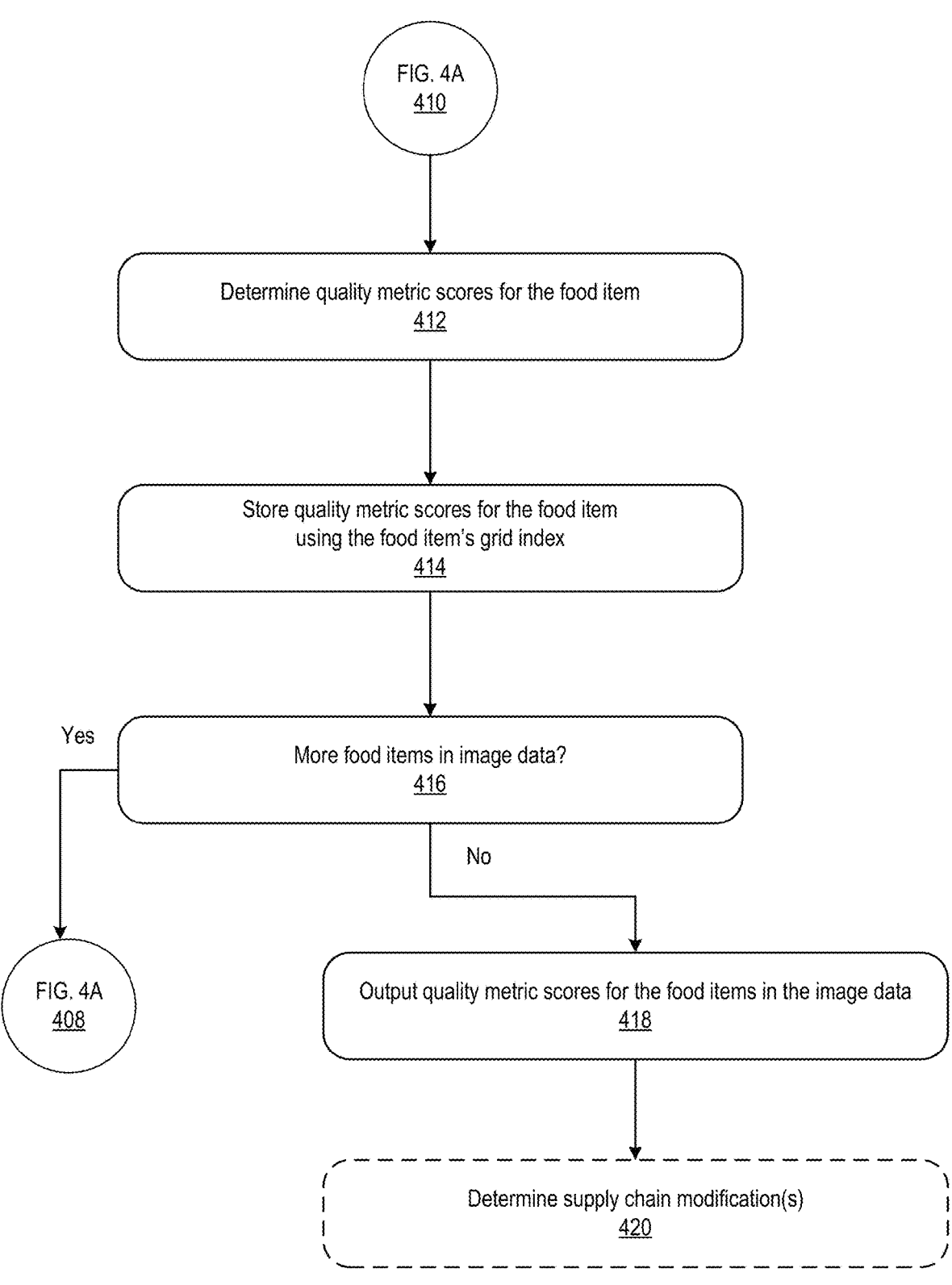

FIGS. 4A-B is a flowchart of a process 400 for determining food item quality using the models during runtime. The process 400 can be performed by the computer system 150. The process 400 can also be performed by one or more other computing systems, devices, and/or servers.

Referring to the process 400 in both FIGS. 4A-B, the computer system 150 can receive image data of food items in 402. The image data can represent multiple food items. In some implementations, the image data can represent only one food item. As described throughout, the image data can be received from one or more imaging devices in an environment along a supply chain (e.g., storage facility). In some implementations, the image data can be received from a user device, such as a mobile phone, smartphone, laptop, and/or tablet. A sensor (e.g., camera) of the user device can be configured to capture an image of the food items. For example, a consumer can use the user device to capture an image of apples in a grocery store. This image data can be transmitted from the user device to the computer system 150 for processing.

The computer system 150 can then perform object detection techniques to identify a bounding box for each food item in the image data (404). The computer system 150 can also identify the bounding box for each food item using a CNN or other machine learning trained model. For example, a deep learning object detector can be trained to identify or otherwise locate all food items that appear in the image data. A bounding box can be generated for each of the identified food items such that feature and quality analysis can be performed on each of the identified food items with respect to their bounding boxes.

The computer system 150 can determine a grid structure based on the bounding boxes in 406. In other words, the computer system 150 can perform indexing and assign indexes to each of the bounding boxes that make up the grid structure of the image data. Each of the identified food items can receive one of the indexes, which can be used for identifying the food item. To determine the grid structure, the computer system 150 can (1) find what appears to most likely represent rows of food items based on a Y height of the bounding boxes and then (2) sort the entire data frame based on an X position. The grid can therefore be determined, and each bounding box within the grid structure can be assigned an index value, which can be used to identify the food item appearing within the bounding box. One or more machine learning trained models can also be used to determine the grid structure and assign the indexes.

Determining the grid structure in 406 and indexing the structure can be advantageous to associate determined quality metric scores with the food items appearing in the image data. After all, each food item can have a different quality score, so each determined quality score should be assigned to the index of the corresponding food item. Moreover, assigning the food items the index values can be advantageous to then correlate additional metrics and data about the particular food item with the quality metric scores determined by the computer system 150. As a result, the computer system 150 can build more robust and accurate quality metric scores for the particular produce.

In some implementations, the grid structure can also be advantageous to facilitate searching through all image data of food items to identify and/or output food items having particular features and/or quality scores. This can be beneficial for training the models described herein to more accurately identify and score quality features. This can also be beneficial for relevant stakeholders in the supply chain who are interested in monitoring the food items and/or analyzing ROIs.

The computer system 150 can select a bounding box for a particular food item depicted in the image data in 408. In other words, the computer system 150 can select one of the food items depicted in the image data to assess using one or more models described herein.

Next, the computer system 150 can apply one or more machine learning trained models in series to the selected bounding box (410). For example, the computer system 150 can pass the bounding box portion of the image data through a CNN model that assesses quality of the food item based on color. As described throughout this disclosure, the computer system 150 can select one or more models to apply to the bounding box and/or food item classification in series. The models can be selected based on a type of the food item, user (e.g., stakeholder) preferences, and/or whatever features may be desired for assessment of the food item's quality. Each model can be executed independently of each other and in series.

Advantageously, executing the models in series can automate a quality assessment process that typically may require a human worker to visually inspect and observe quality, size, shape, color, etc. of the particular food item. Executing the models in series can also be advantageous to provide for deeper analysis and findings based on output of previously executed models. Therefore, as an example, a quality metric score outputted by a first model can be received as input into a second model. A quality metric score outputted by the second model can then be received as input into a third model, and so on.

As another example, a first model can identify browning on skin of a fruit. The first model can then extract features in the image data indicative of the browning. These extracted features can be provided as input into a second model, which can be trained to identify a ripeness stage of the fruit based on the browning. The second model's determination of the fruit's ripeness stage can then be provided as input to a third model. The third model can be trained to determine an overall quality metric score for the food item based on the ripeness stage, which was based on the browning. Thus, more robust quality metric assessments can be performed. It can be realized that any number of models can be used in any order to perform robust quality metric assessments.

Moreover, in some implementations, a model can be executed and trained to determine whether the image data of the food item should be run through any additional models. For example, a first model can determine whether the food item is rotting. If the first model determines that the food item is rotting, then the computer system 150 can decide not to implement additional models that may analyze the food item for other quality features, such as yellowing, after all, if the food item is deemed to be of poor quality because of the identified rotting, then applying additional models may not improve a quality score of the food item.

The computer system 150 can determine quality metric scores for the food item in 412. As described throughout, the scores can be numeric values, Boolean values, and/or strings. The scores can be based on user-defined scales (e.g., 1 to 100), true (e.g., indicating good quality) and false (e.g., indicating poor quality), or other descriptors that can be used to describe a quality of food item that is identified from the image data. The quality metric scores can also be determined for each of the models that are applied to the image data. In some implementations, the computer system 150 can determine an aggregate quality score for the food item based on one or more outputs from the models that were applied to the image data. Moreover, in some implementations, the quality score for the food item can be output from a last model that is applied in series. For example, if three models are applied in series, the first model output becomes input to the second model, the second model's output becomes input to the third model, and the third model's output becomes the quality score for the food item. The computer system 150 can translate the output from the third model into a value representative of the quality score. For example, the third model's output can indicate that rot was detected in the image data. The computer system 150 can translate or otherwise assign the rot indication with a numeric value, a Boolean value, and/or a string that represents poor quality.

Then, the computer system 150 can store the quality metric scores for the food item using the food item's grid index (414). The computer system 150 can associate the quality metric scores with the grid index that was assigned to the food item in 406. The quality metric scores can therefore be stored in a data store or other type of database. The quality metric scores can be retrieved by the computer system 150 and presented at one or more user devices. The quality metric scores can therefore be used in future analysis and monitoring of the particular food item. In some implementations, the quality metric scores can also be used in future training data sets to refine the models and improve accuracy of the models.

The computer system 150 can determine whether there are additional food items depicted in the image (416). For example, the computer system 150 can determine whether there are more indexed bounding boxes in the grid structure that have not yet been assigned quality metric scores. In some implementations, the computer system 150 can check the data store to see which grid indexes are assigned quality metric scores.

If there are additional food items in the image data, the computer system 150 can return to block 408 and repeat 408-416 for each of the remaining food items in the image data. For example, the computer system 150 can select a bounding box having a grid index that is not yet assigned any quality metric scores. Blocks 408-416 can be performed to score the quality of the food item that appears in the selected bounding box.

If there are no more additional food items in the image data, the computer system 150 can output the quality metric scores for the food items in the image data (418). The quality metric scores can be presented in a number of ways. For example, the quality metric scores can be depicted using images or portions of the image data representing the food items. A food item that is classified as poor quality can be represented by output that includes a close-up image of bruises or other features on the food item that can cause the food item to be of poor quality. As another example, the quality metric scores can be depicted using spectral graphs. As a result, an actual color of the food item can be depicted to demonstrate why the food item is of poor quality. The quality metric scores can also be outputted as whatever values the computer system 150 assigned. In other words, the quality metric scores can be outputted as numeric values, Boolean values, and/or strings.

In some implementations, the computer system 150 can output one or more quality metric scores for one or more food items based on user preference. For example, a user at the user device can provide input to the user device requesting to view quality metric scores for a subset of the food items depicted in the image data. The input can also request to view a subset of quality metric scores for a particular food item represented in the image data. As yet another example, the input can request to view quality metric scores for a particular food item represented in first image data and quality metric scores for another food item represented in second image data. One or more other user inputs can be used to generate quality metric outputs for display at the user device.

Optionally, the computer system 150 can determine one or more supply chain modifications in 420. As described throughout this disclosure, modifications can include changing a location where the food items are shipped to, changing an amount of time that the food items are stored, changing storage conditions, applying ripening agents or other treatments to the food items, discarding the food items, moving the food items for shipping to end-consumers, moving the food items for shipping to food processing plants, etc. For example, if a food item is scored as poor quality, the computer system 150 can determine that the food item can be discarded, shipped to a food processing plant, and/or delivered to a grocery store that is geographically closest to a current location of the food item. As another example, if a food item is scored as good quality, the computer system 150 can determine that the food item can be stored for a longer period of time than other food items, and/or the food item can be shipped to a grocery store that is geographically farther away from the current location of the food item. As yet another example, if a food item is scored as beginning a ripening process, the computer system 150 can determine that the food item can begin being transported to its destination location, a ripening agent or other treatment can be applied to the food item, the food item storage conditions can be altered, and/or the food item can be stored for a longer period of time. One or more other modifications can be possible based on what quality scores are assigned to the food items. One or more other modifications can also be possible based on user-designated preferences associated with different quality metrics.

FIG. 5 is another flowchart of a process 500 for assessing quality of one or more food items (e.g., refer to FIG. 1C). The process 500 can be performed by the computer system 150. The process 500 can also be performed by one or more other computing systems, devices, and/or servers.

Referring to the process 500, the computer system 150 can receive image data of a quantity of food items in an environment in 502. For example, the computer system 150 can obtain first data representing an image. The image can include (i) a first portion that depicts one or more food items and (ii) a second portion that depicts at least a portion of an environment where the one or more food item are located.

The computer system 150 can index the food items in the image data in 504, as described herein. The computer system 150 can then identify a portion of the image having the food items in 506. For example, this can include identifying a portion of the first data that corresponds to a region of the image represented by the first portion that depicts one or more food items.

Next, the computer system 150 can identify sub-portions of the portion that each include a food item (508). For example, the computer system 150 can identify sub-portions of the identified portion of the first data. Each sub-portion can correspond to a region of the portion of the first data where a particular food item of the one or more food items is depicted.

The computer system 150 can input each sub-portion into a quality assessment system in 510. In other words, the computer system 150 can apply machine learning trained models in series to each sub-portion (512). The quality assessment system, as described throughout this disclosure can include one or more models that are trained to identify and/or score different quality metrics for the food items depicted in the first data. Thus, the computer system 150 can provide the identified portion of the first data as an input to the food item quality assessment system. The food item quality assessment system can include one or more quality assessment engines that can be configured to generate output data indicative of a quality attribute of the food item depicted by the obtained image. The quality assessment system can be part of the computer system 150. In some implementations, the quality assessment system can be different/separate from the computer system 150.

The computer system 150 can then determine quality metric scores for each food item in each sub-portion (514). For example, the computer system 150 can determine a quality assessment score for each particular food item of the one or more food items based on output data generated by the one or more quality assessment engines of the food item quality assessment system. Thus, the computer system 150 can determine a quality score for each food item. In some implementations, the computer system 150 can determine an aggregate quality score for a batch of the food items represented in the obtained image.

The computer system 150 can store the determined quality metric scores for each food item based on the food item's index (516). As described throughout, the scores can be stored in a data store, database, cloud storage, or other type of memory device. The scores can later be retrieved by the computer system 150 or one or more other computing systems/devices for further analysis, monitoring, and output operations.

Figure 6:
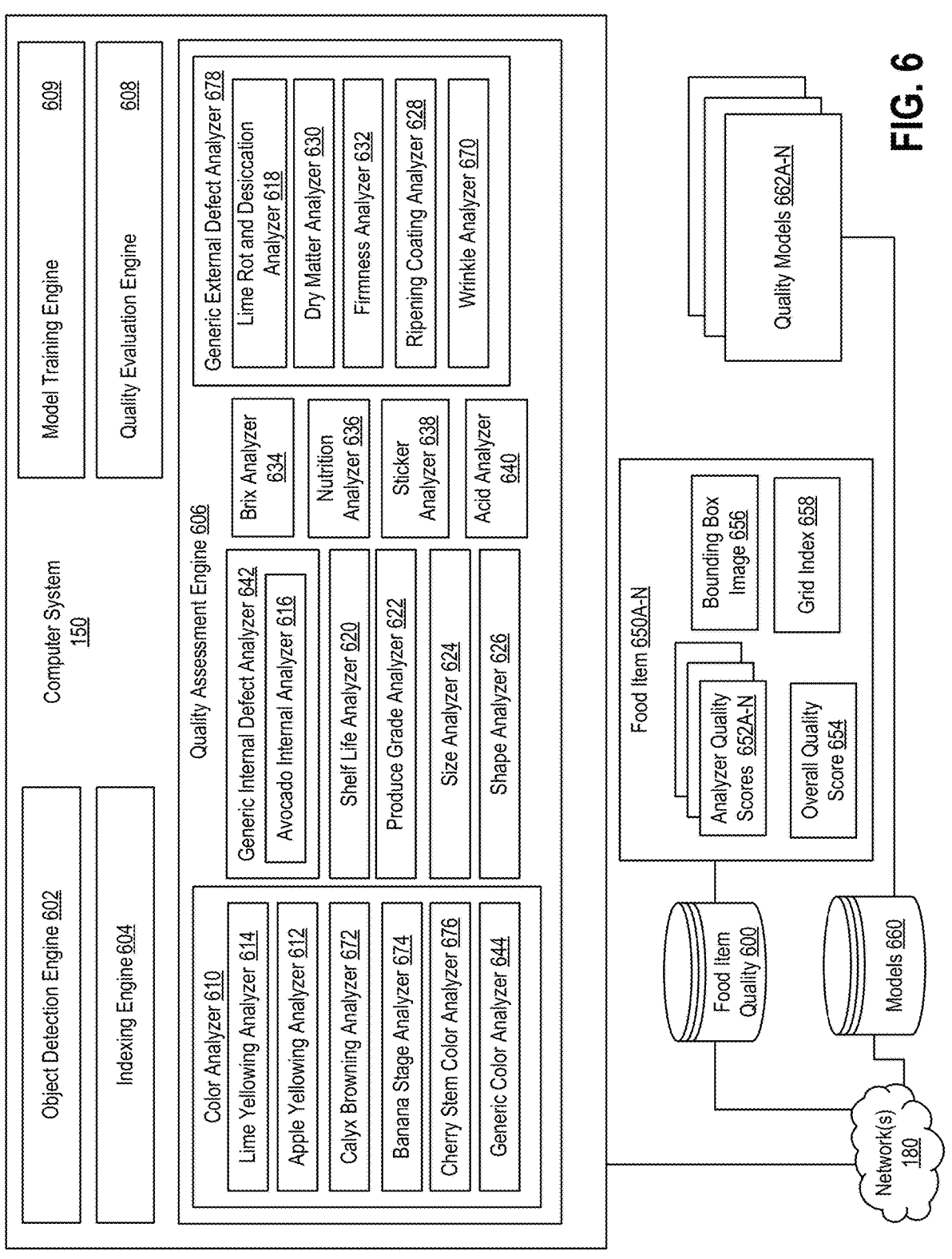
FIG. 6 is an example system diagram of components used for determining food item quality based on the techniques described herein.
Figure 7:
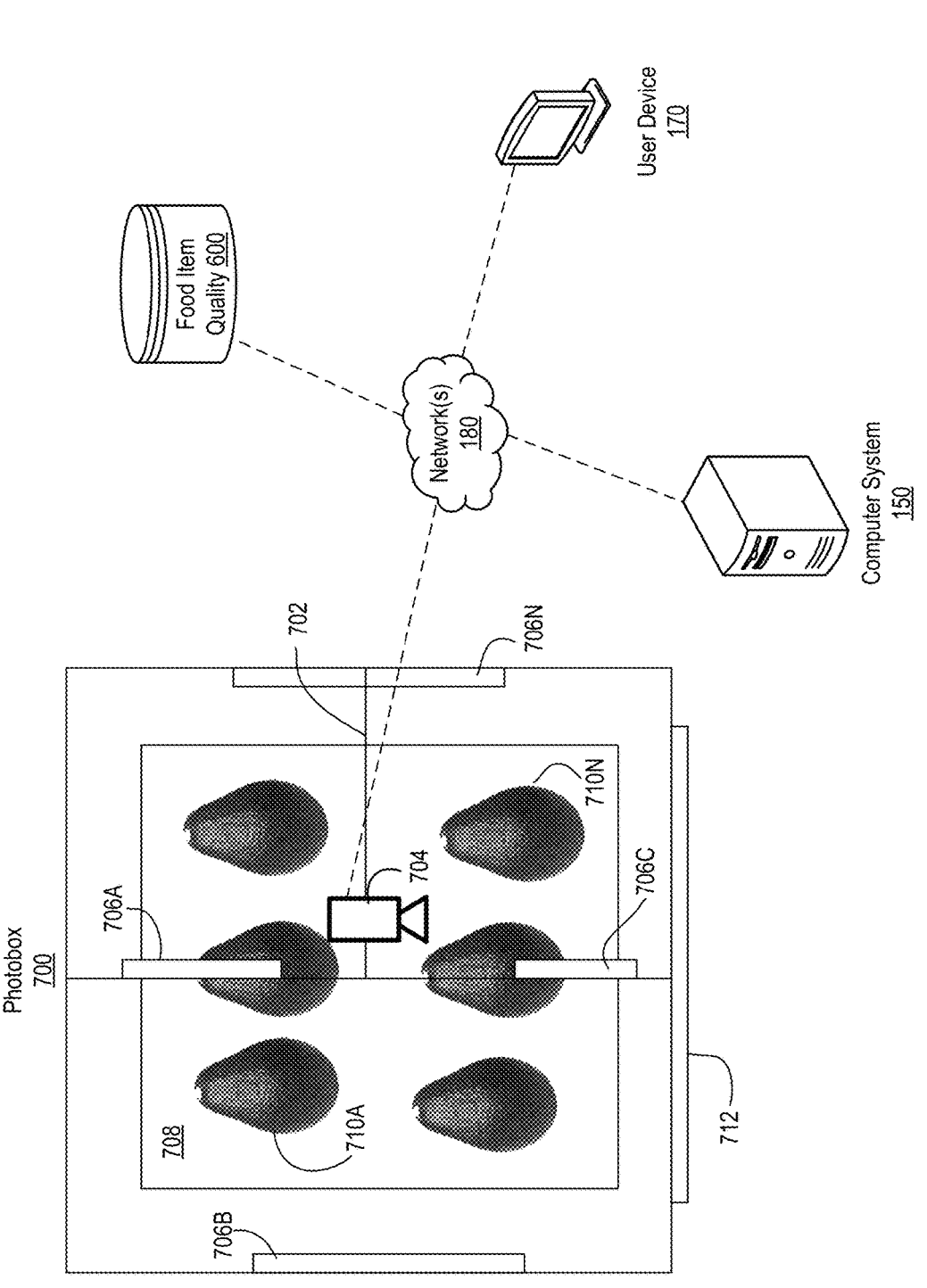
FIG. 7 is a conceptual diagram of an example photobox used for determining food item quality based on image data.

FIG. 6 is an example system diagram of components used for determining food item quality based on the techniques described herein. The computer system 150, food item quality data store 600, and models data store 660 can be in communication (e.g., wired and/or wireless) via the network(s) 180.

The computer system 150 can include an object detection engine 602 (e.g., food item identification engine 120 in FIG. 1C, extraction engine 110 in FIG. 1C, and/or a combination of the food item identification engine 120 and the extraction engine 110), an indexing engine 604, a quality assessment engine 606 (e.g., quality assessment system 130 in FIG. 1C), a quality evaluation engine 608 (e.g., quality evaluation engine 140 in FIG. 1C), and a model training engine 609. In some implementations, one or more of the components 602, 604, 606, 608, and 609 can be separate from the computer system 150 and part of one or more other computer systems, computers, servers, devices, and/or networks.

The model training engine 609 can be configured to generate one or more models that can be used by the quality assessment engine 606 (e.g., refer to FIG. 3). The engine 609 can receive training image data of food items. The engine 609 can identify features associated with the food items from the training image data. The identified features can be annotated or otherwise labeled. Then, models can be trained using machine learning techniques (e.g., CNNs) to identify the labeled features in image data. As described throughout this disclosure, the engine 609 can also train one or more models to score the identified features.

Generated and trained models can be stored in the models data store 660 as quality models 662A-N. The quality models 662A-N can be accessed and/or retrieved by one or more analyzers of the quality assessment engine 606 during runtime. As described throughout this disclosure, only some of the models 662A-N can be selected during runtime, based on a type of food item in the image data and/or user preferences for quality assessment of the particular food item(s) in the image data. In some implementations, the quality models 662A-N can be updated or otherwise modified based on runtime application of the models to image data.

The object detection engine 602 can be configured to detect one or more food items in image data, as described throughout this disclosure (e.g., refer to FIGS. 4A-B). The engine 602 can receive the image data and perform object detection techniques to process the image data. The engine 602 can also apply one or more machine learning models that are trained to identify food items in the image data. The engine 602 can generate bounding boxes around each of the food items in the image data. For each food item 650A-N, the engine 602 can store the bounding box image of the food item 656 in the food item quality data store 600.

In some implementations, the object detection engine 602 can calibrate colors in bounding box portions of the image data to maintain color consistency throughout the image data. In some implementations, color calibration can be performed by a separate engine, such as a color calibration engine (not depicted). Color calibration can be applied to the full image data as a preprocessing step before object detection and/or object extraction. Once the image data is calibrated based on color, RGB image analysis as described throughout this disclosure can be performed.

The indexing engine 604 can be configured to apply a grid structure to the image data and index each bounding box in the structure (e.g., refer to FIGS. 4A-B). Each bounding box can encompass a food item that is represented in the image data. For each food item 650A-N, the engine 604 can retrieve the bounding box image 656 from the food item quality data store 600 and assign the index value to the bounding box. Thus, each food item can be identified by the assigned index, which can be beneficial for future retrieval of information, analysis, and processing operations. For each food item 650A-N, the engine 604 can store the grid index 658 in the food item quality data store 600.

The quality assessment engine 606 can be configured to identify one or more features indicating quality of the food items represented in the image data (e.g., refer to FIGS. 4A-B). The engine 606 can retrieve the bounding box image 656 for each food item 650A-N from the food item quality data store 600. The bounding box image 656 can be used by the analyzers in determining quality of the food item. The engine 606 can also retrieve one or more quality models 662A-N from the models data store 660 to execute during runtime. The engine 606 can select the quality models 662A-N based on a determination made by the object detection engine 602. For example, the engine 602 can determine that the food items identified in the image data are all apples. The engine 602 can notify the quality assessment engine 606 that the food items are apples. In some implementations, the food item identification can also be fed in to the quality assessment engine 606 from a network of computing systems, computers, devices, data stores, and/or cloud-based services. The quality assessment engine 606 can then retrieve one or more quality models 662A-N that are associated with apples from the models data store 660. Once retrieved, the models 662A-N can be executed in series by one or more of the analyzers.

Although the analyzers are depicted and described in one order in FIG. 6, the analyzers can be depicted and executed in any one or more other orders. The order of execution can be determined by the quality assessment engine 606. The order of execution can also be determined by a user at a user device. In some implementations, the order of execution can be determined by the computer system 150. The order of execution can be based on a type of food item in the image data. The order of execution can also be based on particular quality features that are being assessed. Moreover, the order of execution can be based on user preferences.

The quality assessment engine 606 can include a plurality of analyzers, where each analyzer can be configured to identify a different quality feature in the food item based on the image data. Thus, each model 662A-N can be executed by a different analyzer. Although some example analyzers are depicted in FIG. 6, additional analyzers may be included in the engine 606. The engine 606 can therefore include one or more additional or fewer analyzers. Each of the analyzers can receive, for each food item 650A-N, the bounding box image 656 of that food item.

By way of example, the quality assessment engine 606 can include a color analyzer 610, an apple yellowing analyzer 612, a lime yellowing analyzer 614, an avocado internal analyzer 616, a lime rot and desiccation analyzer 618, a shelf life analyzer 620, a produce grade analyzer 622, a size analyzer 624, a shape analyzer 626, a ripening coating analyzer 628, a dry matter analyzer 630, a firmness analyzer 632, a brix analyzer 634, a nutrition analyzer 636, a sticker analyzer 638, an acid analyzer 640, a generic internal defect analyzer 642, a generic color analyzer 644, a wrinkle analyzer 670, a calyx browning analyzer 672, a banana stage analyzer 674, a cherry stem color analyzer 676, and/or a generic external defect analyzer 678. One or more additional analyzers can include a Lenticel Oxidation (black spot) analyzer (e.g., for mangoes) or other types of analyzers that can be generically applied to determine quality characteristics about different types of food items and/or specifically applied to particular types of food items. More specifically, the analyzers 612, 614, 644, 672, 674, and 676 can be subsets of the color analyzer 610 and are merely illustrative examples of color analyzers. Furthermore, any of the analyzers 672, 674, and/or 676 can be used to identify and extract median color values that can then be used to determine quality attributes of a body of the food items (e.g., a body or surface of a cherry using the analyzer 676, a body or surface of a strawberry using the analyzer 672). The techniques described in reference to the analyzers 610, 612, 614, 644, 672, 674, and 676 can be applied to other types of color analyzers used to determine quality of other types of food items, based on the type of food item and/or coloring of the food item. Similarly, the avocado internal analyzer 616 can be a subset of the generic internal defect analyzer 642 and merely can be an illustrative example of internal defect analyzers. One or more other internal defect analyzers can be generated to assess internal defects based on food item type and/or type of internal defects. Moreover, the lime rot and desiccation analyzer 618, the dry matter analyzer 630, the firmness analyzer 632, the ripening coating analyzer 628, and the wrinkle analyzer 670 can be subset analyzers of the generic external defect analyzer 678 and merely are illustrative examples of external defect analyzers. One or more other external defect analyzers can be generated to assess external defects based on food item type and/or type of external defects.

Outputs from any one or more of the analyzers can be stored, for each food item 650A-N as analyzer quality scores 652A-N in the food item quality data store 600. In some implementations, outputs from any one or more of the analyzers can also be received as input into one or more of the analyzers, as described throughout this disclosure.

Referring to the exemplary analyzers depicted in FIG. 6, the color analyzer 610 can be configured to analyze the bounding box image 656 to determine what color the food item is and what quality feature that color corresponds to. The color analyzer 610 can be applied to any type of food item in the image data. The color analyzer 610 can also be configured to identify what colors correspond to different quality features for different types of food items. For example, the analyzer 610 can determine that yellowing of an apple is indicative of poor quality for the apple while yellowing of a lemon can be indicative of good quality for the lime. Using a machine learning trained model, the color analyzer 610 can determine a median Euclidean distance in a color space represented by the bounding box image 656 relative to a reference color. The reference color can be different for each type of food item that can be analyzed by the color analyzer. In some implementations, the analyzer 610 can process the image 656 of the food item and output data indicating the median distance from the reference color for the food item. This output can then be received by one or more other analyzers. The outputted data can also include an indication of quality for the food item, such as good quality or bad quality.

As an illustrative example, in some implementations, the analyzer 610 can process all image data of a particular food item by identifying a color sample from each food item (e.g., limes, apples, avocados, and other types of produce where color can be a feature used to determine produce quality). All possible colors of the food item can then be mapped into a color space (e.g., CIELAB space or other three-dimensional color space(s)). The analyzer 610 can then reduce this multidimensional space to a one-dimensional space by identifying a direction in which one or more of the color samples change the most (e.g., exceed a color change threshold level) and predict (e.g., project) a change in color along the identified direction for each food item. As a result, the analyzer 610 can identify a one-dimensional quality metric for each food item based on the predicted change in color for the food item. The one-dimensional quality metric can be a numeric value in a range of 4 to 80. One or more other ranges can be used, which can be based on the type of produce being imaged. The analyzer 610 can then identify a quality level for each of the food items as good quality based on determining that the one-dimensional quality metric for the food item is within a threshold quality range. The analyzer 610 can also identify the quality level as bad quality based on determining that the one-dimensional quality metric for the food item is not within the threshold quality range. The threshold quality range can be based on historical data, such as customer preferences, a quality and/or color of the food item that a customer typically would purchase and/or consume, and/or other factors. This process can be effective in accurately assessing and scoring color of different types of food items. This process can also be computationally easy and fast, thereby utilizing less time and computational resources to determine quality of the food item based on color.

The apple yellowing analyzer 612 can be configured to analyze food items such as Granny Smith apples to determine a degree of yellowing of such food items. In some implementations, a Gaussian Mixture model can be used to assess yellowing color of the apples. Thus, the analyzer 612 can be configured to detect food items of poor quality. The analyzer 612 can process the bounding box image 656 or output from one or more other analyzers to generate output data indicating a yellowing score for the food item. In some implementations, the output can be a numeric score within a range of 0 to 100, with 0 indicating that an apple is not yellow and a 100 indicating that an apple is a maximum shade of yellow (e.g., most yellowed). An apple receiving a score of 100 can be overripe and therefore poor quality, while an apple receiving a score of 0 may not yet be ripe and can be good quality (or the quality may not yet be known because it is too early in the apple's lifecycle to tell). In some implementations, the apple yellowing analyzer 612 can perform a similar processing technique as the analyzer 610 described above.

As an illustrative example, the color analyzer 610 can be executed for an image of an apple. The color analyzer 610 can generate output indicating that the apple's color is primarily yellow. The analyzer 610 may not, however, be trained to glean additional insight into what the primarily yellow coloring means. Thus, the output from the color analyzer 610, which can be a patch of the image of the apple that includes the primarily yellow color, can be received as input to the apple yellowing analyzer 612. The analyzer 612 can be trained to assess the primarily yellow color and determine what that coloring means in terms of apple quality. Thus, the analyzer 612 can score the primarily yellow color and output that score. The analyzer 612 can also output an indication that the apple is of good quality or bad quality based on the score.

In another scenario using the example above, if the color analyzer 610 generates output indicating that the apple's color is green throughout the image, then the color analyzer 610 can be trained to generate output indicating that the apple is of good quality. As a result, the apple yellowing analyzer 612 may not need to be executed, because the analyzer 612 would return a score of 0, which merely confirms the assessment of the analyzer 610. Because the analyzer 612 may not be executed, processing time can be reduced. Computing resources can also be allocated to run other models and assess features in other food items. In some implementations, the analyzer 612 may still be executed in series as a means of confirming accuracy of the color analyzer 610's determination.

Still referring to the analyzers of the quality assessment engine 606, the lime yellowing analyzer 614 can be configured to analyze food items such as limes from the image data to determine a degree of yellowing of such limes. The engine 614 can generate output data indicating a yellowing score for each lime. For example, the output score can be within a range of values (e.g., 0 to 4, with 0 indicating that the lime is not yellow and a 4 indicating that the lime is a maximum shade of yellow). One or more different ranges of values can be used. The engine 614 can also determine that a lime that is a maximum shade of yellow is overripe, and therefore poor quality. The engine 614 can be trained to use a Gaussian Mixture Model and a Support Vector Regressor in order to grade a degree of yellowing on limes.

The avocado internal analyzer 616 can be configured to analyze image data of a cut-open avocado to determine an overall quality of that food item. For example, some image data can include images of cut-open food items. These images can be analyzed by the analyzer 616. In some implementations, the analyzer 616 can generate output data that indicates whether each cut-open avocado is of excellent quality, moderate quality, or bad quality. The overall quality score of excellent quality, moderate quality, or bad quality can also be represented as a score (e.g., numeric and/or Boolean value) that can be mapped to one or more of the aforementioned quality categories of excellent, moderate, or bad. Such a score can be determined based on a number of intermediate values generated by the analyzer 616. In such implementations, the intermediate values can include Boolean values determined for features such as diffuse browning, vascular browning, flesh adhesion, internal rot, stem rot, tissue breakdown, or any combination thereof. The intermediate values can also include numeric values, such as probability values in one or more ranges (e.g., 0 to 1 range). Moreover, the analyzer 616 can execute one or more different machine learning trained models, where each model can be configured to identify the different features listed above. In some implementations, the analyzer 616 can execute one model that can be trained to identify any combination of the features listed above.

The lime rot and desiccation analyzer 618 can be configured to analyze food items such as limes to determine a level of rot and/or desiccation of the limes depicted in the image data. The analyzer 618 can generate output data indicating a binary or Boolean classification for rot, desiccation, or both. The analyzer 618 can be trained to identify features in the image 656 that can be early signs of rot and/or desiccation and current rot and/or desiccation.

The shelf-life analyzer 620 can be configured to analyze food items to infer or predict a level of ripeness (e.g., maturity), remaining shelf-life, or both under a set of one or more predetermined conditions. The analyzer 620 can generate output data that indicates a score based on a ripeness scale. In some implementations, this score can be mapped to a certain amount of days remaining until peak ripeness for each food item. The level of ripeness can be determined based on color and/or food item quality. Ripeness can also be determined from hyperspectral and/or multispectral images by identifying firmness and/or dry matter of the food item. As an illustrative example, in avocados, ripeness is correlated with firmness (e.g., the softer the avocado, the riper it is). Thus, a firmness analyzer can be used to assess hyperspectral image data and determine a firmness value. That firmness value can then be correlated to a ripeness level of the avocado.

The produce grade analyzer 622 can be configured to analyze the food item represented in the bounding box image 656 to determine a grade, such as a USDA specification grade. The analyzer 622 can generate output data that indicates a score for the food item that correlates quality of the food item with a USDA specified grade. The score can be indicative of an assessment of the food item's color, shape, fanciness, and/or any combination thereof.

The size analyzer 624 can be configured to determine size of the food item from the bounding box image 656. The analyzer 624 can generate output data indicating dimensions of the food item. The size analyzer 624 can be trained to identify reference points in the image data and to determine size of the food item within the bounding box and relative to the reference points. In some implementations, the output data indicating the size of the food item can be evaluated to determine whether the food item is within a predetermined size range for standard food item binning. Data indicating a size of the food item can be represented using Boolean values. For example, if the food item is within a range of standard binning size, then a Boolean value such as 1 can be generated for the food item. Alternatively, in such implementations, a value of 0 can be generated for the food item when the food item size is not within the range of standard binning size. In some implementations, the output data can be the determined dimensions of the food item. In yet some implementations, data indicating a size of the food item can be represented using numeric values. For example, avocados can be represented by a variety of numerical size values, including but not limited to 28 (13.75-15.70 oz), 32 (11.75-14 oz), 36 (10.50-12.50 oz), 40 (9.50-11.50 oz), 48 (7.50-9.50 oz), 60 (6.25-7.50 oz), 70 (4.75-6.25 oz), and 84 (3.75-4.75 oz).

The shape analyzer 624 can be configured to determine whether a shape of the food items depicted in the image 656 comports with a predetermined shape metric for that particular type of food item. The analyzer 624 can be trained to identify a shape of the food item in the image 656 and compare the shape to a desired shape of food items of the same type. For example, image data of a cucumber can be analyzed to determine whether the cucumber has a certain level of curvature. A cucumber having the desired level of curvature can be identified as good quality while a cucumber not having the desired level of curvature can be identified as poor quality. One or more other identifications can be made based on whether the food item satisfies desired shape metrics. The analyzer 624 can generate output data such as a score for the food item. The output data can also indicate a degree to which a predetermined shape metric is embodied in the food item and/or a degree of deviation in the food item's shape relative to a desired shape.

The generic external defect analyzer 678 can be configured to determine presence of one or more external defects on a surface of the food item depicted in the image 656. The analyzer 656 can implement one or more machine learning models that are configured to identify and assess visible and/or infrared light in the image 656 to determine whether one or more external defects are present on the surface of the food item. Refer to discussion about the analyzers 618, 628, 630, 632, and 670 for further discussion about the generic external defect analyzer 678.

The ripening coating analyzer 628 can be configured to determine presence, thickness, absence, or a combination thereof, of a ripening coating on the food item depicted in the image 656. A spectral reflectance profile can be used by the analyzer 628 to identify the coating on a surface of the food item. The spectral reflectance profile can be measured using a multispectral and/or hyperspectral imaging device. The analyzer 628 can generate output data indicating whether the food item has a ripening coating, a thickness of the ripening coating, or an absence of the ripening coating. In some implementations, output data such as a numeric value of 0 can indicate that there is no coating, whereas any value above 0 and less than 1 can indicate the presence of the coating and the coating's corresponding thickness. For example, an output value closer to 1 can indicate a thicker ripening coating than a value closer to 0.

The dry matter analyzer 630 can be configured to determine a level of dry matter in the food item depicted in the image 656. Hyperspectral image data can be used by the analyzer 630 to determine dry matter levels. For example, the analyzer 630 can implement a machine learning trained model that uses visible and infrared spectral reflectance data to identify and quantify dry matter. The analyzer 630 can generate output data such as a score indicating a level of dry matter. The output data can be numeric values, where a value of 0 can indicate that there is no dry matter in the food item, whereas any value above 0 and less than 1 can indicate a level of dry matter that appears in the food item. Thus, output values closer to 1 can indicate a greater presence or quantity of dry matter in the food item than values closer to 0.

The firmness analyzer 632 can be configured to determine a level of firmness of the food item depicted in the image 656. Hyperspectral image data can be used by the analyzer 632 to determine firmness levels. For example, the analyzer 632 can implement a machine learning trained model that uses visible and infrared spectral reflectance data to identify and quantify firmness of the food item. The analyzer 632 can generate output data such as a score indicating a level of firmness. The output data can be a numeric value within a range, such as 0 to 1. A value of 0 can indicate that the depicted food item is hard and inedible, whereas any value above 0 and less than 1 can provide an indication of firmness that is not hard. For example, output values closer to 1 can indicate that the food item is softer, less firm, and/or approaching a maximum softness that the food item should be. In some implementations, and depending on a type of the food item, the maximum softness can indicate that the food item is of good quality and is ready to be consumed by consumers. In some implementations, the maximum softness can indicate that the food item is of poor quality and is no longer a desired firmness to be consumed by consumers.

The brix analyzer 634 can be configured to determine a sugar level of the food item in the image 656. Hyperspectral image data can be used by the analyzer 634 to determine sugar content. For example, the analyzer 634 can implement a machine learning trained model that uses visible and infrared spectral reflectance data to identify and quantify sugar content associated with the food item. The analyzer 634 can generate output data such as a score indicating a sugar level. The score can be a numeric value on a scale. For example, the scale can be 0 to 1, where 0 can indicate that there is no sugar detected in the food item. Any value above 0 and less than 1 can indicate a level of sugar in a food item, where a value closer to 1 can indicate a greater level of sugar in the food item. The analyzer 634 can also be configured to determine and output a sweetness or tartness value for the food item in the image 656. For example, a value closer to 1 can indicate that the food item is sweeter than a food item having a value closer to 0. In some implementations, 1 can indicate a maximum sweetness that is desired for the food item. In some implementations, 1 can indicate a maximum tartness that is desired for the food item. The analyzer 634 can also determine a quality of the food item based on the maximum sweetness or tartness of the food item. For example, if the food item has a value of 1, indicating the maximum sweetness or tartness, depending on the type of food item, the analyzer 634 can determine that the food item is of poor quality because consumers may not want to eat something so sweet or tart. As another illustrative example, if the food item has a value of 0.5, the analyzer 634 can determine that the food item is a preferred level of sweetness or tartness and therefore is good quality.

The nutrition analyzer 636 can be configured to determine a level of nutrition of the food item. Hyperspectral image data can be used by the analyzer 636 to determine nutritional content. For example, the analyzer 636 can implement a machine learning trained model that uses visible and infrared spectral reflectance data to identify and quantify nutritional content of the food item. The analyzer 636 can generate output data such as a numeric value on a scale. For example, on a scale of 0 to 1, 0 can indicate that there is no nutritional value for the food item, whereas any value above 0 and less than 1 can indicate a level of nutrition in the food item.

The sticker analyzer 638 can be configured to detect and interpret information on a sticker or other label that is attached to the food item. The image 656 can depict the food item having a label attached thereon. If the label is present, the analyzer 638 can be trained to detect the label. Using image processing techniques and optical character recognition (OCR) techniques, the analyzer 638 can read the label and glean additional information about the food item. For example, the analyzer 638 can determine information such as a name of the food item, a barcode or other product identifier associated with the food item, a customer name or identifier, a sell date, a best by date, a place of origin, a destination location, etc. The analyzer 638 can generate output data that includes decoded text or an identifier that was on the label. The output can also include a close-up image of the label that was extracted, by the analyzer 638, from the image 656.

The acid analyzer 640 can be configured to determine a level of acid in food item depicted in the image 656. Hyperspectral image data can be used by the analyzer 640 to determine acid level (pH). For example, the analyzer 640 can implement a machine learning trained model that uses visible and infrared spectral reflectance data to identify and quantify acid level of the food item. The analyzer 640 can generate output data such as a score indicating a level of acid, which can be a numeric value on a scale. An example scale can be 0 to 1, where a value of 0 can indicate that there is no acid in the food item. A value above 0 and less than 1 can indicate a level of acid in the food item.

The generic internal defect analyzer 642 can be configured to analyze undamaged food items to determine an overall quality of an internal portion of the food item in the image 656. For example, the analyzer 642 can receive a hyperspectral image or other hyperspectral image data for the food item. Using the hyperspectral data, the analyzer 642 can generate output data that indicates whether the undamaged food item has internal defects. One or more machine learning models can be used to assess the hyperspectral data and determine internal defects. For example, hyperspectral imaging utilizes different parts of the electromagnetic spectrum. Some bands in the spectrum are able to penetrate certain materials. The penetration depth depends on the band and the material being imaged. For some food items, for example, spectral bands can penetrate and interact with internal parts of the fruit such that the resulting image of the food item contains information about the internal state of the fruit. This allows the analyzer 642 to detect internal defects using one or more machine learning trained models. In some implementations, the analyzer 642 can also identify these spectral features in the flesh of the food item that are present with and/or without internal defects. Internal defects can include bruising, rot, disease, or the like. The analyzer 642 can be trained to determine internal defects for any type of food item. The output data that is generated can include Boolean or binary classifications indicating whether the food item has internal defects. The output data can also indicate what type of internal defects may exist for the food item.

The generic color analyzer 644 can be configured to determine a grade level and other quality features for the food item in the image 656 based on analyzing color of the food item. The analyzer 644 can be trained to determine the grade level and quality features for any type of food item. The analyzer 644 can generate output data indicating a grade for the food item, which can be a numerical value. The numerical value can be mapped to one or more overall food item quality categories. Such categories can include excellent, moderate, and bad quality. The numerical value can also be mapped to one or more other quality descriptors.

The analyzer 644 can be trained using images of different types of food items that have been labeled with a particular food quality category. Moreover, the analyzer 644 can be trained to identify quality of the food item based on a RGB model of the food item in the image 656. The analyzer 644 can generate output data as a Boolean flag indicating whether the food items satisfies a RGB quality test. The analyzer 644 can be trained to identify color features on a pixel-by-pixel basis in the image 656. As another example, the analyzer 644 can be trained to identify quality of the food item based on a hyperspectral image (HSI) model of the food item. The analyzer 644 can generate output data as a Boolean flag indicating whether the food item satisfies an HSI quality test. The analyzer 644 can be trained to perform hyperspectral cube processing in order to identify quality of the food item from the image 656.

Figure 19:
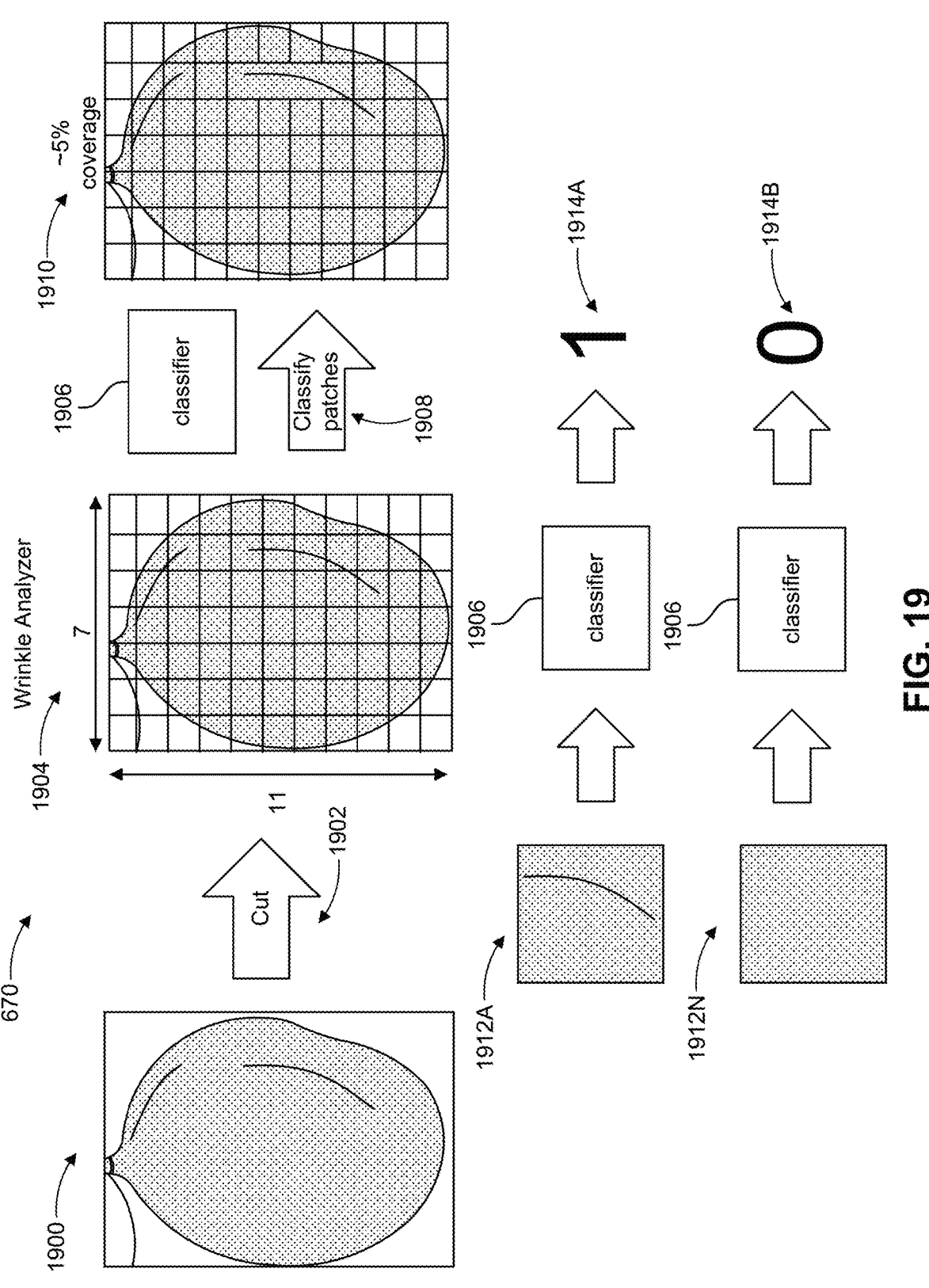
FIG. 19 depicts example mango wrinkle analysis using image data.

The wrinkle analyzer 670 can be trained to identify a percentage of wrinkle coverage on a food item. The food item can include mangoes. The food item can additionally or alternatively include bell peppers. The wrinkle analyzer 670 can also be applied to analyze one or more other types of food items whose quality may be defined or otherwise impacted based on an amount of wrinkling on a surface of the food item. The analyzer 670 can employ a machine learning algorithm, model, or other machine learning techniques to identify and quantify an amount of wrinkles appearing on the surface of the food item. Using these techniques, the analyzer 670 can be trained to predict a total wrinkle coverage percentage on the food item from the image 656. In some implementations, the analyzer 670 can perform a binary classification with machine learning techniques to determine whether the food item is wrinkled (e.g., assigning a binary value of 1) or not wrinkled (e.g., assigning a binary value of 0). As an illustrative example, the wrinkle analyzer 670 can use image processing techniques to slice the image 656 into patches, boxes, or other predefined zones. The analyzer 670 can apply one or more machine learning techniques, such as a trained classifier, to each patch to determine whether the patch has wrinkles or does not have wrinkles. Once each patch is analyzed, the analyzer 670 can generate an overall wrinkle coverage score for the food item by averaging, summating, or otherwise combining the determinations for all the patches. In some implementations, the overall wrinkle coverage score can be an overall wrinkle coverage percentage. Refer to FIG. 19 for further discussion.

The calyx browning analyzer 672 can be trained to identify calyx browning on food items such as strawberries. Over time, strawberries can develop calyx browning, which can indicate a low quality level of the strawberries. One or more of the image processing techniques described herein can be used by the analyzer 672 in order to identify color features in image data of strawberries that are indicative of calyx browning. For example, image data of strawberries can be color-calibrated, and object detection techniques described herein can be applied to generate a bounding box around each strawberry appearing in the image data. Color analysis techniques described herein can be applied to each bounding box in order to classify colors of the strawberry in the bounding box. Moreover, the analyzer 672 can implement algorithms to isolate various aspects or parts of the strawberry, including but not limited to the calyx, berry body, seeds, etc., and then separately quantify overall color for each of those aspects/parts in isolation. Therefore, the analyzer 672, like the cherry stem analyzer 676 described further below, can be used to grade quality of the specific aspects or parts of the cherry in isolation. A statistical distribution can be performed on the classified colors (e.g., average, finding a median color value, finding a mean color value, removing outlier color values) to identify a statistical average color value for the strawberry. The analyzer 672 can then perform a binary determination of whether the strawberry has calyx browning or not based on the statistical average color value (e.g., if the statistical average color value is a threshold color value or within a threshold color value range, then the strawberry is classified as having calyx browning). The analyzer 672 can assign a quality score to the strawberry represented by the image data based on the binary determination. The quality score can be a string value, such as "good," "ok," and "bad." As an illustrative example, the strawberry can be assigned a quality score of "good" if the analyzer 672 determines that the statistical average color value does not match the threshold color value. As another example, the quality score of "ok" can be assigned if the analyzer 672 determines that the statistical average color value is within a threshold color value range. As another example, the quality score of "bad" can be assigned if the analyzer 672 determines that the statistical average color value matches a threshold color value for calyx browning.

Figure 20:
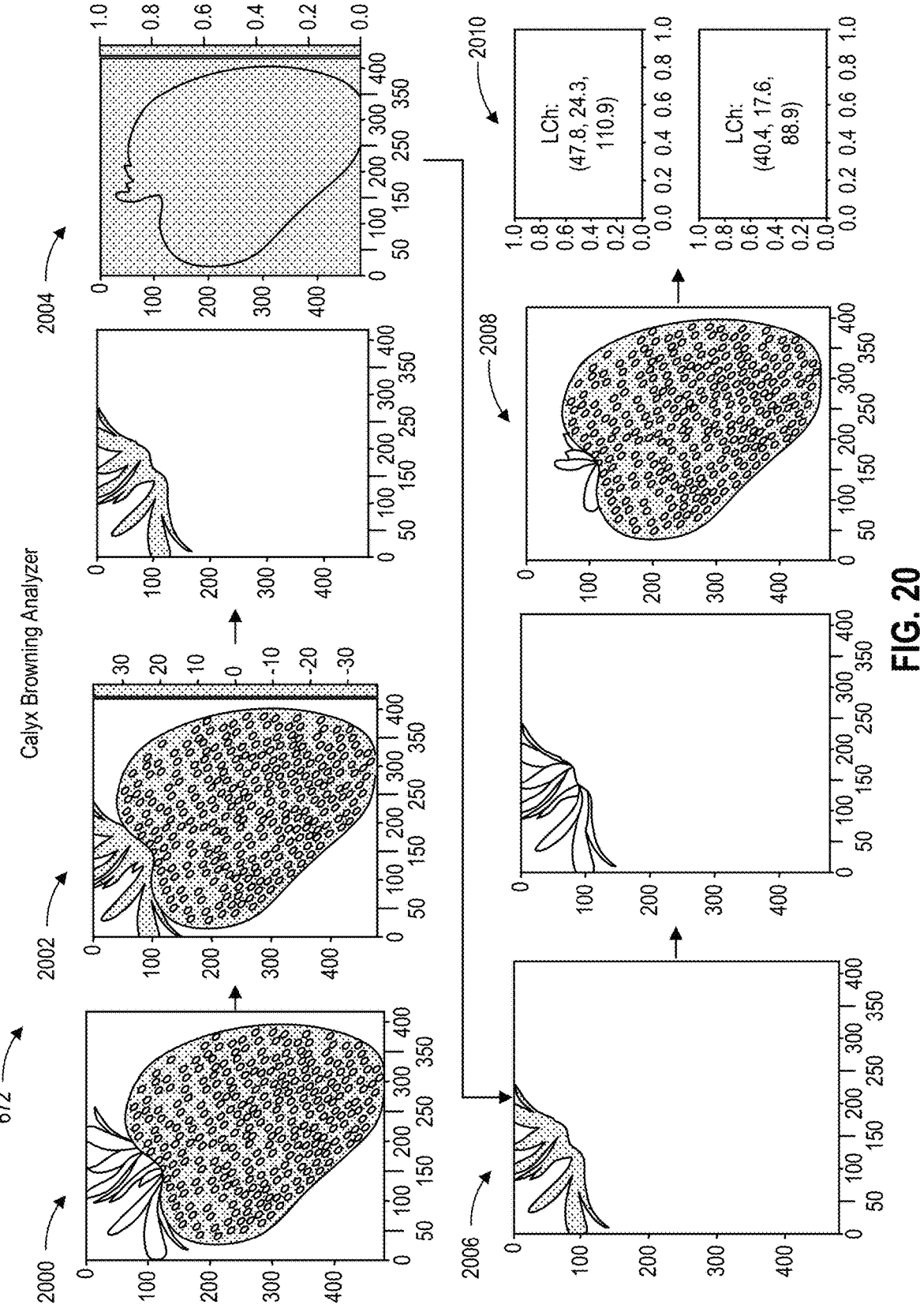
FIG. 20 depicts example strawberry calyx browning analysis using image data.

The analyzer 672 can implement one or more machine learning trained rules, techniques, and/or models to analyze strawberries in the image data as described herein. For example, the analyzer 672 can determine, based on applying a calyx browning-trained model to the bounding box that contains the food item, a median color value of the food item, and assign, based on the median color value of the food item, the quality level score of the food item. The quality level score can be assigned (i) a string value of "good" based on the median color value being less than a first threshold color range, (ii) a string value of "ok" based on the median color value being greater than the first threshold color range and less than a second threshold color range, and (iii) a string value of "bad" based on the median color value being greater than the second threshold color range. Refer to FIG. 20 for further discussion.

Figure 21:
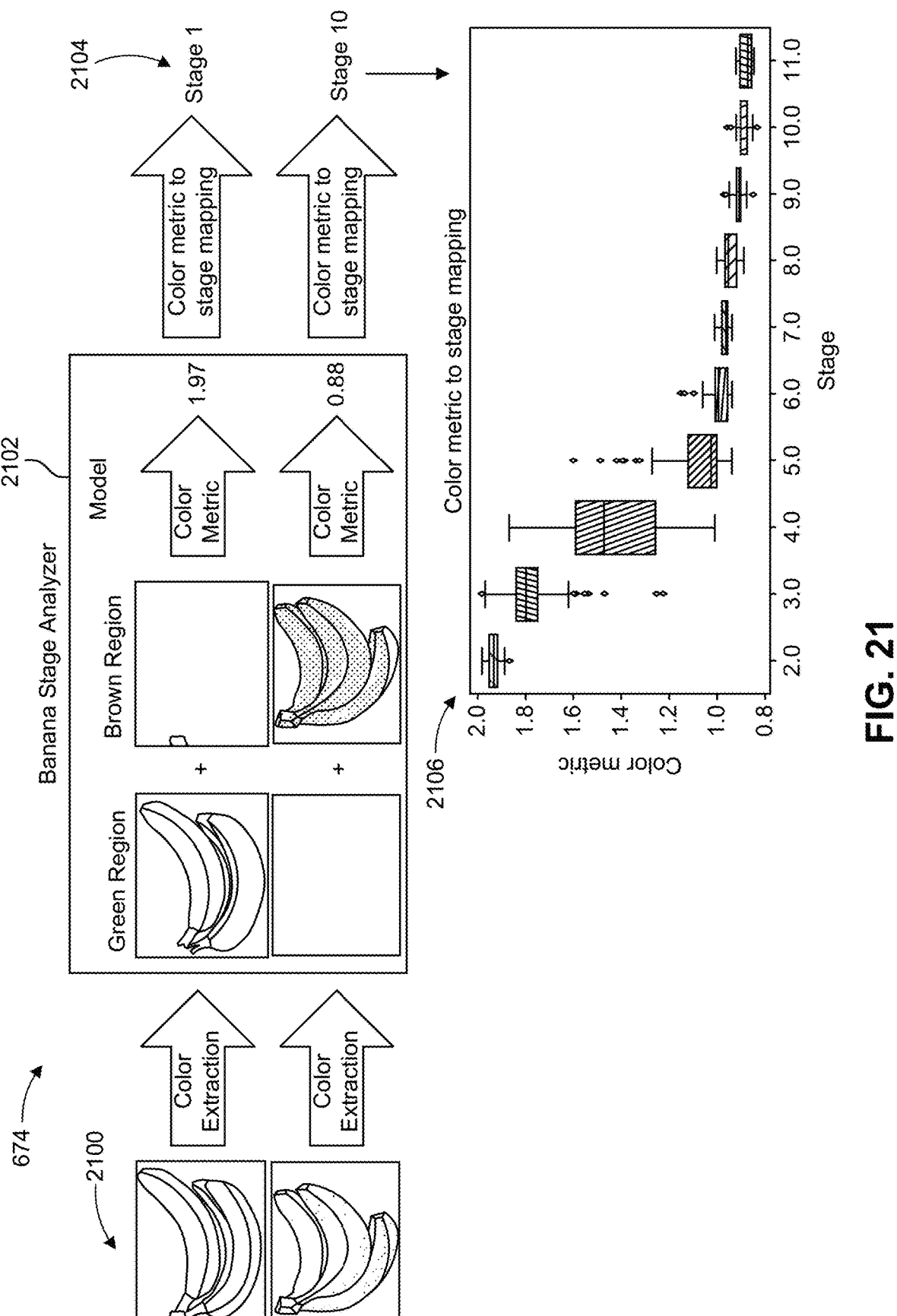
FIG. 21 depicts example banana stage analysis using image data.

The banana stage analyzer 674 can be trained to identify r stage of a banana from image data to determine a quality level of the banana. Consumers may determine ripeness and therefore purchasing decisions of bananas based on their peel color, brown spotting, and/or firmness. Thus, an appearance of a banana peel can have high importance in consumer decisions of whether to purchase the banana. Banana color changes over time from all green to full yellow with spots, thereby indicating different levels of ripeness or freshness. Therefore, any of the color analysis techniques described herein can be applied by the analyzer 674 to identify a color of a banana peel and correlate the identified color with a stage of ripeness. The analyzer 674 can implement a machine learning trained model to perform these techniques. The model can be trained, for example, with training data indicating bananas that have been annotated at various different stages of ripeness. Accordingly, the model can identify, from color analysis of image data of a banana, a stage of ripeness for the banana. As an illustrative example, the analyzer 674 can determine, based on applying a banana stage analyzer-trained model to the bounding box that contains the food item in the image data, a color value of the food item and assign, based on mapping the color value of the food item to expected threshold color values for a plurality of ripeness stages, the quality level score of the food item. The quality level score can be a string value indicating a current ripeness stage of the food item. Refer to FIG. 21 for further discussion.

Figure 22A:
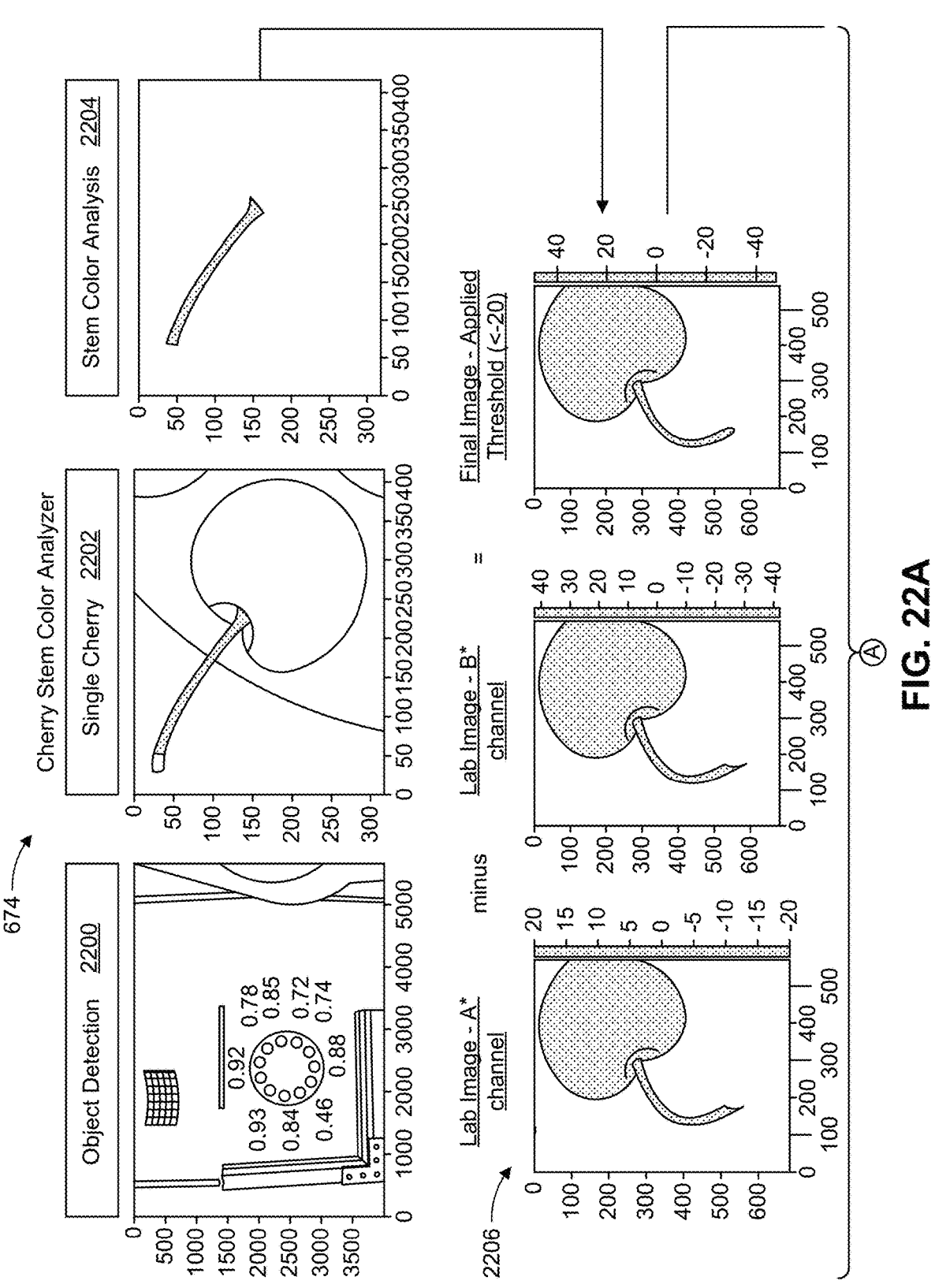
FIGS. 22A-B depict example cherry stem color analysis using image data.
Figure 22B:
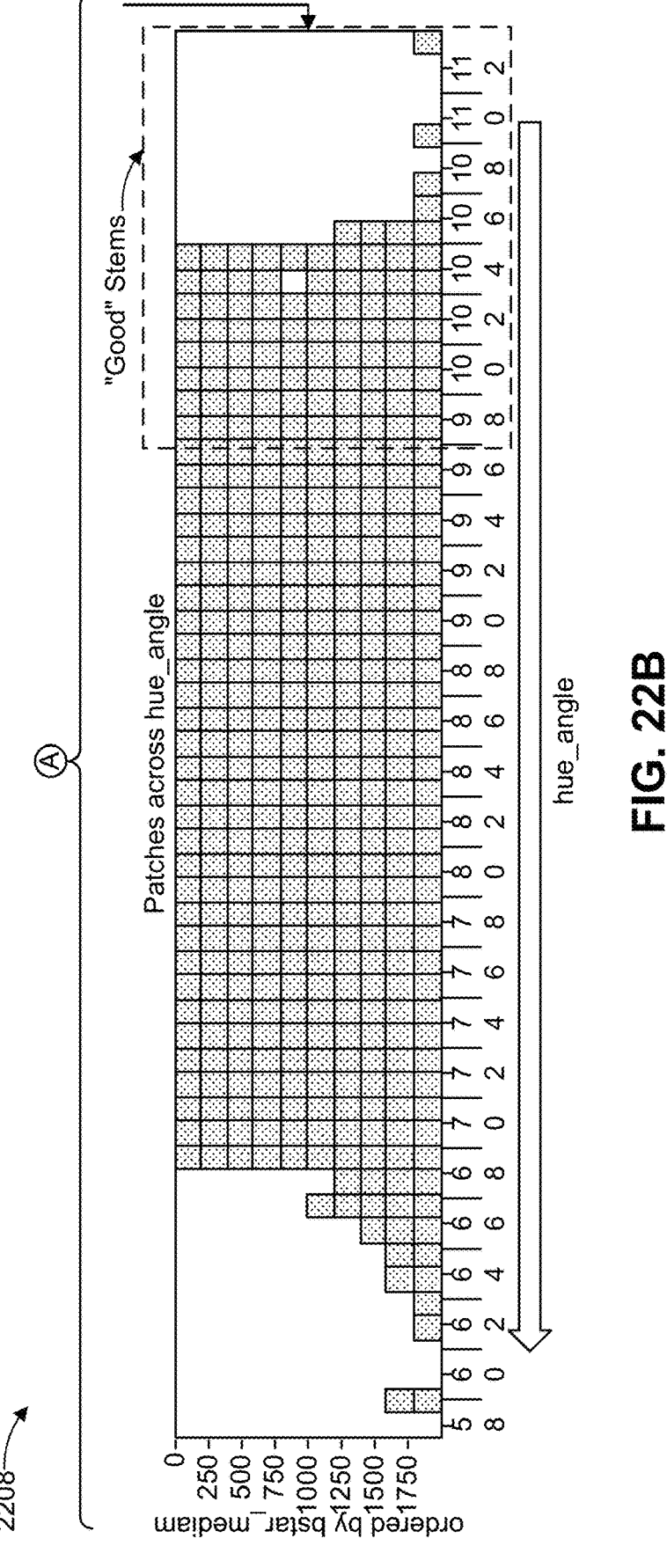

The cherry stem color analyzer 676 can be trained to identify and classify color of cherry stems in image data to determine a quality level of the cherry. The analyzer 676 can employ one or more of the image processing, color analysis, and/or machine learning techniques described herein in order to analyze color of cherry stems. For example, the analyzer 676 can apply a machine learning trained model to image data of cherries to perform the disclosed techniques. Using object detection techniques and/or models, the analyzer 676 can identify a cherry in the image data and generate a bounding box around the cherry. The analyzer 676 can then isolate a stem in the bounding box using object detection techniques and mask the stem with the original image data for purposes of color quantification. The analyzer 676 can determine an average or mean color value for the stem and then correlate that average color value with a quality score. For example, the quality score can be a string value of "good," "bad," or "ok." An average color value that satisfies a first threshold color value range can be assigned a quality score of "good." An average color value that satisfies a second threshold color value range but not the first threshold color value range can be assigned a quality score of "ok." An average color value that satisfies a third threshold color value (and optionally also satisfies the second threshold color value range) but not the first threshold color value range can be assigned a quality score of "bad." One or more other techniques described herein can be used to quantify color values of cherry stems to determine a quality level of the cherries. Refer to FIGS. 22A-B for further discussion.

As described throughout, the aforementioned example analyzers do not function to limit scope of the present disclosure. Instead, any type of analyzer can be used by the quality assessment engine 606. Likewise, characterizations of inputs and outputs for each of the example analyzers should not be viewed as limiting. The analyzers can be configured and/or trained to generate other types of output data and receive other types of input data. As an illustrative example, one or more of the aforementioned analyzers can be trained to generate numeric scores in different ranges. Values in the different ranges can also be assigned different quality indicators, based on the food item, the type of food item, the quality feature being identified, and/or user preferences.

Still referring to the computer system 150 in FIG. 6, the quality evaluation engine 608 can be configured to receive output from one or more of the analyzers of the quality assessment engine 606. The engine 608 can translate the output into quality metric scores. As described herein, the scores can be numeric, Boolean, and/or string values. The engine 608 can also be configured to generate supply chain modifications based on output from the one or more analyzers. Moreover, the engine 608 can be configured to generate an overall quality score for each food item represented in the image data. The engine 608 can also determine what information/scores to output for display at a user device. For each food item 650A-N, the engine 608 can store the analyzer quality scores 652A-N (e.g., outputs from the analyzers and/or scores generated by the engine 608 based on the analyzers' outputs) and the overall quality score 654 in the food item quality data store 600.

As an illustrative example, the quality evaluation engine 608 can determine an overall quality metric for a food item based on applying nested rules across outputs from one or more analyzers described above to determine a category of quality (e.g., a bucket) for which to assign the overall quality metric. Refer to FIG. 23 for further discussion. In some implementations, the engine 608 can determine the overall quality metric based on weighting and blending determinations or outputs from the analyzers. In other words, based on the type of food item, the quality evaluation engine 608 can combine the received determinations or outputs to generate an overall quality metric or score for the particular food item (e.g., the overall quality score 654 for each food item 650A-N).

As an illustrative example, the quality evaluation engine 608 can receive a color score from the color analyzer 610 and a wrinkle coverage score from the wrinkle analyzer 670 for mangoes. Customers may care more about wrinkle defects in mangoes when making purchasing decisions. Because quality, edibility, and/or salability of mangoes may therefore depend more heavily on how wrinkled a surface of a mango is versus the color of the mango, the quality evaluation engine 608 can apply one or more rules specific to mangoes that weight the wrinkle coverage score more heavily than the color score to determine an overall quality metric for the mangoes. Based on this weighting, a binary decision can be made by the quality evaluation engine 608 as to whether the analyzed mangoes are salable/unsalable and/or edible/non-edible. The binary decision can be made based on applying one or more rules to each of the scores and/or a combination of the scores provided for the food item, such as applying a salability threshold that may depend on a type of the food item. The salability threshold may, in some implementations, also vary based on how consumers rank various quality attributes (e.g., mold, wrinkle, color, sweetness, firmness, bruising) for each type of food item.

In the example of the mangoes, if the wrinkle coverage score is 80% coverage (regardless of the value assigned to the color score) and the salability threshold for the mangoes is 65%, then a binary decision can be made that the mangoes are unsalable. The overall quality metric can be a Boolean value, such as whether the analyzed food item is salable or unsalable.

Any combination of rules and/or thresholds can be used to determine the overall quality metric for an analyzed food item, where the combination of rules and/or threshold can vary based on a type of the analyzed food item and consumer and/or retailer standards for deeming the analyzed food item as salable, unsalable, edible, nonedible, good quality, bad quality, and/or okay quality. Accordingly, each type of food item that can be analyzed using the disclosed techniques may have a differently defined set of characteristics/attributes that are used to determine an overall quality metric for that food item.

As mentioned above, the disclosed techniques provide for establishing quality metric scales for different types of food items, regardless of how retailers and consumers might each define quality of food items and whether the retailers and consumers can define such quality metrics. The disclosed techniques therefore provide for establishing scales that quantify quality for different types of food items to meet the quality interests of consumers.

FIG. 7 is a conceptual diagram of an example photobox 700 used for determining food item quality based on image data. The photobox 700 can receive a flat 708 (e.g., pallet, batch) of produce 710A-N (e.g., avocados). A camera 704 positioned within the photobox 700 can capture image data of the produce 710A-N on the flat 708. The image data can be transmitted over the network(s) 180 to one or more of the computer system 150 (e.g., for processing), the user device 170 (e.g., for display), and/or the food item quality data store 600 (e.g., for storage). The image data can be processed using the techniques described herein to determine quality characteristics of each of the produce 710A-N. For example, one or more of the models described herein can be executed locally at the computer system 150 to process the image data and determine quality characteristics for the produce 710A-N. Output from this processing can be transmitted and/or uploaded to a cloud-based service, such as the food item quality data store 600. This output can then be retrieved by the user device 170 and presented to relevant stakeholders, such as scientists or other users who assess quality of the produce 710A-N at a storage facility and/or packing house.

The photobox 700 can include walls on each side, a ceiling, and a flap 712 along one of the walls so that the flat 708 can be placed inside the photobox 700 and removed from the photobox 700 once imaging is complete. The flap 712 can seal over or otherwise cover an opening in the wall such that no ambient or external light gets inside the photobox 700.

The camera 704 can be positioned along a camera rig 702. The camera rig 702 can be configured to the ceiling of the photobox 700. The camera rig 702 can be made of aluminum tubes (e.g., 3 aluminum tubes) and a tee connector. The camera 704 can be attached via a camera mount to any of the aluminum tubes. One of the tubes can extend from the tee connector to a first wall of the photobox 700, a second tube can extend from the tee connector to a second wall that is opposite the first wall, and a third tube can extend from the tee connector to a third wall that is perpendicular to the first and second walls.

The camera 704 can therefore be trained downwards. The camera 704 can be centered along the camera rig 702 inside the photobox 700. Sometimes, the camera 704 can be off-center along the camera rig 702. In some implementations, the photobox 700 can include multiple cameras. For example, additional cameras can be placed along the camera rig 702, extending between any of the walls of the photobox 700. In some implementations, additional cameras can be placed inside the photobox 700 and along the walls, rather than attached to the camera rig 702 at the ceiling of the photobox 700. As a result, the flat 708 can be imaged from a variety of different angles.

The camera 704 can be any type of imaging device described herein, including but not limited to an RGB camera, a hyperspectral imaging device, a multispectral imaging device, a thermal imaging device, and/or any combination thereof. In some implementations, the camera 704 can be part of a magnetic resonance imaging (MRI) scanning system and/or a nuclear magnetic resonance (NMR) imaging system.

The camera 704 can also be configured to one or more predetermined settings. As an illustrative example, the camera 704 can be set to manual mode, with a shutter speed of 1/20, F-stop F18, lens zoom of 18 mm, and light dimmer set to max. Moreover, image size can be large, white balance can be set to direct sunlight, active D-lighting can be set to off, ISO sensitivity can be 200, auto focus can be set to auto-area auto focus, flash can be turned off, image rotation can be off, HDR can be off, long exposure NR can be off, high ISO NR can be of, and vignette control can be normal. One or more other camera and shooting settings can be different based on the setup, configuration, and/or components of the photobox 700.

One or more lights 706A-N can also be positioned throughout the photobox 700 to illuminate the flat 708. The lights 706A-N can provide uniform lighting inside the photobox 700 for better image capture by the camera 704. The lights 706A-N can be LEDs. In some implementations, lights 706A and 706C can be positioned along/attached to the camera rig 702 to provide uniform lighting from the ceiling of the photobox 700. In some implementations, lights such as lights 706B and 706N can be positioned along any of the walls of the photobox 700. One or more other lighting configurations are possible. Moreover, in some implementations, diffusers can also be positioned along/attached to the camera rig 702. A plastic diffuser can be placed along a length of the ceiling of the photobox 700, with an opening designated for the camera 704. A cloth-like fabric diffuser can also be used and placed along the length of the ceiling of the photobox 700 with an opening designated for the camera 704.

The photobox 700 can be located in a storage facility, packing house, warehouse, or other storage environment where the produce 710A-N may arrive/be stored until being shipped out to customers. One or more flats per category of treated produce (e.g., produce that is coated in a shelf-life extension coating solution) and untreated produce (e.g., produce that is not coated in any type of shelf-life extension coating solution) can be placed, one at a time, in the photobox 700 and imaged. These flats can thus be imaged and processed over time to determine changes in quality that treated produce and untreated produce may experience. A flat can be put in the photobox 700 by a human worker. The flat can also be automatically directed into the photobox 700 by a conveyor belt. For example, the photobox 700 can be in-line in the storage facility to allow for more automatic, real-time analysis of produce quality as it is being routed throughout the storage facility.

Figure 8A:
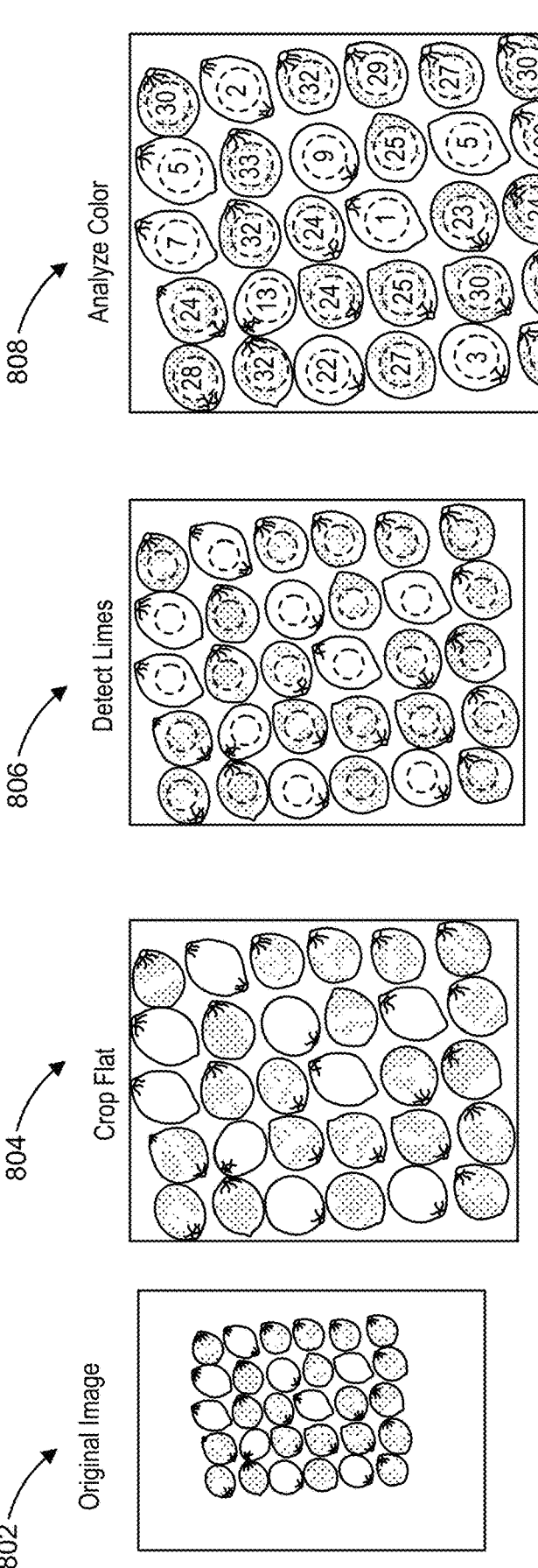
FIGS. 8A-B depicts lime color analysis using image data.
Figure 8B:
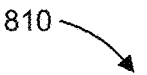

FIGS. 8A-B depict lime color analysis 800 using image data 802. Referring to FIG. 8A, the image data 802 can be captured of a flat (e.g., batch, pallet) of limes using any of the techniques described herein. The image data 802 can be a hyperspectral image. The image data 802 can then be processed. For example, the image data 802 can be cropped 804 such that only the flat with the limes are depicted. An object detection model (e.g., refer to the object detector model 902 in FIG. 9) can be applied to the cropped image data to detect the limes 806. Bounding boxes can, for example, be determined for each lime. In some implementations, detecting the limes 806 can also include positively identifying a type of produce in each of the bounding boxes. Once each of the limes in the cropped image data are detected (806), a color analysis model (e.g., refer to the color analyzer model 904 in FIG. 9, lime yellowing analyzer 614 in FIG. 6, etc.) can be applied to each bounding box 808. The color analysis model can output numeric values indicating a quality level of each lime in the image data 802. In some implementations, a generic color analysis model, such as the color analyzer model 904, can be applied. In some implementations, a lime color analysis model, such as the lime yellowing analyzer 614, can be applied.

Here, limes that are assigned values of 1 to 9 appear greener, a more preferred color. Limes that are assigned values of 10 to 22 appear yellower, a less preferred color. Limes that are assigned values of 23 to 33 appear a dark yellow or brown color, a least preferred color. For other flats of limes, the assigned values can vary in range and designation of quality based on color.

FIG. 8B depicts another lime quality analysis output 810, which can be generated based on analyzing color 808 in FIG. 8A. As described further in reference to FIG. 17, the output 810 can display color-coded bounding boxes around each identified lime. Limes that are good quality (e.g., based on having a color within a desired threshold range) can be surrounded in green bounding boxes while limes that are bad or poorer quality (e.g., based on having a color that does not fall within the desired threshold range) can be surrounding in red bounding boxes. The output 810 can also include, for each bounding box, an indication of whether the lime is of good quality or bad quality. One or more quality characteristics that were identified based on applying the color analysis 808 to the image data 802 can also be outputted with each bounding box. For example, limes that are surrounded by green bounding boxes and having an indication of "good" may still have some quality characteristics that were identified and consequently outputted in the output 810, such as "Y1," which stands for yellowing with a severity of 1, and "Y2," which stands for yellowing with a severity of 2. Limes that are surrounded by red bounding boxes and having an indication of "bad" may have one or more quality characteristics that were identified and consequently outputted in the output 810, such as "Y1," "Y2," "Y3," which stands for yellowing with a severity of 3, "DS," which stands for desiccation, and "RT," which stands for rot. One or more other quality characteristics can also be presented in the output 810, as described throughout this disclosure.

Figure 9:
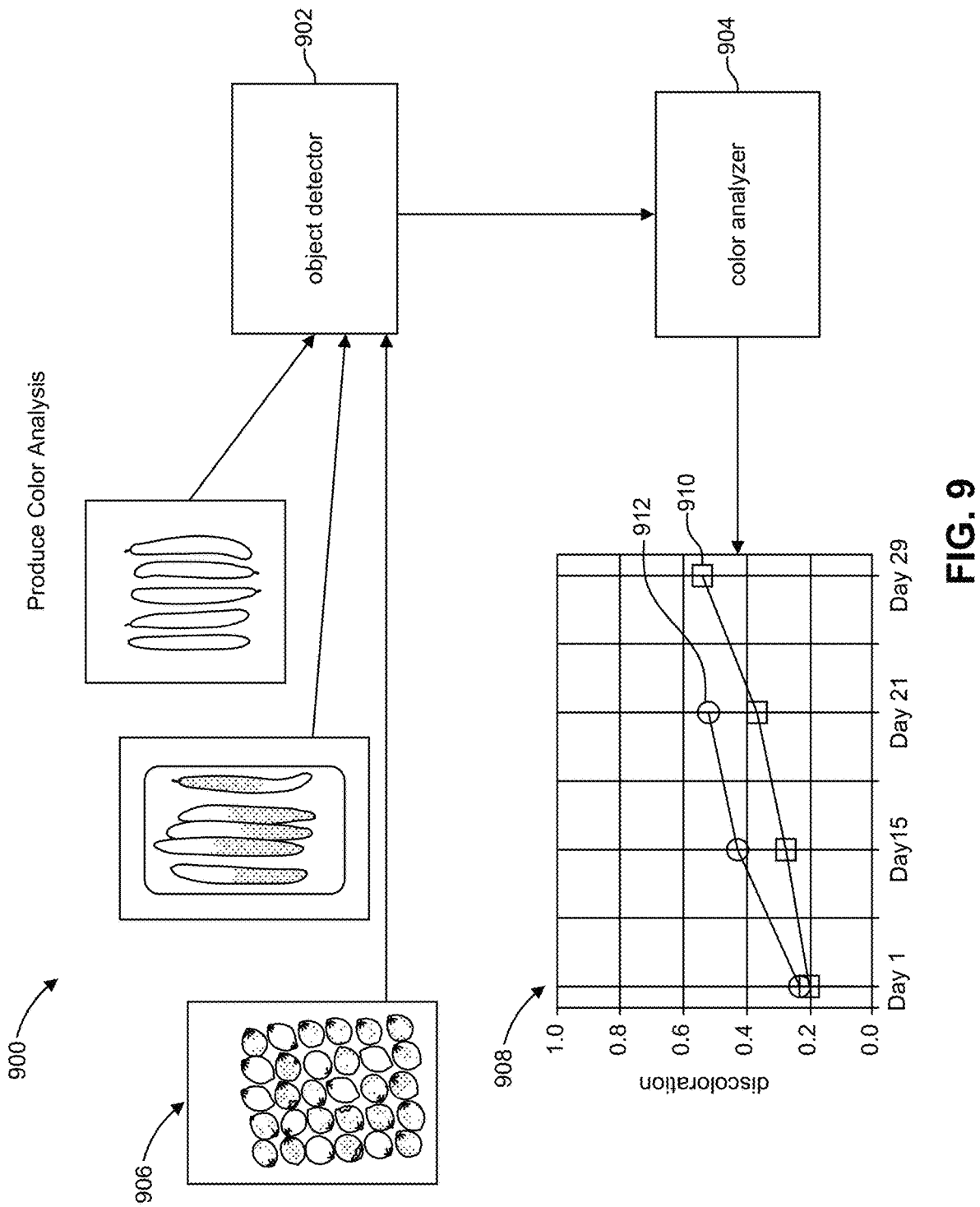
FIG. 9 depicts produce color analysis using image data.

FIG. 9 depicts produce color analysis 900 using image data. The color analysis 900 can be applied to a variety of different types of produce, including but not limited to apples, limes, avocados, zucchini, and cucumbers. The color analysis 900 can be performed by executing one or more models in series. In some implementations, the color analysis 900 can be performed by executing the models in parallel.

Here, an object detector model 902 can be executed in combination with a color analyzer model 904. In some implementations, both the object detector model 902 and the color analyzer model 904 can be trained to analyze color in any type of produce. Sometimes, the object detector model 902 can be trained to identify any type of produce and the color analyzer model 904 can be trained to identify qualities of a particular type of produce. Sometimes, the object detector model 902 can be trained to identify a particular type of produce and the color analyzer model 904 can be trained to identify qualities of any type of produce. In yet some implementations, the object detector model 902 can be trained to identify a particular type of produce and the color analyzer model 904 can be trained to identify qualities of the particular type of produce.

The object detector model 902 can be trained to identify any type of produce using deep learning techniques, such as CNNs. As an example, the model 902 can be trained using approximately 200,000 images with 80 different classes of produce. A regional proposal network (RPN) can be used to train the model to simultaneously predict bounding boxes around each produce in the images and assign confidence scores for each predicted bounding box. A region based convolutional neural network (R-CNN) can also be used to extract the predicted bounding boxes and then perform forward propagation on each predicted bounding box to detect and extract the produce represented therein. In some implementations, the object detector model 902 can also be trained to positively identify a particular type of produce in each of the bounding boxes. In some implementations, one or more other image classification models can be applied to determine a particular type of produce in each bounding box.

Still referring to the color analysis 900, images 906 can be captured of produce using the techniques described herein. The object detector model 902 and the color analyzer model 904 can be applied to the images 906 to generate output 908. The output 908 can indicate discoloration of the produce over time. Produce that is untreated 912 (e.g., that does not have a coating or similar shelf-life extension coating solution) discolors faster and in less time than produce that is treated 910 (e.g., that does have the coating or similar shelf-life extension coating solution). Thus, using the techniques described herein, quality of produce can be tracked over multiple days. The techniques described herein also verify that coating the produce in shelf-life extension coating solution, as shown with the treated produce 910, can cause the produce to discolor slower, thereby maintaining a higher quality for a longer period of time.

Figure 10:
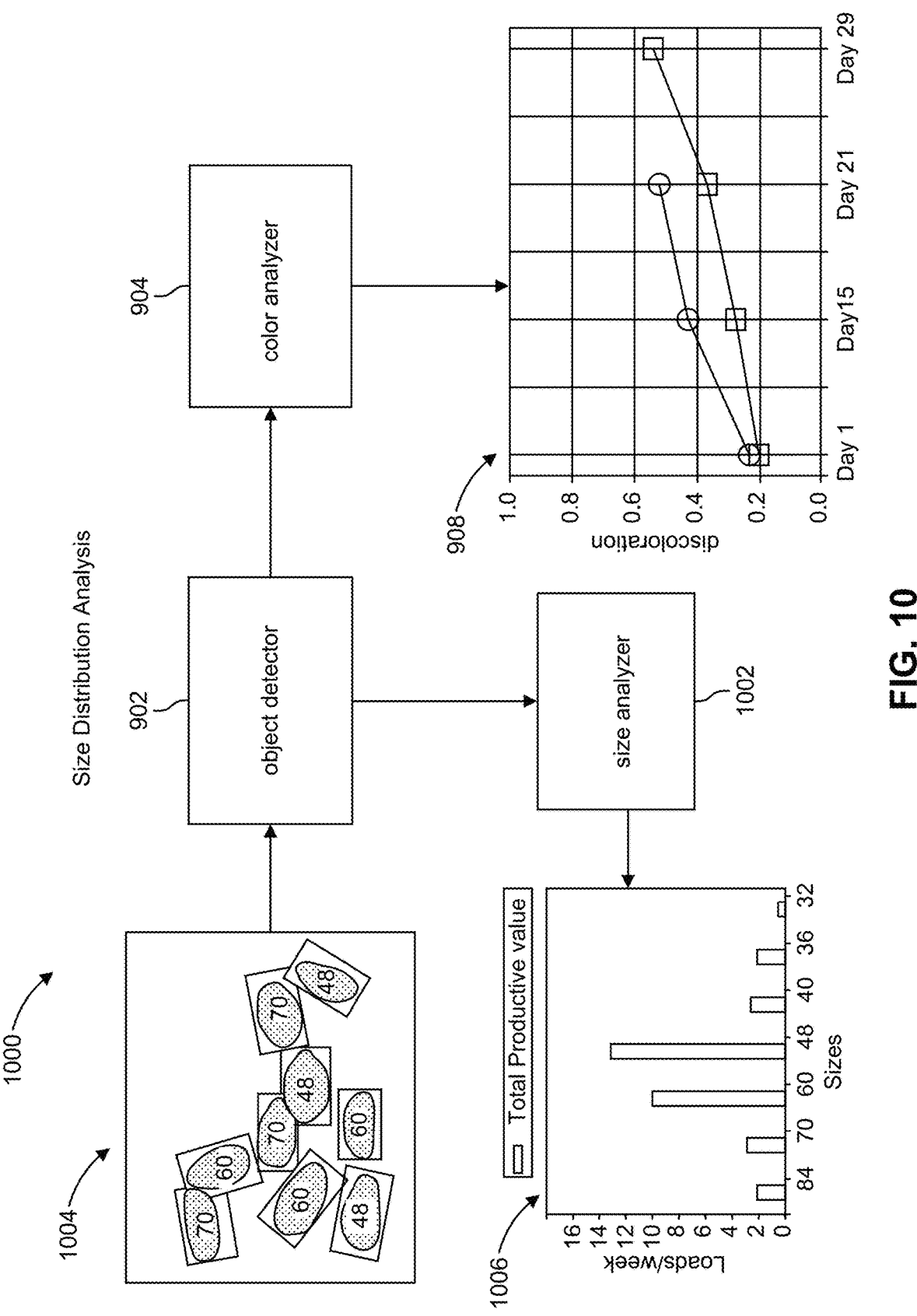
FIG. 10 depicts size distribution analysis using image data.

FIG. 10 depicts size distribution analysis 1000 using image data. The size distribution analysis 1000 can be applied to a variety of different types of produce, including but not limited to apples, limes, avocados, zucchini, and cucumbers. The size distribution analysis 1000 can be performed by executing one or more models in series. In some implementations, the size distribution analysis 1000 can be performed by executing the models in parallel.

Here, the object detector model 902, the color analyzer model 904, and a size analyzer model 1002 can be applied to image data 1004. The output 908 from the color analyzer model 904 can be used in combination with output 1006 from the size analyzer model 1002 to determine overall quality information about treated produce 1008 and untreated produce 1010. For example, the treated produce 1008 may discolor slower over time and be a preferred or desired size. Thus, the treated produce 1008, on average, can be better quality than the untreated produce 1010.

As described herein, the size analyzer model 1002 can be trained to predict a size of each produce that is imaged in the image data 1004 (e.g., refer to FIG. 6). The model 1002 can also be trained to classify the produce based on the predicted size. The model 1002 can also be trained to determine, over time, how many of the produce are classified as each of the predicted sizes.

The size analyzer model 1002 can output bounding boxes around each identified produce in the image data 1004. The model 1002 can also determine a numeric value indicative of the predicted size of the produce in each bounding box. The numeric value can then be outputted, for example, in the bounding box for each produce. In the image data 1004, the size analyzer model 1002 identified produce having the following sizes: 48, 60, and 70.

The size analyzer model 1002 can also generate the output 1006, which is a histogram represented size distribution. An X-axis of the histogram indicates sizes of the produce. A Y-axis of the histogram indicates loads per week. Each bar in the histogram indicates total production volume. Thus, as shown in the output 1006, approximately 12 loads per week have produce in the size range of approximately 49 to 55 while approximately 1 load per week has produce in the size of 33.

Figure 11:
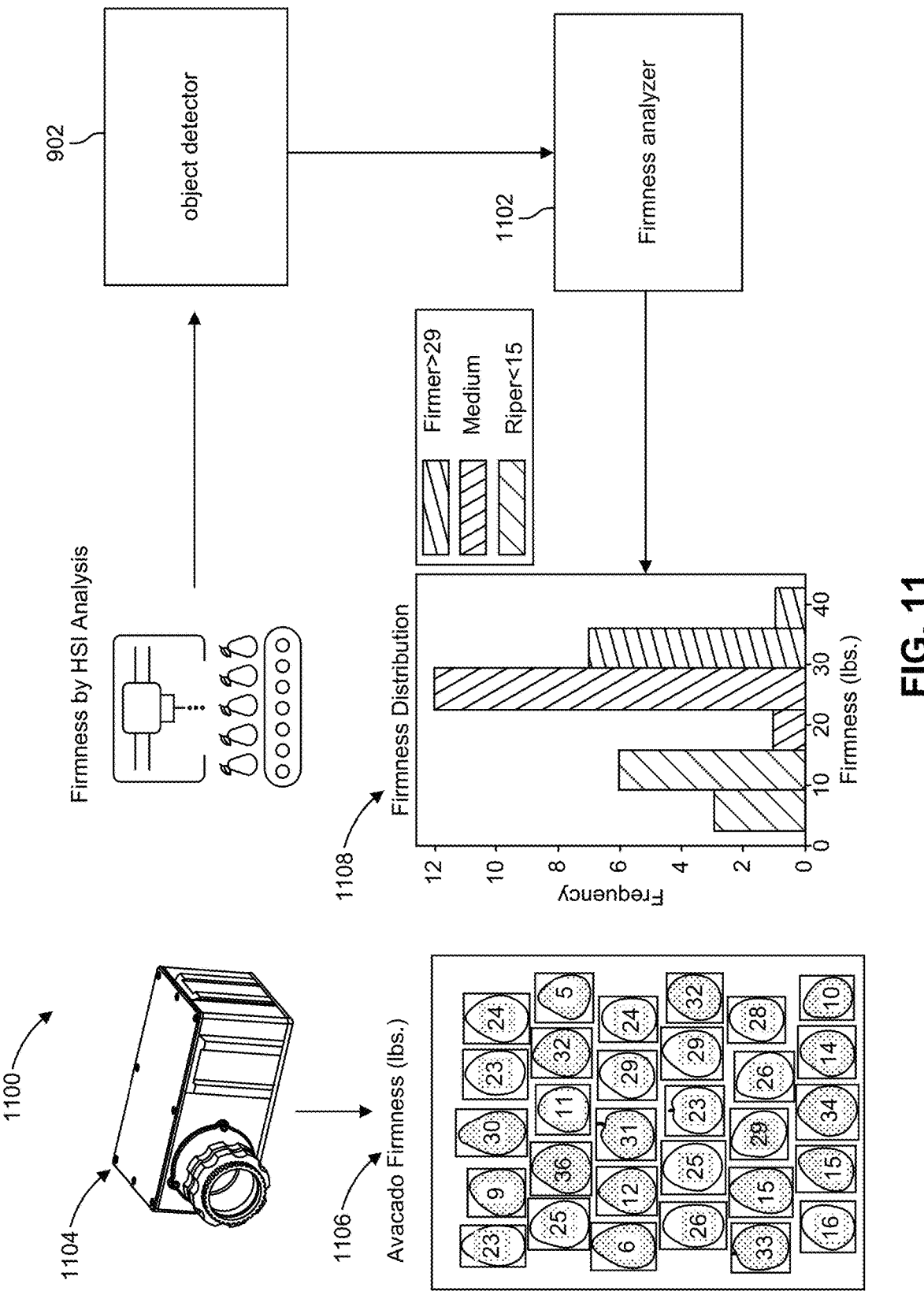
FIG. 11 depicts firmness analysis using hyperspectral image (HSI) data.

FIG. 11 depicts firmness analysis 1100 using hyperspectral image (HSI) data. The firmness analysis 1100 can be applied to a variety of different types of produce, including but not limited to apples, limes, avocados, zucchini, and cucumbers. The firmness analysis 1100 can be performed by executing one or more models in series. In some implementations, the firmness analysis 1100 can be performed by executing the models in parallel.

Figure 12:
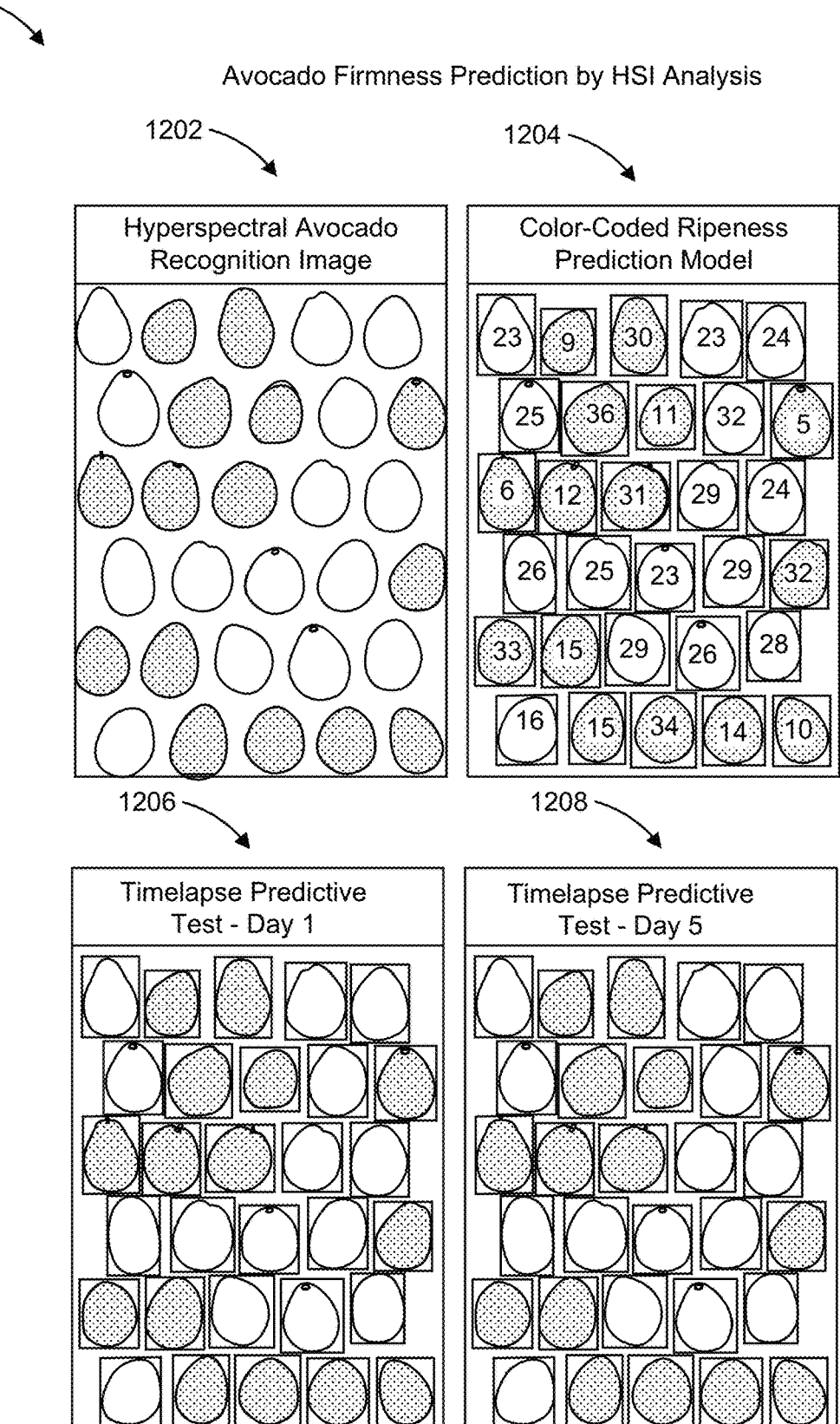
FIG. 12 depicts example avocado firmness prediction using HSI analysis.
Figure 13:
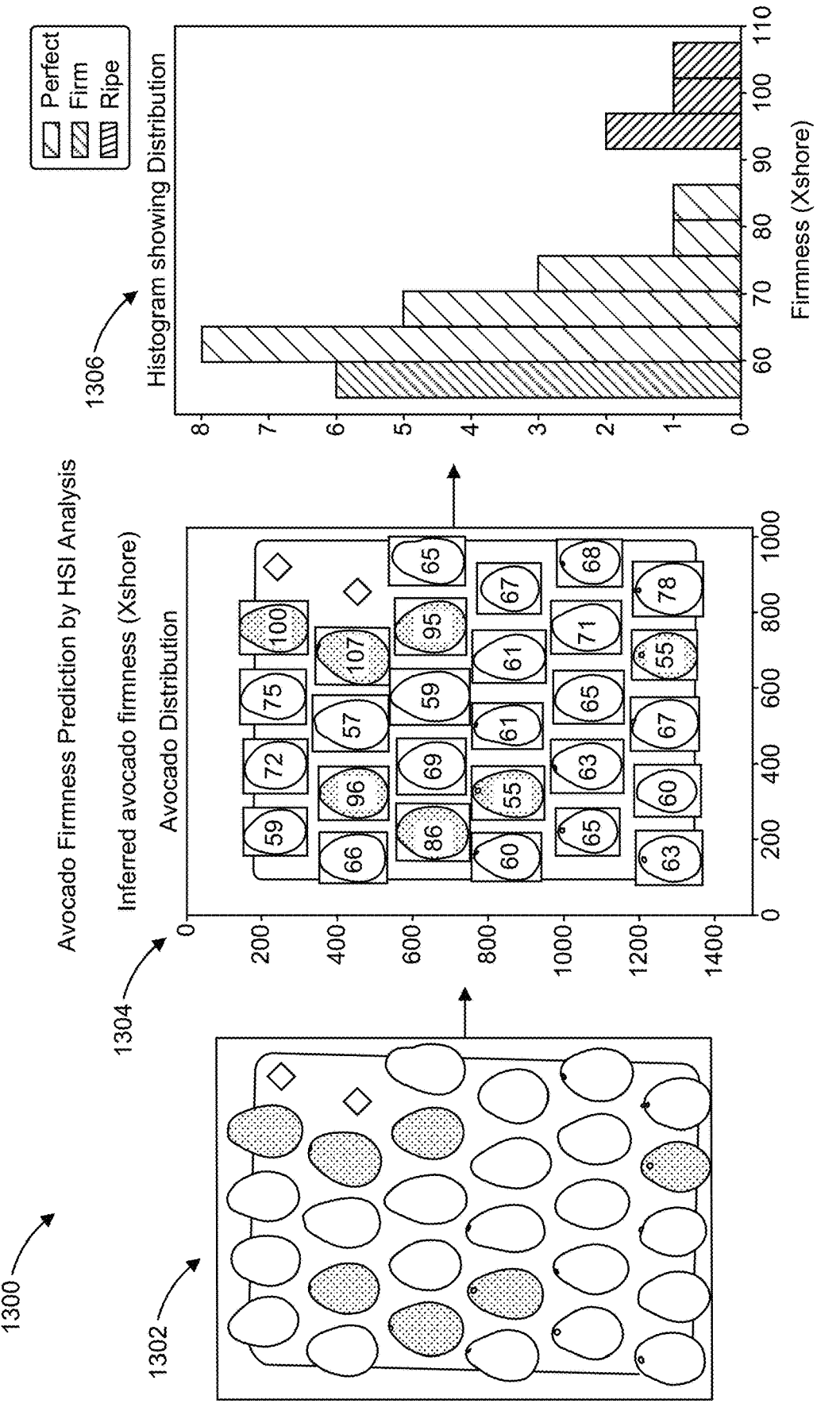
FIG. 13 depicts another example avocado firmness prediction using HSI analysis.

Here, the object detector model 902 can be applied in combination with a firmness analyzer model 1102. Refer to FIGS. 12-13 for further discussion on training the firmness analyzer model 1102 (e.g. the ripeness prediction model in FIG. 12). Produce can be imaged 1104 using an imaging device, such as a hyperspectral imaging camera. The object detector model 902 and the firmness analyzer model 1102 can be applied to the image data 1104 to generate firmness output 1106. As described further below in reference to FIGS. 12-13, the firmness output 1106 can provide color indications (e.g., color-coded bounding boxes) and numeric values indicative of overall firmness and/or ripeness identified for each produce. Firmness distribution output 1108 can also be generated. The firmness distribution output 1108 can be a histogram that depicts distribution of identified firmness for all the produce in the image data 1104. The output 1108 can also be color-coded to depict different levels of firmness that are determined for the particular flat/batch of produce in the image data 1104. For example, in the example of FIG. 11, avocados having an identified firmness value of less than 15 are identified as riper, avocados having an identified firmness value between 15 and 29 are identified as medium (e.g., perfect/ideal ripeness), and avocados having an identified firmness value greater than 29 are identified as firmer. The output 1108 can depict firmness on the X-axis and frequency (e.g., how many avocados in the flat/batch are identified with a particular firmness value and/or firmness value range) on the Y-axis.

FIG. 12 depicts example avocado firmness prediction 1200 using HSI analysis. As described throughout this disclosure, hyperspectral images can be captured of produce, such as avocados, and used to identify features that are not visible to the human eye, such as firmness. Models can be trained using the techniques described herein to infer firmness from the hyperspectral images. Hyperspectral images include pixels having vectors that indicate a spectrum for the particular pixel. The hyperspectral images therefore can provide broader spectral information about produce than other image data. This spectral information can change based on features of the produce. For example, if an avocado is bruised, a difference in the spectrum can be visible for that avocado in comparison to an avocado that is not bruised. The models described herein can be trained to analyze the spectral information on a pixel-by-pixel basis to identify and quantify quality features about the produce. As an example, the models can be trained to identify bruising by detecting levels of intensity in regions of the spectrum. Bruising can be identified, located, and classified where, for example, a level of intensity in regions of the spectrum are below a threshold range. As another example, the models can be trained to identify dry matter content by detecting levels of intensity in regions of the spectrum.

Referring to the firmness prediction 1200 in FIG. 12, hyperspectral image 1202 of a flat (e.g., pallet, batch) of avocados can be captured using an imaging device as described herein. For training purposes, destructive firmness measurements can also be taken of some or all of the avocados in the flat by puncturing the skin of the avocados with a firmness measuring device and/or squeezing the avocados. Average spectra can be extracted from portions of the hyperspectral image 1202. For example, an object detection model can be applied to the hyperspectral image 1202 to generate bounding boxes for each avocado. The average spectra can then be extracted from each bounding box (e.g., each identified avocado in the hyperspectral image 1202). A ripeness prediction model can then be trained, based on the average spectra in each bounding box and the destructive firmness measurements, to predict a condition, such as firmness and/or ripeness, of each avocado. The ripeness prediction model can thus be trained to identify an avocado's condition on a pixel-by-pixel basis. The model takes a mean of all pixels representing the avocado in the bounding box to determine an overall firmness value for that avocado. The ripeness prediction model can then output the firmness value indicative of each produce's overall ripeness. During runtime, destructive measurements may not be taken of the avocados in the flat. Instead, hyperspectral images can be taken, and the ripeness prediction model can be applied to the hyperspectral images to determine firmness values for each avocado in the hyperspectral images.

In some implementations, the model can be run on each pixel separately. This would result in a firmness image of the avocado, where each pixel value can represent a firmness value in that location of the avocado. An overall firmness value for the avocado may be derived from the pixel-based firmness values by taking the mean of the image (e.g., matrix).

Output 1204 from the ripeness prediction model can indicate the firmness value in a variety of ways. For example, the firmness value can be represented as a color-coded bounding box. In other words, the bounding box for each avocado can be represented in one or more colors indicative of the firmness value. A green bounding box can indicate that the avocado is more firm relative to other avocados in the flat. A yellow bounding box can indicate that the avocado is a good level of firmness relative to other avocados in the flat. A red bounding box can indicate that the avocado is less firm relative to other avocados in the flat. In some implementations, the color of the bounding box can indicate firmness on a normalized scale that is applied to all flats of avocados that are imaged. One or more other indicia can also be used to depict the firmness value in the output 1204 (e.g., different shading and/or patterns can be used to depict each bounding box based on the identified firmness value).

The output 1204 can also provide a numeric value indicating an aggregate firmness value for each avocado. The numeric value can be presented in the output 1204 as overlaying the bounding box of the avocado. The numeric value can be on normalized scale of values (e.g., 0 to 100) that is applied to all flats of avocados that are imaged. The numeric value can also be on a scale that is based on a variety of factors, including but not limited to origin, time of year, and other metadata. The numeric value can also be on a scale of values and therefore based on a distribution of firmness values for the particular flat of avocados captured in the hyperspectral image 1202.

In the example output 1204, avocados having firmness values between 5 and 15 are depicted in red bounding boxes, which means these avocados are identified as being less firm or riper. Avocados having firmness values between 16 and 29 are depicted in yellow bounding boxes, which means these avocados are identified as having a good level of firmness, or ideal/perfect ripeness. Avocados having firmness values between 30 and 36 are depicted in green bounding boxes, which means these avocados are identified as being firmer or less ripe.

The output 1204 can be used (e.g. by the computer system 150) to predict avocado ripeness over one or more days. For example, time-lapse 1206 depicts an image of the avocados in the hyperspectral image 1202. Time-lapse 1206 is taken on day 1, when the output 1204 is generated. Each avocado is surrounded by a color-coded bounding box indicating the predicted firmness/ripeness of that avocado using the techniques described herein. As the days go on, hyperspectral images of the avocado flat can be captured and the ripeness prediction model can be applied to noninvasively and non-destructively measure and predict ripeness. Time-lapse 1208 demonstrates the avocados on day 5. As shown, avocados that were in red bounding boxes on day 1 now appear even darker on day 5, which indicates that such avocados are less firm and riper. Color of the avocados are changing as was predicted by applying the ripeness prediction model to the hyperspectral image 1202 on day 1. Thus, the ripeness prediction model can be beneficial to accurately predict firmness and ripeness of avocados without having to destructively measure firmness of the avocado.

FIG. 13 depicts another example avocado firmness prediction 1300 using HSI analysis. As described throughout this disclosure, hyperspectral images can be captured of produce, such as avocados, and used to identify features that are not visible to the human eye, such as firmness. Models can be trained using the techniques described herein to infer firmness from the hyperspectral images. An image 1302 of avocados can be generated as described throughout this disclosure. For example, an image captured by an HSI camera can be used to obtain HSI data. The image 1302 can then be generated from the HSI data. Avocado firmness can be inferred (e.g., Xshore) by applying one or more machine learning trained models to the HSI data of the avocados. As described above, each identified avocado can be assessed for firmness using one or more models. Output from applying the models can include numeric values, other metrics, and/or color (e.g., or other indicia, such as patterns, shapes, shading, etc.) for each of the avocados.

In FIG. 13, inferred avocado firmness output 1304 depicts colored bounding boxes and numeric values for each avocado in the image 1302, as determined by applying the one or more models described herein. Avocados appearing in green bounding boxes can be identified as firm. Avocados appearing in yellow bounding boxes can be identified as perfect firmness. Avocados appearing in red can be identified as ripe. Each of the avocados is also assigned a numeric value that represents the avocado's level of firmness. The numeric values can be within a range. The range can be predetermined. The range can also be relative, such as based on the firmness levels identified for each of the avocados in the image 1302. As shown in the output 1304, avocados having a firmness level of 86 to 107 are identified as firm (in green bounding boxes), avocados having a firmness level of 57 to 78 are identified as perfect (in yellow bounding boxes), and avocados having a firmness level of 55 are identified as ripe (in red bounding boxes).

One or more of the models can also output a histogram 1306 showing distribution of firmness levels for all the avocados in the image 1302. An X axis of the histogram 1306 represents firmness (Xshore) on a scale of 1 to 110. One or more other scales can be used. For example, the scale can be a predetermined generic scale used for quantifying firmness in a particular type of produce. The scale can also be relative and dynamic, based on determined firmness levels for all of the avocados in the image 1302. A Y axis of the histogram 1306 represents frequency on a scale of 0 to 8. As mentioned above, the scale can vary based on predetermined information and/or firmness analysis for all of the avocados in the image 1302. The frequency can indicate how many avocados in a batch have each of the inferred levels of firmness: perfect, firm, and ripe.

In the example histogram 1306, avocados that are identified as ripe (e.g., having a firmness up to 60) have a frequency of 6. Avocados that are identified as perfect (e.g., having a firmness of 60-85) can have varying frequencies. For example, avocados having a firmness between 60 and 65 can have a frequency of 8, avocados having a firmness between 65 and 70 can have a frequency of 5, avocados having a firmness between 70 and 75 can have a frequency of 3, and avocadoes having a firmness between 75 and 85 can have a frequency of 1. Avocados that are identified as firm (e.g., having a firmness of 92-108) can also have varying frequencies. For example, avocados having a firmness between 92 and 95 can have a frequency of 2 and avocados having a firmness between 95 and 108 can have a frequency of 1. As mentioned above, the distribution of firmness levels can vary for each flat, pallet, and/or batch of avocados. Moreover, although FIG. 13 is described in reference to avocados, the techniques, processes, and analysis described herein can also apply to other types of produce, such as the produce described throughout this disclosure.

Figure 14:
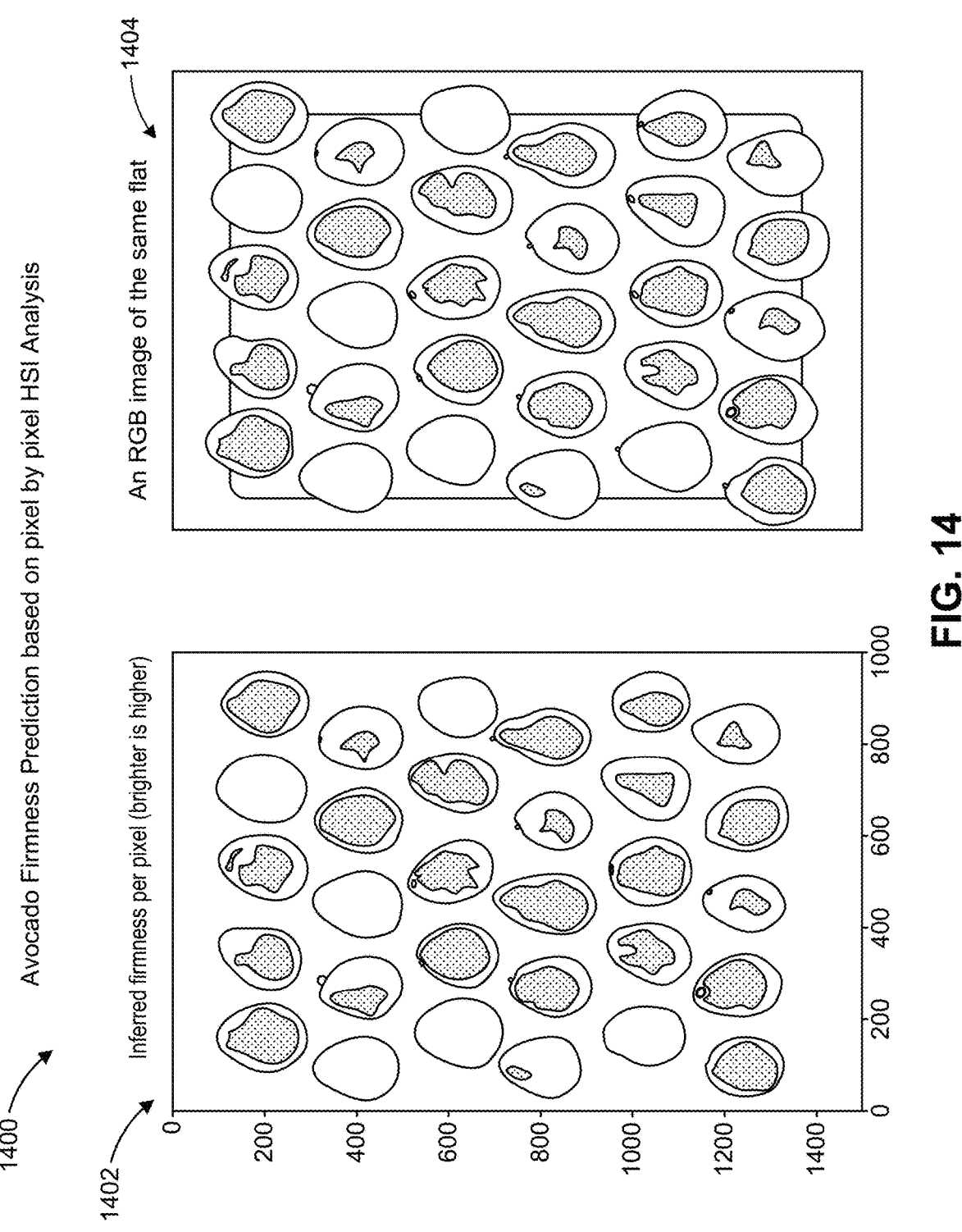
FIG. 14 depicts avocado firmness prediction on a pixel-by-pixel basis in HSI data.

FIG. 14 depicts avocado firmness prediction 1400 on a pixel-by-pixel basis in HSI data. Hyperspectral images can be captured of produce, such as avocados, and used to identify features that are not visible to the human eye, such as firmness. One or more models can be used and trained to identify firmness from hyperspectral images. As a result, destructive techniques, such as puncturing and/or squeezing the produce, may not be necessary to accurately determine firmness of the produce. The models can be trained to infer firmness on a pixel-by-pixel basis, as shown in hyperspectral image data 1402. Pixels that appear brighter (e.g., less transparent, higher opacity, higher brightness) can represent higher or more firmness in the avocado relative to pixels that appear less bright (e.g., more transparent, lower opacity, lower brightness). The pixels can also be represented in one or more other indicia to indicate firmness level. For example, pixels representative of a firmness level that exceeds a predetermined threshold range can be represented in a first color, such as yellow. Pixels representative of a firmness level that is within the threshold range can be represented by a second color, such as green. Pixels representative of a firmness level that is less than the threshold range can be represented by a third color, such as blue. Varying shades and/or degrees of color or other indicia (e.g., patterns, shading, etc.) can be used to output inferred firmness levels for the avocados. The models can also be trained to determine an aggregate firmness level for each avocado based on analysis of the pixels that represent the avocado.

FIG. 14 also depicts an RGB image 1404 of the same group of avocados depicted by the hyperspectral image data 1402. As shown here, the RGB image 1404 merely depicts the external side of the avocados, which is visible to the human eye. From the RGB image 1404, a human may not be able to see firmness. Thus, to infer firmness of the avocados, the human would have to squeeze, puncture, or perform some other destructive technique on the avocados. Accordingly, hyperspectral image data 1402 can provide for more in-depth analysis of quality characteristics of the avocados that may not be visible to the human eye.

Although FIG. 14 is described in reference to avocados, the same techniques, processing, and analysis can be performed with regards to other types of produce described throughout this disclosure.

Figure 15:
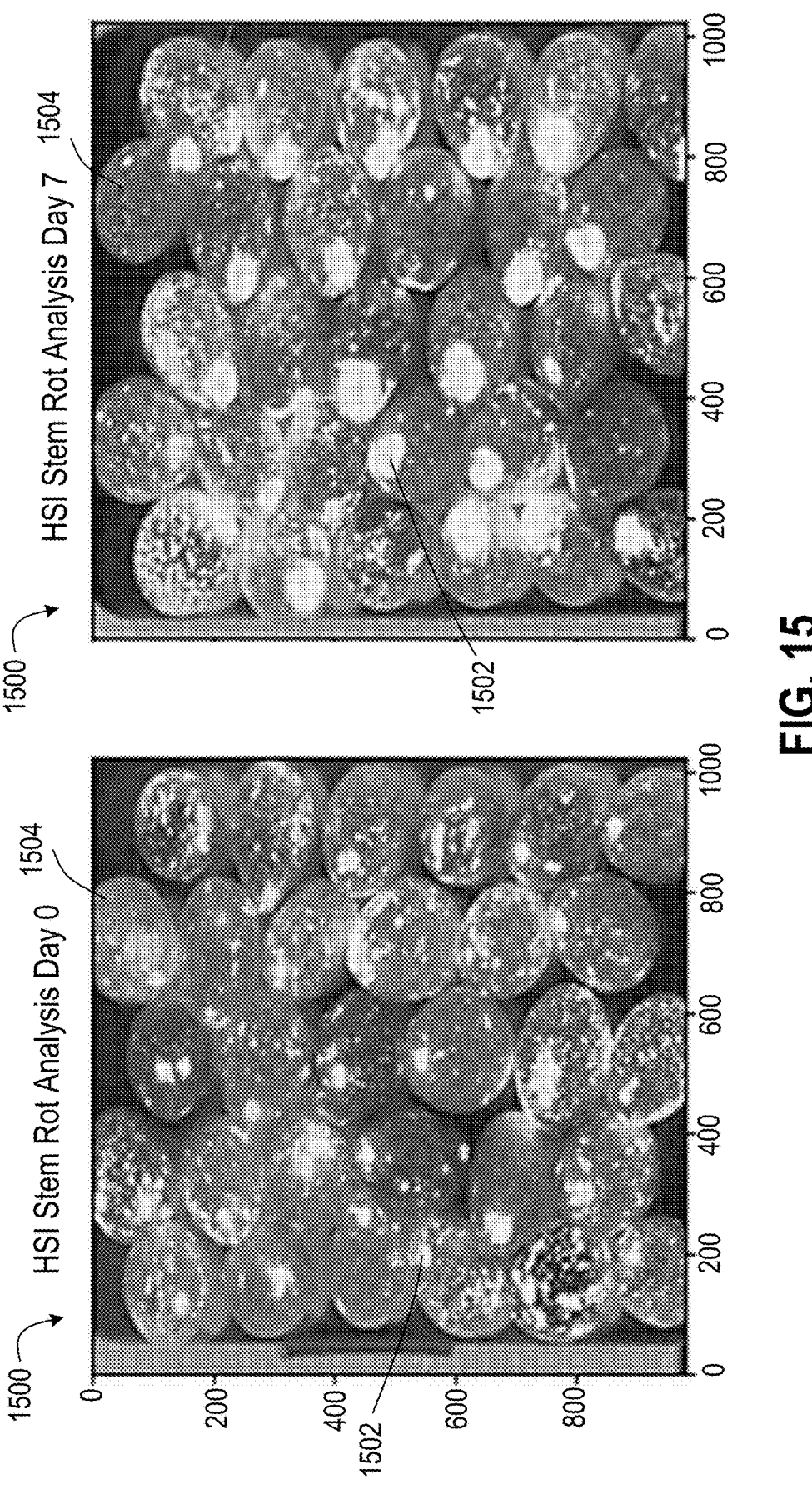
FIG. 15 depicts stem rot analysis using HSI data.

FIG. 15 depicts stem rot analysis 1500 and 1510 using HSI data. Hyperspectral images can be captured of produce, such as avocados, and used to identify features that are not visible to the human eye, such as stem rot. One or more models can be used and trained to identify stem rot from hyperspectral images. The models can be trained, for example, to detect and visualize manifestation of stem rot in each produce that is imaged. In the example analysis 1500 of avocados, which can be taken at day 0, avocados such as avocado 1502 are depicted with more splotches than avocados such as avocado 1504. The splotches in the avocado 1502 can be visualized using indicia such as color and/or patterns (e.g., bright yellow color). For example, the splotches can be visualized in a yellow and/or green color. The splotches represent stem rot. Thus, the avocado 1502 has significantly more stem rot than the avocado 1504, even though it may be a mild case of stem rot, which can appear within a predetermined noise level. The avocado 1504, on the other hand, has few splotches if any. Some of the splotches on the avocado 1504 are more transparent (e.g., lower opacity, lower brightness, etc.) than more prevalent splotches in other avocados, such as the avocado 1502. In other words, the analysis 1500 can return an image depicting varying levels/degrees of stem rot in each avocado. One or more models can also be trained to determine an overall quality metric for each avocado using this image. Avocados having a brighter, higher opacity, and/or colored splotch near a stem of the avocado can have more severe stem rot (and thus be categorized as lower quality) in comparison to avocados having no splotches or a splotch near the stem that is less bright, a lower opacity, and/or not a color indicia representing stem rot (and thus be categorized as higher quality).

The example analysis of 1510 visualizes the same avocados in the analysis 1500. However, the analysis 1510 depicts the avocados on day 7 of imaging. In this example, the avocado 1502 has a noticeably stronger indicia of stem rot near the stem, which is represented by a brighter, high opacity yellow than on day 0 in the analysis 1500. Moreover, the avocado 1504 is also beginning to develop some stem rot in the analysis 1510 on day 7, whereas the avocado 1504 barely showed signs of stem rot in the analysis 1500 on day 0.

Figure 16:
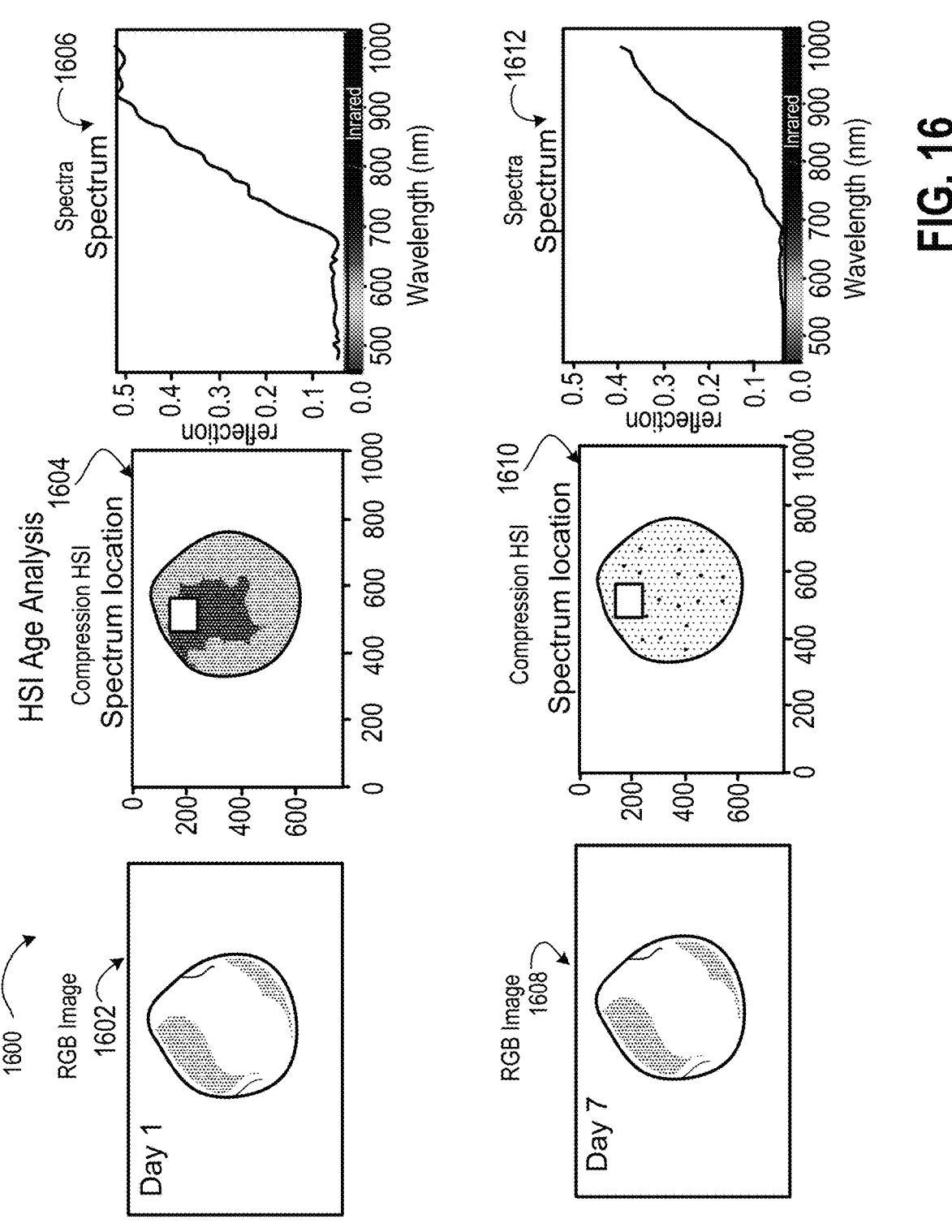
FIG. 16 depicts example age analysis using HSI data.

FIG. 16 depicts example age analysis 1600 using HSI data. Hyperspectral images can be captured of produce, such as avocados, over time and used to identify features that are not visible to the human eye. One of those features is age of the produce. An RGB image 1602 can depict an avocado on day 1 as being green. Compressed HSI data 1604 of the same avocado on day 1 can indicate additional information about the spectrum that the human eye would not be able to identify. One or more models described herein can analyze spectra 1606 from the compressed HSI data 1604 to identify changes in ripeness of the avocado, and therefore identify an age of the avocado. The models can be trained to identify invisible IR range changes in the spectra data 1606, which can indicate that chlorophyll is breaking down and the avocado is aging. RGB image 1608 depicts the same avocado on day 7. Compressed HSI data 1610 indicates additional information about the spectrum that the human eye may not identify. As the avocado aged from day 1 to day 7, its skin wrinkled, the avocado may have shrunk in size/volume, and one or more visual features of the avocado changed, as shown by comparing the compressed HSI data 1604 with the compressed HSI data 1610. Spectra 1612 can be analyzed to identify changes in the ripeness of avocado on day 7, which can then be used to identify an age of the avocado. Although FIG. 16 is described in reference to avocados, the age analysis 1600 using HSI data can also be performed for any other type of produce described throughout this disclosure.

Figure 17:
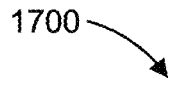
FIG. 17 depicts example output from internal quality analysis of avocados.

FIG. 17 depicts example output 1700 from internal quality analysis of avocados. As described throughout this document, some produce can be cut open and then imaged to assess quality of a batch of the produce. The cut open produce can be placed on a flat, pallet, or otherwise positioned inside a photobox, as described in reference to FIG. 7. Images can be captured of the cut open produce. The images can be RGB images and/or hyperspectral images. The images can be any other type of images described throughout this disclosure. In some implementations, images can be captured of the external side of the produce. That produce can then be cut open such that the inside of the produce can also be imaged. The external and internal images can then be analyzed using the techniques described herein to determine quality of the produce.

As shown in example avocado internal quality analysis output 1700, bounding boxes are identified around each cut open avocado. The bounding boxes can be colored or represented in a different indicia (e.g., a pattern, such as a dotted line, etc.) based on an aggregate quality level determined for each avocado. For example, avocados that, overall, do not have internal defects or have minimal internal defects can be surrounded by a green bounding box. These bounding boxes can also include a metric indicating the determined quality level. For example, green bounding boxes can include a string value of "good." Avocados that have some internal defects, or a quantity of internal defects within a threshold range, can be surrounded by an orange bounding box. These bounding boxes can also include a string value of "okay," which indicates that the avocados have some internal defects that make the avocados neither good nor bad. Avocado s that have internal defects, or a quantity of internal defects that exceeds the threshold range, can be surrounded by a red bounding box. These bounding boxes can also include a string value of "bad." One or more other metrics can be used to identify an overall quality of the produce based on the detected internal defects.

One or more models can be applied to the bounding boxes to determine what types of internal defects exist in each of the avocados and whether the avocados are good, okay, or bad. The identified types of internal defects can also be presented in the output 1700. For example, some avocados that are, overall, "good" quality may still have some internal defects (e.g., internal defects that are below the threshold range). Bounding boxes for those avocados of "good" quality that have some internal defects can be annotated with abbreviations or other metrics indicating the type of defects that are identified. Similarly, avocados that are, overall, "okay" quality or "bad" quality are annotated with abbreviations or other metrics indicating the type of defects that are identified. In the example output of FIG. 17, the abbreviations used can include "DB" for diffuse browning, "VB" for vascular browning, "SR" for stem rot, and "IR" for internal rot.

Although FIG. 17 is described in reference to avocados, the same processes and techniques can be applied to other types of produce to achieve the same or similar results and internal quality analysis output.

In some implementations, internal quality of produce can be assessed using non-destructive techniques. For example, hyperspectral images of the external side of the produce can be used to identify internal quality characteristics beneath a surface of the produce. As another example, an MM can be used to visualize an inside of the produce. An MM scanning system can be positioned in-line (e.g., refer to FIG. 1A) and/or in place of or in conjunction with the photobox 700 (e.g., refer to FIG. 7). A flat or pallet of produce can be placed inside the MRI scanning system to generate MRIs of the produce. The MRI can capture and image fibers within the produce, which can then be analyzed using one or more of the models described herein. As a result, internal defects, such as decay or rotting, can be identified without destructing the produce. As yet another example, an NMR system can be used to nondestructively determine internal quality of the produce.

Figure 18:
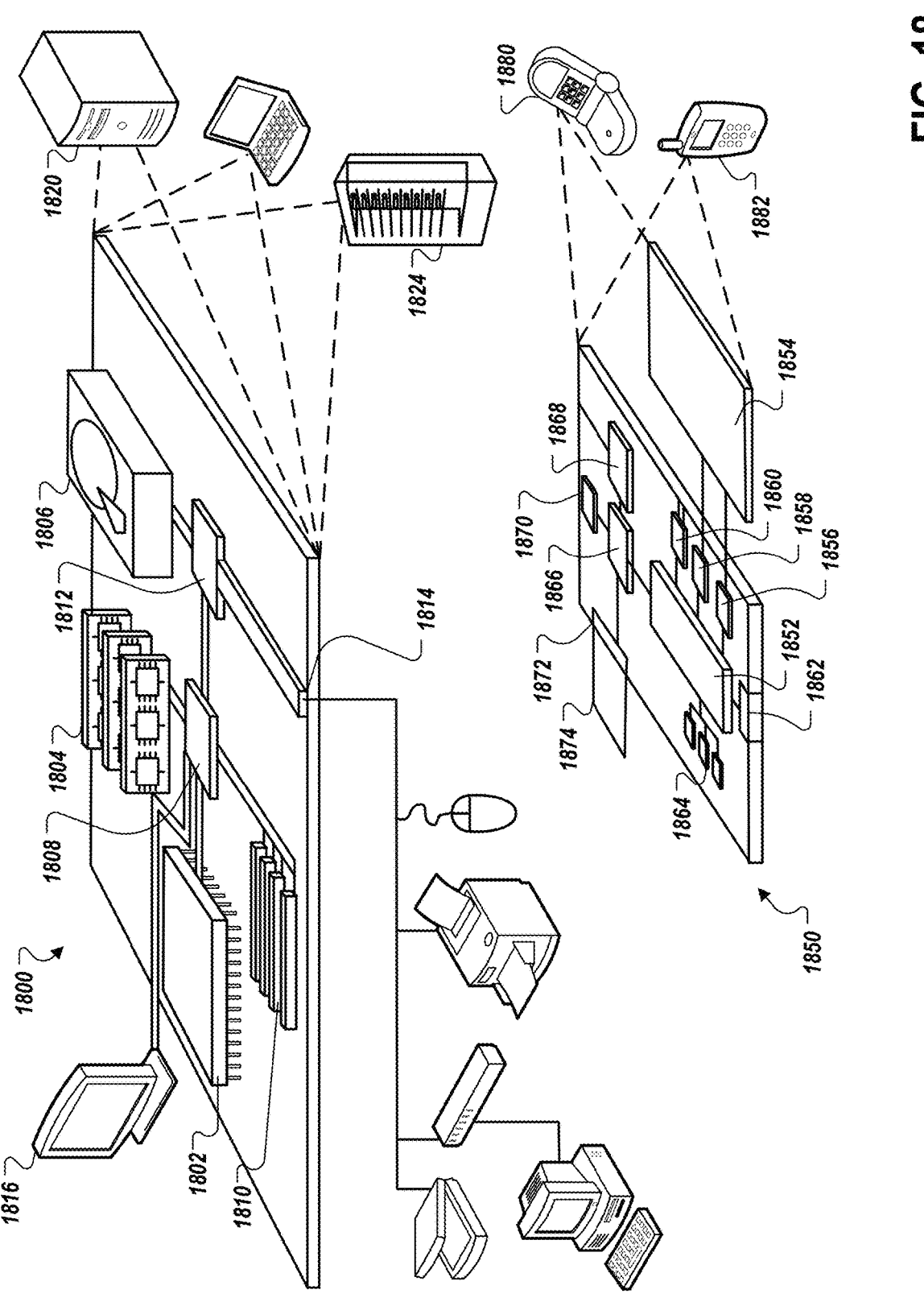
FIG. 18 is a block diagram of system components that can be used to implement a system for assessing the quality of one or more food items.

FIG. 18 is a block diagram of system components that can be used to implement a system for assessing the quality of one or more food items. The computing device 1800 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

The computing device 1800 includes a processor 1802, a memory 1804, a storage device 1806, a high-speed interface 1808 connecting to the memory 1804 and multiple high-speed expansion ports 1810, and a low-speed interface 1812 connecting to a low-speed expansion port 1814 and the storage device 1806. Each of the processor 1802, the memory 1804, the storage device 1806, the high-speed interface 1808, the high-speed expansion ports 1810, and the low-speed interface 1812, are interconnected using various busses, and can be mounted on a common motherboard or in other manners as appropriate. The processor 1802 can process instructions for execution within the computing device 1800, including instructions stored in the memory 1804 or on the storage device 1806 to display graphical information for a GUI on an external input/output device, such as a display 1816 coupled to the high-speed interface 1808. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 1804 stores information within the computing device 1800. In some implementations, the memory 1804 is a volatile memory unit or units. In some implementations, the memory 1804 is a non-volatile memory unit or units. The memory 1804 can also be another form of computer-readable medium, such as a magnetic or optical disk.

The storage device 1806 is capable of providing mass storage for the computing device 1800. In some implementations, the storage device 1806 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 1804, the storage device 1806, or memory on the processor 1802.

The high-speed interface 1808 manages bandwidth-intensive operations for the computing device 1800, while the low-speed interface 1812 manages lower bandwidth-intensive operations. Such allocation of functions is exemplary only. In some implementations, the high-speed interface 1808 is coupled to the memory 1804, the display 1816 (e.g., through a graphics processor or accelerator), and to the high-speed expansion ports 1810, which can accept various expansion cards (not shown). In the implementation, the low-speed interface 1812 is coupled to the storage device 1806 and the low-speed expansion port 1814. The low-speed expansion port 1814, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 1800 can be implemented in a number of different forms, as shown in the figure. For example, it can be implemented as a standard server 1820, or multiple times in a group of such servers. In addition, it can be implemented in a personal computer such as a laptop computer 1822. It can also be implemented as part of a rack server system 1824. Alternatively, components from the computing device 1800 can be combined with other components in a mobile device (not shown), such as a mobile computing device 1850. Each of such devices can contain one or more of the computing device 1800 and the mobile computing device 1850, and an entire system can be made up of multiple computing devices communicating with each other.

The mobile computing device 1850 includes a processor 1852, a memory 1864, an input/output device such as a display 1854, a communication interface 1866, and a transceiver 1868, among other components. The mobile computing device 1850 can also be provided with a storage device, such as a micro-drive or other device, to provide additional storage. Each of the processor 1852, the memory 1864, the display 1854, the communication interface 1866, and the transceiver 1868, are interconnected using various buses, and several of the components can be mounted on a common motherboard or in other manners as appropriate.

The processor 1852 can execute instructions within the mobile computing device 1850, including instructions stored in the memory 1864. The processor 1852 can be implemented as a chipset of chips that include separate and multiple analog and digital processors. The processor 1852 can provide, for example, for coordination of the other components of the mobile computing device 1850, such as control of user interfaces, applications run by the mobile computing device 1850, and wireless communication by the mobile computing device 1850.

The processor 1852 can communicate with a user through a control interface 1858 and a display interface 1856 coupled to the display 1854. The display 1854 can be, for example, a TFT (Thin-Film-Transistor Liquid Crystal Display) display or an OLED (Organic Light Emitting Diode) display, or other appropriate display technology. The display interface 1856 can comprise appropriate circuitry for driving the display 1854 to present graphical and other information to a user. The control interface 1858 can receive commands from a user and convert them for submission to the processor 1852. In addition, an external interface 1862 can provide communication with the processor 1852, so as to enable near area communication of the mobile computing device 1850 with other devices. The external interface 1862 can provide, for example, for wired communication in some implementations, or for wireless communication in other implementations, and multiple interfaces can also be used.

The memory 1864 stores information within the mobile computing device 1850. The memory 1864 can be implemented as one or more of a computer-readable medium or media, a volatile memory unit or units, or a non-volatile memory unit or units. An expansion memory 1874 can also be provided and connected to the mobile computing device 1850 through an expansion interface 1872, which can include, for example, a SIMM (Single In Line Memory Module) card interface. The expansion memory 1874 can provide extra storage space for the mobile computing device 1850, or can also store applications or other information for the mobile computing device 1850. Specifically, the expansion memory 1874 can include instructions to carry out or supplement the processes described above, and can include secure information also. Thus, for example, the expansion memory 1874 can be provide as a security module for the mobile computing device 1850, and can be programmed with instructions that permit secure use of the mobile computing device 1850. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 1864, the expansion memory 1874, or memory on the processor 1852. In some implementations, the computer program product can be received in a propagated signal, for example, over the transceiver 1868 or the external interface 1862.

The mobile computing device 1850 can communicate wirelessly through the communication interface 1866, which can include digital signal processing circuitry where necessary. The communication interface 1866 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 1568 using a radio-frequency. In addition, short-range communication can occur, such as using a Bluetooth, WiFi, or other such transceiver (not shown). In addition, a GPS (Global Positioning System) receiver module 1870 can provide additional navigation- and location-related wireless data to the mobile computing device 1850, which can be used as appropriate by applications running on the mobile computing device 1850.

The mobile computing device 1850 can also communicate audibly using an audio codec 1860, which can receive spoken information from a user and convert it to usable digital information. The audio codec 1860 can likewise generate audible sound for a user, such as through a speaker, e.g., in a handset of the mobile computing device 1850. Such sound can include sound from voice telephone calls, can include recorded sound (e.g., voice messages, music files, etc.) and can also include sound generated by applications operating on the mobile computing device 1850.

The mobile computing device 1850 can be implemented in a number of different forms, as shown in the figure. For example, it can be implemented as a cellular telephone 1880. It can also be implemented as part of a smart-phone 1882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

FIG. 19 depicts example mango wrinkle analysis using image data 1900 and the wrinkle analyzer 670 described in reference to FIG. 6. Using the disclosed techniques, the image data 1900 can be processed 1902 to generate a grid 1904 (e.g., mask) with patches. In the example of FIG. 19, the grid 1904 can include 7 patches horizontally across the image data 1900 and 11 patches vertically down the image data 1900. The image data 1900 can be divided into any other quantity of patches in the grid 1904. For example, the image data 1900 can be divided into more patches in the grid 1904 in order to increase accuracy and/or specificity of total wrinkle coverage.

A classifier 1906, such as a trained machine learning model or neural network, can then classify each of the patches in the grid 1904 (1908) to determine whether each patch is representative of wrinkles or not. The classifier 1906 can be trained using training data having labels that annotate wrinkles in image patches. Therefore, the classifier 1906 can be trained to perform a binary decision such as whether each patch in the grid 1904 contains wrinkles or not. For example, the classifier 1906 can receive image patches 1912A and 1912N. The classifier 1906 can determine that the image patch 1912A contains wrinkles, and therefore assign the image patch 1912A with a binary value 1914A of 1. On the other hand, the classifier 1906 can determine that the image patch 1912N does not contain wrinkles, and therefore assign the image patch 1912N with a binary value 1912B of 0.

Output 1910 can be generated as a result of the classification in 1908. The output 1910 can include, for example, a percent of wrinkle coverage (e.g., a wrinkle coverage score) for the entire mango represented in the image data 1900. The overall percent of wrinkle coverage can be generated based on quantifying (e.g., summating, averaging, or otherwise aggregating) the binary values/determinations for all of the patches in the grid 1904. In some implementations, the overall percent of wrinkle coverage can be determined based on summing all the patches that are classified as wrinkled and dividing the summation by a total quantity of patches in the grid 1904.

In the example of FIG. 19, approximately 5% of the surface of the mango has been identified as covered in wrinkles. In some implementations, the output 1910 can include the image 1900 with the grid 1904 and one or more patches in the grid 1904 that are annotated for (e.g., highlighted, labeled) being classified with wrinkles. Here, 4 patches in the grid 1904 are annotated for being classified as wrinkled, which amounts to a total of 5% of the surface of the mango.

FIG. 20 depicts example strawberry calyx browning analysis using image data 2000 and the calyx browning analyzer 672 described in reference to FIG. 6. Using the disclosed techniques, the image data 2000 of the strawberry can be processed to identify color values and correlate such color values with quality levels. For example, the image data 2000 can be processed to extract certain color channels 2002, such as color channels A-B. A predetermined binary threshold can be applied in 2004 and/or 2006 to the resulting image. A mask with the original RGB image can be applied next in 2008. Color values can be identified and extracted from the resulting image. A median color value can be determined amongst the identified and extracted color values (2010). The median color value can then be compared to one or more calyx browning thresholds to determine whether the strawberry represented in the image data 2000 contains has calyx browning and/or whether the strawberry has a sufficient or threshold amount of calyx browning to lower an overall quality of the strawberry. As described in reference to FIG. 6, the analyzer 672 can generate an overall quality score for the strawberry of "good," "bad," or "ok" based on a comparison of the calculated median color to calyx browning threshold criteria.

FIG. 21 depicts example banana stage analysis using image data and the banana color analyzer 674 described in FIG. 6. Using the disclosed techniques, image data 2100 of bananas can be provided as input to a model 2102. The model 2102 can be a machine learning model and/or neural network that has been trained to extract color values in image data of bananas (e.g., green regions, brown regions) and classify the extracted color values as color metrics that map to stages of ripeness for bananas. The color values can be extracted from the image data using any of the disclosed techniques. The extracted color values can then be checked against threshold color value ranges that each correspond to a different stage of ripeness associated with bananas (e.g., color metric to stage mapping graph 2106). The model 2102 then generates output 2104 indicating a stage of ripeness of the bananas based on the color of the bananas. In the example of FIG. 21, the image data 2100 can be analyzed using the model 2102 by the analyzer 674 to determine that the bananas in the image data 2100 are at stage 5 of banana ripeness, (e.g., on a scale of 1-7 in color stages, where stage 1 being least ripe or before a ripening process is initiated and stage 7 being a most ripe).

FIGS. 22A-B depict example cherry stem color analysis using image data and the cherry stem color analyzer 676 described in reference to FIG. 6. Referring to both FIGS. 22A-B, using the disclosed techniques, object detection techniques 2200 can be applied to image data to identify a cherry in the image data. A bounding box 2202 can be generated around the identified cherry. Stem color analysis 2204 can be performed in order to extract or otherwise isolate the stem from a body of the cherry in the bounding box 2202. For example, as described in reference to the analyzer 676 in FIG. 6, the stem can be isolated using machine learning techniques or a machine learning trained model. The isolated stem can be masked with the original image for color quantification. The stem color analysis 2206 can continue with identifying and extracting one or more color channels in the bounding box 2202, then applying a predetermined binary threshold to the bounding box 2202. As a result, color values of the isolated stem can be extracted and compared to one or more threshold color ranges to determine whether the color of the stem (or the median, average, mean, or other statistical average color value of the stem) corresponds to a "good" quality cherry, an "ok" quality cherry, or a "bad" quality cherry. As show in color analysis output 2208, a threshold quantity of hues or color values can be indicative of "good" quality. Other threshold quantities of hues or color values can also be defined and associated with one or more different quality levels for cherries, as described herein.

FIG. 23 is a flowchart of a process 2300 for determining an overall quality metric for a food item. As described in reference to FIG. 6, the overall quality metric can be determined using nested rules that apply to quality determinations made by different quality assessment analyzers in order to categorize an overall quality of the food item. The process 2300 can be performed by the computer system 150. The process 2300 can also be performed by one or more other computing systems, devices, and/or servers.

Referring to the process 2300 in FIG. 23, the computer system can access quality determinations A-N for a food item in block 2302. The quality determinations A-N can be quality scores or other output generated by one or more quality assessment analyzers that are applied to image data of the food item. Refer to FIG. 6 for further discussion about the quality assessment analyzers and the quality determinations A-N each analyzer may generate. The computer system can poll the quality assessment analyzers for their respective quality determinations A-N. The computer system can also receive the quality determinations A-N from the analyzers as the determinations are made and/or in batch or at predetermined time intervals. In some implementations, the quality determinations A-N can be stored in a data store and then retrieved by the computer system in block 2302.

In block 2304, the computer system can access rule-based mappings of different ranges of values (additionally or alternatively including thresholds) for the quality determinations A-N to different enumerated categories of food item quality. The computer system can access the rule-based mappings from the data store. The computer system can determine which rule-based mappings to access based on a type of the food item being analyzed and/or the quality determinations A-N that are accessed in block 2302. The ranges of values for the quality determinations A-N can vary based on the type of food item. The ranges of values for each quality determination A-N may additionally or alternatively vary based on the type of quality assessment that was performed to generate the quality determination. Moreover, each food item can have different rule-based mappings based on various characteristics of the food item, the food item type, and what quality assessments are used to assess quality of the food item.

The computer system iteratively determines for each of the quality determinations A-N whether a respective rule-based mapping(s) is met (block 2306). The computer system identifies an enumerated category for the food item quality based on determining that the respective rule-based mapping(s) is met (block 2308). For example, if each rule is met for one of the quality determinations A-N, the computer system can identify the category that corresponds to a determination that the rules are met for the particular quality determination. The identified category, for example, can be indicative of a salable or edible food item. On the other hand, if a rule is not met for the quality determination, the computer system can iteratively continue through each of the rule-based mappings for the particular quality determination. If none of the rules are met for the quality determination, the computer system can identify a category of unsalable or nonedible. The computer system can iteratively determine whether each rule for any remaining quality determinations A-N is met.

In block 2310, the computer system can assign the identified category to the food item as an overall quality metric for the food item. The computer system can then return the overall quality metric for the food item in block 2312, as described throughout this disclosure.

As an illustrative example, for a mango, the computer system can access 2 quality determinations in block 2302: a wrinkle score and a color score. In block 2304, the computer system can identify and retrieve the rule-based mappings that correspond to wrinkle scores and color scores for mangos. The rule-based mappings for mango wrinkle scores can have different rules and/or thresholds to be met in order to categorize the food item into one or more different buckets or categories of quality while the rule-based mappings for mango color scores can have other rules and/or threshold to be met in order to categorize the food item into one or more buckets or categories of quality. The computer system can determine in block 2306 that the wrinkle score falls within a threshold range of values that corresponds to an enumerated category of salable or edible. As a result, the computer system identifies the salable or edible category in block 2308 and assigns that category as the overall quality metric for the food item in block 2310. An indication that the particular mango is salable or edible can be returned in block 2312, for example in a GUI display at a relevant user's computing device. The relevant user may then use this indication to determine whether to route the mango to a retail store for sale, where to place the mango on a shelf for sale in the retail store, whether to sell the mango at a higher price or a discounted price, and/or one or more other actions in a supply chain of the mango.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A method for determining quality levels for food items using image data, the method comprising:

receiving, by a computing system and from an imaging device, image data of food items;

performing, by the computing system, object detection on the image data to identify a bounding box around each of the food items in the image data;

determining, by the computing system and based on the bounding box around each of the food items in the image data, a grid structure for the image data, wherein each bounding box is assigned a grid index in the grid structure, wherein the grid index is used to identify the food item in a data store;

identifying, by the computing system and for each of the food items, a quality level of the food item by applying a plurality of trained models to bounding box portions of the image data that contains each of the food items, wherein each of the trained models were trained using image training data of other food items, the image training data being annotated based on previous identifications of a first portion of the other food items as having poor quality features and a second portion of the other food items as having good quality features, wherein the other food items are of a same food type as the food items, wherein the plurality of trained models include a first trained model trained to identify a first quality feature and a second trained model trained to identify a second quality feature that is different than the first quality feature, wherein identifying, by the computing system and for each of the food items, the quality level of the food item comprises:

calibrating colors of the image data to maintain color consistency in the image data;

determining, based on applying a color analyzer trained model to the calibrated bounding box portions of the image data, a median Euclidean distance between a color of the food item in the bounding box portions of the image data and a reference color for the food item, wherein the reference color is associated with a preferred quality level of the food item;

determining whether the median Euclidean distance exceeds a threshold value;

in response to determining that the median Euclidean distance exceeds the threshold value, identifying the quality level of the food item as poor quality; and in response to determining that the median Euclidean distance is less than the threshold value, identifying the quality level of the food item as good quality;

determining, by the computing system and for each of the food items, a quality level score for the food item based on the identified quality level of the food item; and storing, by the computing system and for each of the food items, (i) the bounding box portions of the image data that contains the food items, (ii) the grid index, (iii) the identified quality level of the food item, and (iv) the determined quality level score for the food item in the data store.

2. The method of claim 1, further comprising:

retrieving, by the computing system and for each of the food items, the quality level score for the food item from the data store;

identifying, by the computing system, supply chain information for the food item that includes a preexisting supply chain schedule and destination for the food item;

determining, by the computing system, whether to modify the supply chain information for the food item based on the retrieved quality level score;

in response to a determination to modify the supply chain information, generating, by the computing system, modified supply chain information based on the received quality level score, wherein the modified supply chain information includes one or more of a modified supply chain schedule and modified destination for the food item; and transmitting, by the computing system, the modified supply chain information to one or more supply chain actors to implement the modified supply chain information.

3. The method of claim 2, wherein the modified supply chain information includes instructions that, when executed by the one or more supply chain actors, cause at least one of (i) the food item to be moved for outbound shipment to a food processing plant, (ii) a change in controlled atmospheric conditions surrounding the food item, (iii) a change in ripening conditions of the food item, (iv) a change to cold storage conditions for the food item, or (v) the food item to be moved for outbound shipment to end-consumers that are geographically closest to a location of the food item.

4. The method of claim 1, further comprising:

identifying, by the computing system and using object recognition, a type of the food items depicted in the image data; and selecting, by the computing system and based on the identified type of the food items, one or more of the plurality of trained models to apply to the bounding box portions of the image data, wherein the selected trained models were trained to identify quality features of food items of the same type.

5. The method of claim 1, wherein identifying, by the computing system and for each of the food items, a quality level of the food item comprises:

determining, based on applying an apple yellowing trained model to the bounding box portions of the image data that contain each of the food items, a degree to which the food item has yellowed; and assigning, based on the degree to which the food item has yellowed, the quality level score of the food item, wherein a score greater than or equal to 0 but less than a threshold level indicates (i) good quality and (ii) no yellowing and a score equal to or less than 100 but greater than the threshold level indicates (i) poor quality and (ii) maximum yellowing of the food item.

6. The method of claim 1, wherein identifying, by the computing system and for each of the food items, a quality level of the food item comprises:

determining, based on applying a lime yellowing trained model to the bounding box portions of the image data that contain each of the food items, a degree to which the food item has yellowed; and assigning, based on the degree to which the food item has yellowed, the quality level score of the food item, wherein a score greater than or equal to a first threshold level but less than a second threshold level indicates (i) good quality and (ii) no yellowing and a score equal to or less than a third threshold level but greater than the second threshold level indicates (i) poor quality and (ii) maximum yellowing.

7. A method for determining quality levels for food items using image data, the method comprising, receiving, by a computing system and from an imaging device, image data of food items;

performing, by the computing system, object detection on the image data to identify a bounding box around each of the food items in the image data;

determining, by the computing system and based on the bounding box around each of the food items in the image data, a grid structure for the image data, wherein each bounding box is assigned a grid index in the grid structure, wherein the grid index is used to identify the food item in a data store;

identifying, by the computing system and for each of the food items, a quality level of the food item by applying a plurality of trained models to bounding box portions of the image data that contains each of the food items, wherein each of the trained models were trained using image training data of other food items, the image training data being annotated based on previous identifications of a first portion of the other food items as having poor quality features and a second portion of the other food items as having good quality features, wherein the other food items are of a same food type as the food items, wherein the plurality of trained models include a first trained model trained to identify a first quality feature and a second trained model trained to identify a second quality feature that is different than the first quality feature, wherein the quality level score for the food item is an overall quality metric for the food item and wherein the overall quality metric is determined by:

accessing, from a data store, rule-based mappings of (i) different ranges of values for scores corresponding to identification of the first and second quality features to (ii) enumerated categories of food item quality, wherein the enumerated categories of food item quality include at least one of salable, unsalable, edible, nonedible, good quality, bad quality, and okay quality;

iteratively determining, for each of the first and second quality features, whether respective rule-based mappings are met;

identifying, based on the respective rule-based mappings being met, an enumerated category of food item quality for the food item; and assigning the identified category to the food item as the overall quality metric for the food item;

determining, by the computing system and for each of the food items, a quality level score for the food item based on the identified quality level of the food item; and storing, by the computing system and for each of the food items, (i) the bounding box portions of the image data that contains the food items, (ii) the grid index, (iii) the identified quality level of the food item, and (iv) the determined quality level score for the food item in the data store.

8. The method of claim 1, wherein identifying, by the computing system and for each of the food items, a quality level of the food item comprises:

calibrating colors of the image data to maintain color consistency in the image data;

obtaining color samples for each food item in the calibrated bounding box portions of the image data;

mapping the color samples into a multi-dimensional color space;

identifying a direction of maximal color change across all of the color samples;

predicting a location of the maximal color change along the identified direction for the food item, wherein the location of the maximal color change is a one-dimensional quality metric for the food item; and identifying the quality level of the food item as good quality based on determining that the one-dimensional quality metric for the food item is within a threshold quality range.

9. The method of claim 7, wherein identifying, by the computing system and for each of the food items, a quality level of the food item comprises:

assigning, based on applying a wrinkle analyzer model to each of the bounding box portions of the image data that contain each of the food items, a binary value indicating whether wrinkles are present or absent on a surface of the food item represented in the bounding box portion;

determining, a percentage of wrinkle coverage on the surface of the food item represented by the bounding box portions of the image data based on (i) summating a quantity of the bounding box portions that are assigned a binary value indicating that wrinkles are present on the surface of the food item represented in the corresponding bounding box portions and (ii) dividing the summation by a total quantity of the bounding box portions of the image data; and assigning, based on the determined percentage of wrinkle coverage satisfying threshold wrinkle criteria, the quality level score of the food item, wherein the score is a binary value indicating whether wrinkles are present on or absent from the surface of the food item.

10. The method of claim 1, wherein identifying, by the computing system and for each of the food items, the quality level of the food item comprises:

determining, based on applying a calyx browning-trained model to the bounding box portions of the image data that contain each of the food items, a median color value of the food item; and assigning, based on the median color value of the food item, the quality level score of the food item, wherein the quality level score is assigned (i) a string value of "good" based on the median color value being less than a first threshold color range, (ii) a string value of "ok" based on the median color value being greater than the first threshold color range and less than a second threshold color range, and (iii) a string value of "bad" based on the median color value being greater than the second threshold color range.

11. The method of claim 1, wherein identifying, by the computing system and for each of the food items, the quality level of the food item comprises:

determining, based on applying a banana stage analyzer-trained model to the bounding box portions of the image data that contain each of the food items, a color value of the food item; and assigning, based on mapping the color value of the food item to expected threshold color values for a plurality of ripeness stages, the quality level score of the food item, wherein the quality level score is a string value indicating a current ripeness stage of the food item.

12. The method of claim 1, wherein identifying, by the computing system and for each of the food items, the quality level of the food item comprises:

extracting, based on applying an object detection model to the bounding box portions of the image data that contain each of the food items, a stem of the food item;

determining, based on applying a cherry stem color-trained model to the extracted stem of the food item, a median color value of the stem of the food item; and assigning, based on the median color value of the stem of the food item, the quality level score of the food item, wherein the quality level score is assigned (i) a string value of "good" based on the median color value being within a first threshold color range, (ii) a string value of "ok" based on the median color value being within a second threshold color range that does not include the first threshold color range, and (iii) a string value of "bad" based on the median color value being within a third threshold color range that does not include at least the first threshold color range.

13. The method of claim 1, wherein the plurality of trained models were trained using at least one of convolutional neural networks (CNNs) and Partial Least Squares (PLSs).

14. The method of claim 1, wherein the image data includes at least one of RGB images, hyperspectral images, multispectral images, thermal images, nuclear magnetic resonance (NMR) images, and magnetic resonance images (MRIs).

15. A method for determining quality levels for food items using image data, the method comprising:

receiving, by a computing system and from an imaging device, image data of food items;

performing, by the computing system, object detection on the image data to identify a bounding box around each of the food items in the image data;

determining, by the computing system and based on the bounding box around each of the food items in the image data, a grid structure for the image data, wherein each bounding box is assigned a grid index in the grid structure, wherein the grid index is used to identify the food item in a data store;

identifying, by the computing system and for each of the food items, a quality level of the food item by applying a plurality of trained models to bounding box portions of the image data that contains each of the food items, wherein each of the trained models were trained using image training data of other food items, the image training data being annotated based on previous identifications of a first portion of the other food items as having poor quality features and a second portion of the other food items as having good quality features, wherein the other food items are of a same food type as the food items, wherein the plurality of trained models include a first trained model trained to identify a first quality feature and a second trained model trained to identify a second quality feature that is different than the first quality feature, wherein identifying, by the computing system and for each of the food items, the quality level of the food item comprises:

identifying, based on applying an internal quality trained model to the bounding box portions of the image data that contain each of the food items, internal quality defects in the food item, wherein the internal quality trained model was trained using image training data of other food items being previously annotated as having no internal defects, diffuse browning, vascular browning, flesh adhesion, internal rot, stem rot, and tissue breakdown; and determining, based on the internal quality defects, an overall quality level score of the food item, wherein a score of "good" indicates no internal quality defects in the food item, a score of "okay" indicates some internal quality defects in the food item, and a score of "bad" indicates most internal quality defects in the food item;

determining, by the computing system and for each of the food items, a quality level score for the food item based on the identified quality level of the food item; and storing, by the computing system and for each of the food items, (i) the bounding box portions of the image data that contains the food items, (ii) the grid index, (iii) the identified quality level of the food item, and (iv) the determined quality level score for the food item in the data store.

16. The method of claim 15, wherein identifying, by the computing system and for each of the food items, the quality level of the food item comprises:

determining, based on applying dry matter trained model to the bounding box portions of the image data that contain each of the food items, dry matter content of the food item; and wherein the quality level score of the food item is identified as a numeric value that indicates a quantity of the dry matter content of the food item.

17. A method for determining quality levels for food items using image data, the method comprising receiving, by a computing system and from an imaging device, image data of food items;

performing, by the computing system, object detection on the image data to identify a bounding box around each of the food items in the image data;

determining, by the computing system and based on the bounding box around each of the food items in the image data, a grid structure for the image data, wherein each bounding box is assigned a grid index in the grid structure, wherein the grid index is used to identify the food item in a data store;

identifying, by the computing system and for each of the food items, a quality level of the food item by applying a plurality of trained models to bounding box portions of the image data that contains each of the food items, wherein each of the trained models were trained using image training data of other food items, the image training data being annotated based on previous identifications of a first portion of the other food items as having poor quality features and a second portion of the other food items as having good quality features, wherein the other food items are of a same food type as the food items, wherein the plurality of trained models include a first trained model trained to identify a first quality feature and a second trained model trained to identify a second quality feature that is different than the first quality feature, wherein identifying, by the computing system and for each of the food items, the quality level of the food item comprises:

identifying, based on applying a product identifier trained model to the bounding box portions of the image data that contain each of the food items, a product label on the food item; and decoding, using optical character recognition (OCR), at least one of text and a product identifier on the product label, wherein identifying, based on the decoded at least one of text and a product identifier on product label, the quality level score of the food item as a string value that includes at least one of the decoded text and the product identifier;

determining, by the computing system and for each of the food items, a quality level score for the food item based on the identified quality level of the food item; and storing, by the computing system and for each of the food items, (i) the bounding box portions of the image data that contains the food items, (ii) the grid index, (iii) the identified quality level of the food item, and (iv) the determined quality level score for the food item in the data store.

18. The method of claim 7, wherein identifying, by the computing system and for each of the food items, the quality level of the food item comprises:

determining, based on applying a shape trained model to the bounding box portions of the image data that contain each of the food items, a shape of the food item; and wherein the quality level score of the food item is determined as a numeric value that indicates a bend radius of the food item.

19. A system for determining quality levels for food items using image data, the system comprising:

one or more imaging devices configured to measure image data for food items of a same food type; and at least one computing system configured to:

receive, from the one or more imaging devices, image data of the food items;

perform object detection on the image data to identify a bounding box around each of the food items in the image data;

determine, based on the bounding box around each of the food items in the image data, a grid structure for the image data, wherein each bounding box is assigned a grid index in the grid structure, wherein the grid index is used to identify the food item in a data store;

identify, for each of the food items, a quality level of the food item by applying a plurality of trained models to bounding box portions of the image data that contains each of the food items, wherein each of the trained models were trained using image training data of other food items, the image training data being annotated based on previous identifications of a first portion of the other food items as having poor quality features and a second portion of the other food items as having good quality features, wherein the other food items are of a same food type as the food items, wherein the plurality of trained models include a first trained model trained to identify a first quality feature and a second trained model trained to identify a second quality feature that is different than the first quality feature, wherein identifying, by the computing system and for each of the food items, the quality level of the food item comprises:

calibrating colors of the image data to maintain color consistency in the image data;

determining, based on applying a color analyzer trained model to the calibrated bounding box portions of the image data, a median Euclidean distance between a color of the food item in the bounding box portions of the image data and a reference color for the food item, wherein the reference color is associated with a preferred quality level of the food item;

determining whether the median Euclidean distance exceeds a threshold value;

in response to determining that the median Euclidean distance exceeds the threshold value, identifying the quality level of the food item as poor quality; and in response to determining that the median Euclidean distance is less than the threshold value, identifying the quality level of the food item as good quality;

determine, for each of the food items, a quality level score for the food item based on the identified quality level of the food item; and store, for each of the food items, (i) the bounding box portions of the image data that contains the food items, (ii) the grid index, (iii) the identified quality level of the food item, and (iv) the determined quality level score for the food item in the data store.

20. A system for determining quality levels for food items using image data, the system comprising:

a photobox having first, second, third, and fourth walls and a ceiling, wherein the photobox comprises:

an opening on the first wall that is configured to receive a flat containing food items of a same food type;

a flap configured to cover the opening to prevent ambient light from entering the photobox;

at least one light configured inside the photobox that provides consistent lighting to illuminate the flat containing the food items; and one or more imaging devices attached to the ceiling of the photobox and configured to capture image data of the food items on the flat; and at least one computing system configured to:

receive, from the one or more imaging devices, image data of the food items;

perform object detection on the image data to identify a bounding box around each of the food items in the image data;

determine, based on the bounding box around each of the food items in the image data, a grid structure for the image data, wherein each bounding box is assigned a grid index in the grid structure, wherein the grid index is used to identify the food item in a data store;

identify, for each of the food items, a quality level of the food item by applying a plurality of trained models to bounding box portions of the image data that contains each of the food items, wherein each of the trained models were trained using image training data of other food items, the image training data being annotated based on previous identifications of a first portion of the other food items as having poor quality features and a second portion of the other food items as having good quality features, wherein the other food items are of a same food type as the food items, wherein the plurality of trained models include a first trained model trained to identify a first quality feature and a second trained model trained to identify a second quality feature that is different than the first quality feature;

determine, for each of the food items, a quality level score for the food item based on the identified quality level of the food item; and store, for each of the food items, (i) the bounding box portions of the image data that contains the food items, (ii) the grid index, (iii) the identified quality level of the food item, and (iv) the determined quality level score for the food item in the data store.

21. The system of claim 20, wherein the photobox further comprises a camera rig configured to extend across the ceiling of the photobox, wherein:

the camera rig includes three tubes connected at a tee connector, a first tube extends from the tee connector to the first wall, a second tube extends from the tee connector to the second wall, the second wall is opposite the first wall, and a third tube extends from the tee connector to the third wall, the third tube is perpendicular to the first and second tubes, and the one or more imaging devices are mounted to the camera rig proximate the tee connector and along at least one of the three tubes.

22. A system for determining quality levels for food items using image data, the system comprising:

one or more imaging devices configured to measure image data for food items of a same food type; and at least one computing system configured to perform operations comprising:

receiving, by a computing system and from an imaging device, image data of food items;

performing, by the computing system, object detection on the image data to identify a bounding box around each of the food items in the image data;

determining, by the computing system and based on the bounding box around each of the food items in the image data, a grid structure for the image data, wherein each bounding box is assigned a grid index in the grid structure, wherein the grid index is used to identify the food item in a data store;

identifying, by the computing system and for each of the food items, a quality level of the food item by applying a plurality of trained models to bounding box portions of the image data that contains each of the food items, wherein each of the trained models were trained using image training data of other food items, the image training data being annotated based on previous identifications of a first portion of the other food items as having poor quality features and a second portion of the other food items as having good quality features, wherein the other food items are of a same food type as the food items, wherein the plurality of trained models include a first trained model trained to identify a first quality feature and a second trained model trained to identify a second quality feature that is different than the first quality feature, wherein identifying, by the computing system and for each of the food items, the quality level of the food item comprises:

identifying, based on applying an internal quality trained model to the bounding box portions of the image data that contain each of the food items, internal quality defects in the food item, wherein the internal quality trained model was trained using image training data of other food items being previously annotated as having no internal defects, diffuse browning, vascular browning, flesh adhesion, internal rot, stem rot, and tissue breakdown; and determining, based on the internal quality defects, an overall quality level score of the food item, wherein a score of "good" indicates no internal quality defects in the food item, a score of "okay" indicates some internal quality defects in the food item, and a score of "bad" indicates most internal quality defects in the food item;

determining, by the computing system and for each of the food items, a quality level score for the food item based on the identified quality level of the food item; and storing, by the computing system and for each of the food items, (i) the bounding box portions of the image data that contains the food items, (ii) the grid index, (iii) the identified quality level of the food item, and (iv) the determined quality level score for the food item in the data store.

23. A system for determining quality levels for food items using image data, the system comprising:

one or more imaging devices configured to measure image data for food items of a same food type; and at least one computing system configured to perform operations comprising:

receiving, by a computing system and from an imaging device, image data of food items;

performing, by the computing system, object detection on the image data to identify a bounding box around each of the food items in the image data;

determining, by the computing system and based on the bounding box around each of the food items in the image data, a grid structure for the image data, wherein each bounding box is assigned a grid index in the grid structure, wherein the grid index is used to identify the food item in a data store;

identifying, by the computing system and for each of the food items, a quality level of the food item by applying a plurality of trained models to bounding box portions of the image data that contains each of the food items, wherein each of the trained models were trained using image training data of other food items, the image training data being annotated based on previous identifications of a first portion of the other food items as having poor quality features and a second portion of the other food items as having good quality features, wherein the other food items are of a same food type as the food items, wherein the plurality of trained models include a first trained model trained to identify a first quality feature and a second trained model trained to identify a second quality feature that is different than the first quality feature, wherein identifying, by the computing system and for each of the food items, the quality level of the food item comprises:

identifying, based on applying a product identifier trained model to the bounding box portions of the image data that contain each of the food items, a product label on the food item; and decoding, using optical character recognition (OCR), at least one of text and a product identifier on the product label, wherein identifying, based on the decoded at least one of text and a product identifier on product label, the quality level score of the food item as a string value that includes at least one of the decoded text and the product identifier;

determining, by the computing system and for each of the food items, a quality level score for the food item based on the identified quality level of the food item; and storing, by the computing system and for each of the food items, (i) the bounding box portions of the image data that contains the food items, (ii) the grid index, (iii) the identified quality level of the food item, and (iv) the determined quality level score for the food item in the data store.

24. A system for determining quality levels for food items using image data, the system comprising:

one or more imaging devices configured to measure image data for food items of a same food type; and one or more imaging devices configured to measure image data for food items of a same food type; and at least one computing system configured to perform operations comprising:

receiving, by a computing system and from an imaging device, image data of food items;

performing, by the computing system, object detection on the image data to identify a bounding box around each of the food items in the image data;

determining, by the computing system and based on the bounding box around each of the food items in the image data, a grid structure for the image data, wherein each bounding box is assigned a grid index in the grid structure, wherein the grid index is used to identify the food item in a data store;

identifying, by the computing system and for each of the food items, a quality level of the food item by applying a plurality of trained models to bounding box portions of the image data that contains each of the food items, wherein each of the trained models were trained using image training data of other food items, the image training data being annotated based on previous identifications of a first portion of the other food items as having poor quality features and a second portion of the other food items as having good quality features, wherein the other food items are of a same food type as the food items, wherein the plurality of trained models include a first trained model trained to identify a first quality feature and a second trained model trained to identify a second quality feature that is different than the first quality feature, wherein the quality level score for the food item is an overall quality metric for the food item and wherein the overall quality metric is determined by:

accessing, from a data store, rule-based mappings of (i) different ranges of values for scores corresponding to identification of the first and second quality features to (ii) enumerated categories of food item quality, wherein the enumerated categories of food item quality include at least one of salable, unsalable, edible, nonedible, good quality, bad quality, and okay quality;

iteratively determining, for each of the first and second quality features, whether respective rule-based mappings are met;

identifying, based on the respective rule-based mappings being met, an enumerated category of food item quality for the food item; and assigning the identified category to the food item as the overall quality metric for the food item;

determining, by the computing system and for each of the food items, a quality level score for the food item based on the identified quality level of the food item; and storing, by the computing system and for each of the food items, (i) the bounding box portions of the image data that contains the food items, (ii) the grid index, (iii) the identified quality level of the food item, and (iv) the determined quality level score for the food item in the data store.

* * * * *